United States Patent
Narimatu et al.

(10) Patent No.: US 8,928,692 B2
(45) Date of Patent: Jan. 6, 2015

(54) IMAGE PROCESSING APPARATUS, METHOD FOR DISPLAYING POP-UP WINDOW, AND COMPUTER-READABLE STORAGE MEDIUM FOR COMPUTER PROGRAM

(75) Inventors: Eiichi Narimatu, Toyokawa (JP); Shinichi Asai, Gamagoori (JP); Hiroshi Iwamoto, Toyohashi (JP); Takashi Oikawa, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 661 days.

(21) Appl. No.: 13/186,193

(22) Filed: Jul. 19, 2011

(65) Prior Publication Data

US 2012/0019554 A1 Jan. 26, 2012

(30) Foreign Application Priority Data

Jul. 23, 2010 (JP) .................................. 2010-166344

(51) Int. Cl.
*G09G 5/00* (2006.01)
*G03G 15/00* (2006.01)
(Continued)

(52) U.S. Cl.
CPC .......... *G06F 3/0481* (2013.01); *G06F 3/04883* (2013.01); *H04N 1/00472* (2013.01); *G06F 3/04886* (2013.01); *H04N 1/00482* (2013.01); *H04N 2201/0094* (2013.01); *H04N 1/00474* (2013.01)
USPC ............. 345/629; 399/81; 715/788; 715/812; 715/829

(58) Field of Classification Search
CPC ............. G06F 3/048; G06F 3/01; G06F 3/14; G06F 3/0481; G06F 3/04883; G06F 3/04886; H04N 1/00472; H04N 1/00474; H04N 1/00482; H04N 2201/0094

USPC ..................... 345/629; 399/81; 715/788–801, 715/804–805, 812, 829, 845; 358/1.13
See application file for complete search history.

(56) References Cited

U.S. PATENT DOCUMENTS 6,952,542 B1 10/2005 Morikawa
7,464,336 B2 * 12/2008 Nakamoto et al. ............ 715/705
(Continued)

FOREIGN PATENT DOCUMENTS

JP 8-272580 10/1996
JP 10-240487 9/1998
(Continued)

OTHER PUBLICATIONS

Machine translation of Japanese Patent Publication No. H10-240487.*

(Continued)

*Primary Examiner* — Xiao Wu
*Assistant Examiner* — Michael J Cobb
(74) *Attorney, Agent, or Firm* — Buchanan Ingersoll & Rooney PC

(57) ABSTRACT

An image processing apparatus includes a display device that displays a plurality of windows having hierarchy levels in such a manner that a low-level window overlaps a high-level window, each of the plurality of windows containing a first object to close the subject window and one or more second objects to select items; an extraction portion that extracts, from one or more second objects in the high-level window, a selection candidate object that is likely to be selected by a user after the low-level window is closed; and a control portion that controls, when the extraction portion extracts the selection candidate object, the display device in such a manner that the first object in the low-level window overlaps the selection candidate object, or the first object in the low-level window is disposed close to the selection candidate object.

19 Claims, 55 Drawing Sheets

(51) Int. Cl.
*G06F 3/048* (2013.01)
*G06F 3/0488* (2013.01)
*H04N 1/00* (2006.01)
*G06F 3/0481* (2013.01)

(56) References Cited

U.S. PATENT DOCUMENTS

| | | | |
|---|---|---|---|
| 8,359,541 B1* | 1/2013 | Landry | 715/764 |
| 2006/0200259 A1* | 9/2006 | Hoffberg et al. | 700/86 |
| 2007/0130376 A1* | 6/2007 | Moon | 710/8 |
| 2008/0022212 A1* | 1/2008 | Kodimer et al. | 715/744 |
| 2010/0290071 A1* | 11/2010 | Okada et al. | 358/1.13 |
| 2011/0103819 A1* | 5/2011 | Sekiya | 399/81 |
| 2013/0278961 A1* | 10/2013 | Nakatsu, Kenta | 358/1.14 |

FOREIGN PATENT DOCUMENTS

| | | |
|---|---|---|
| JP | 11-237943 | 8/1999 |
| JP | 2001-356856 | 12/2001 |
| JP | 2005-182071 | 7/2005 |

OTHER PUBLICATIONS

Machine translation of Japanese Patent Publication No. H08-272580.*

Notification of Reasons for Refusal mailed Jul. 31, 2012, directed to Japanese Application No. 2010-166344; 8 pages.

* cited by examiner

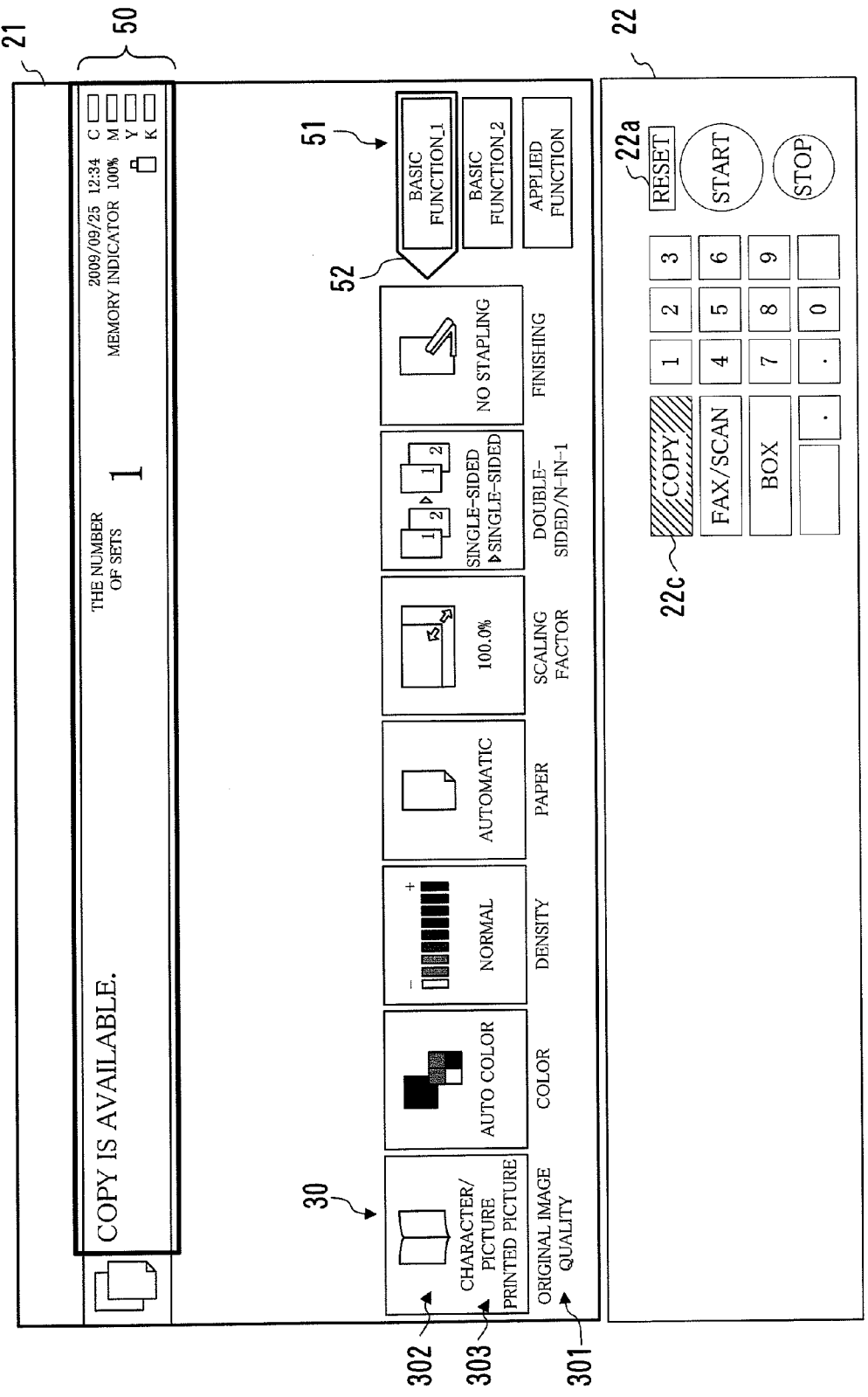

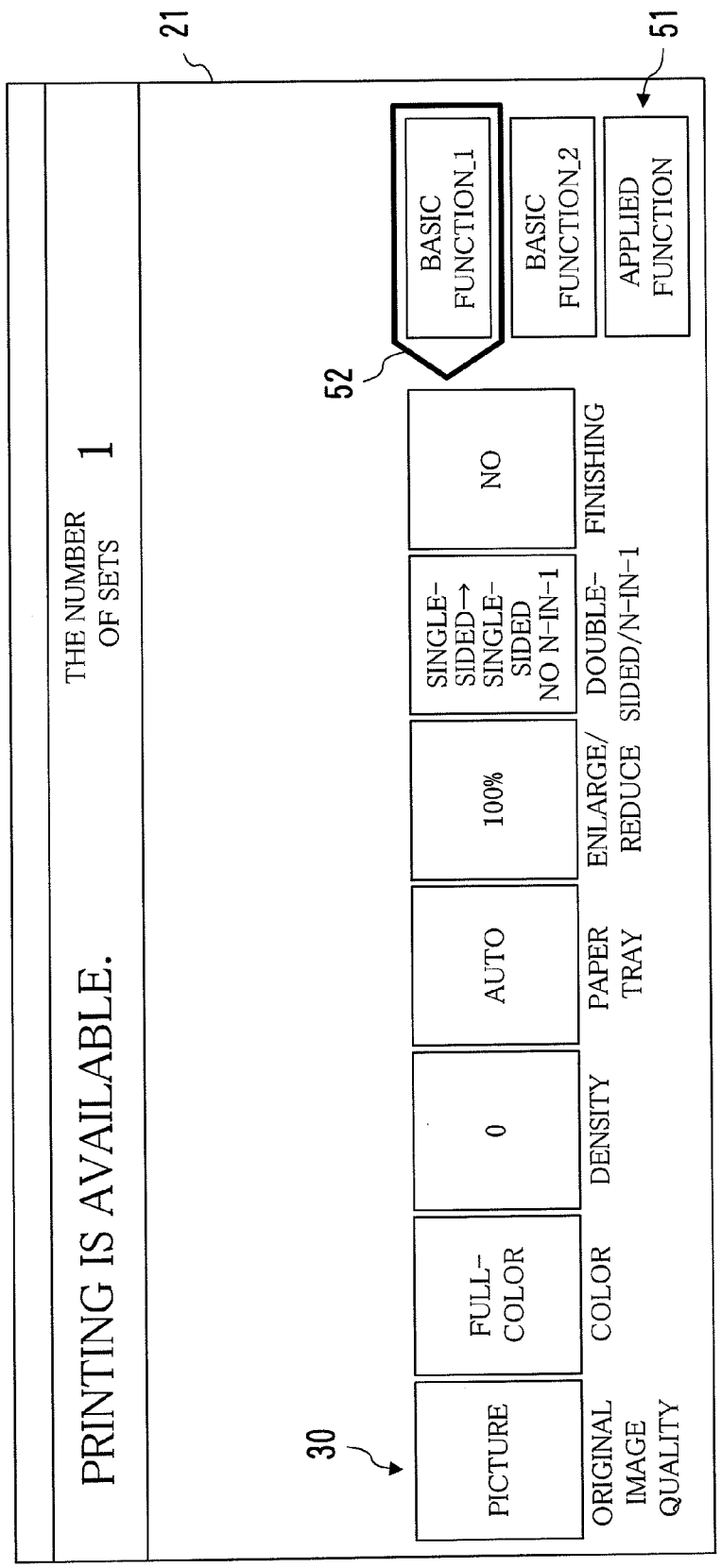

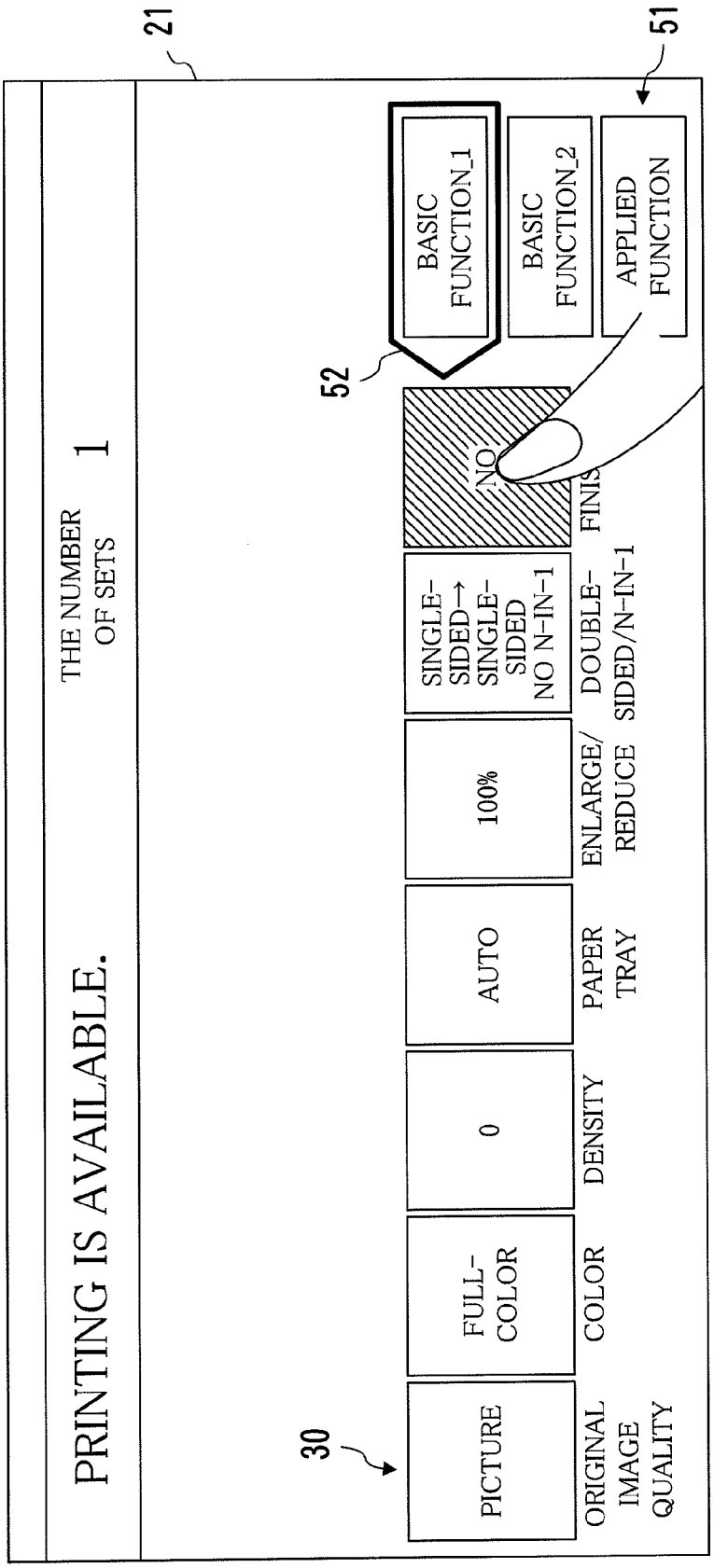

FIG. 6B
RELATED ART

SCREEN 905

PRINTING IS AVAILABLE.

THE NUMBER OF SETS  1

STAPLING
- NO
- CORNER
- 2-POSITION STAPLING

PUNCH
- NO
- 2-HOLE
- 3-HOLE

PAPER FOLDING SADDLE STITCHING ⇑
PAPER OUTPUT TRAY ⇑

STOP

OK

30 → PICTURE

ORIGINAL IMAGE QUALITY | COLOR | DENSITY | PAPER TRAY | DOUBLE-SIDED/N-... | EN... RE...

BASIC FUNCTION_1  ← 51
BASIC FUNCTION_2
APPLIED FUNCTION

100A

21

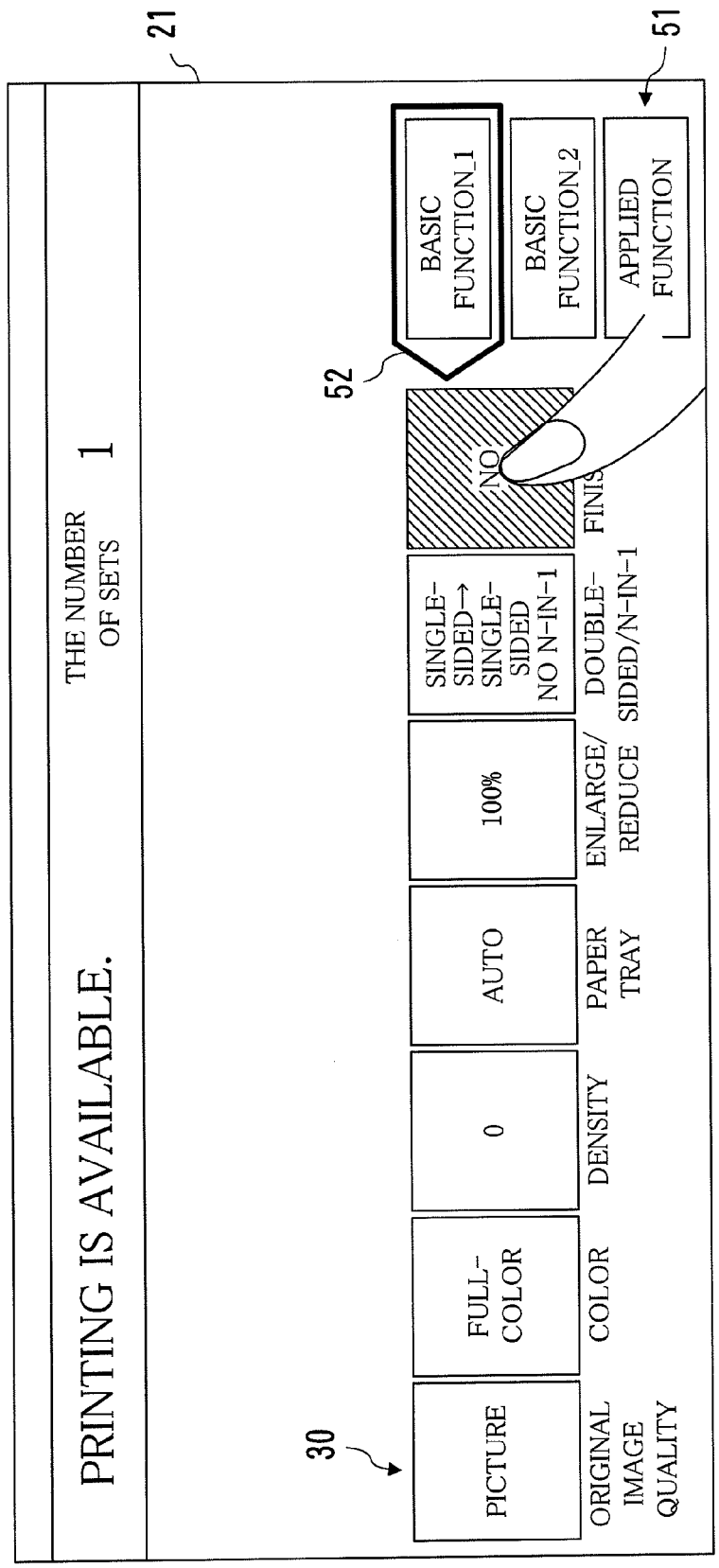

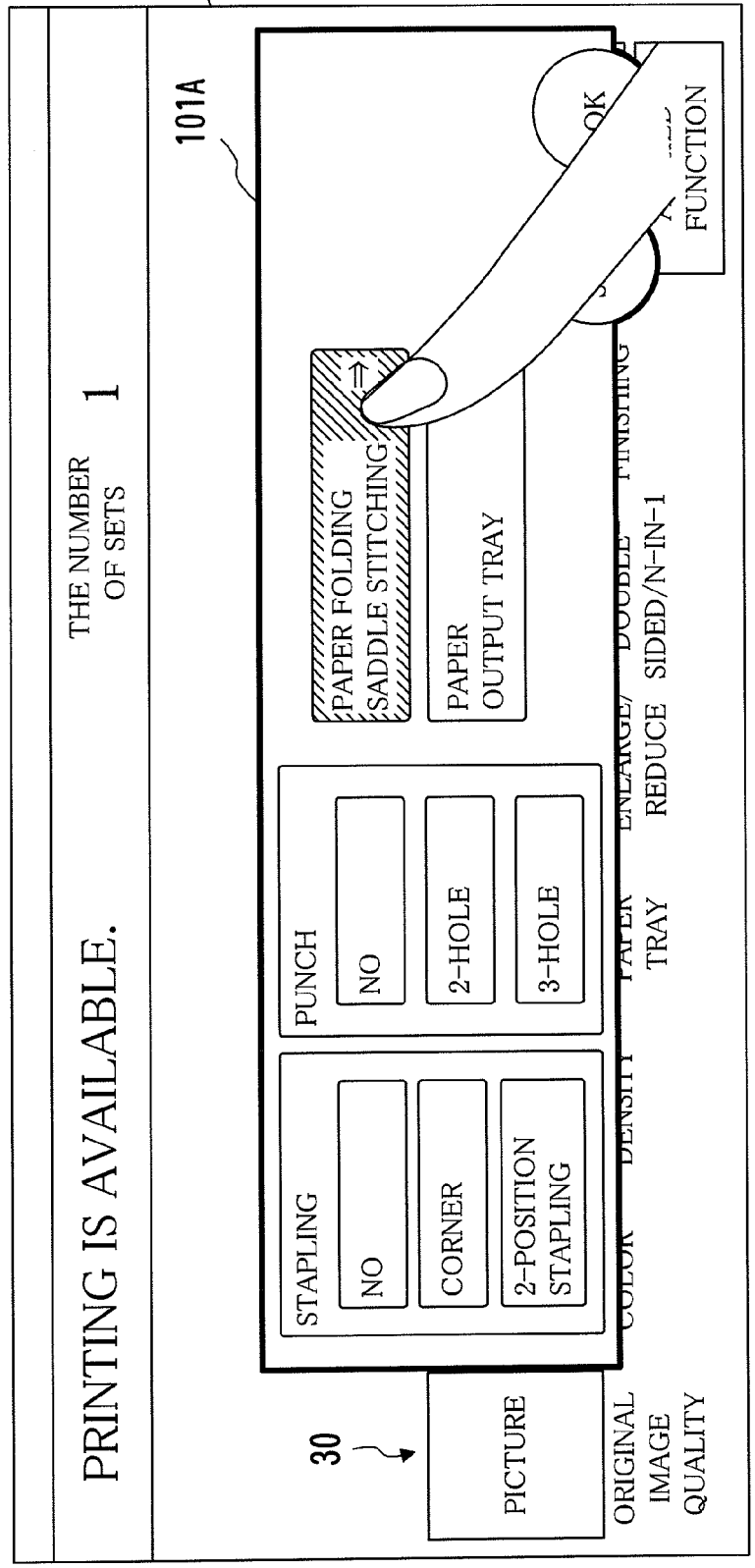

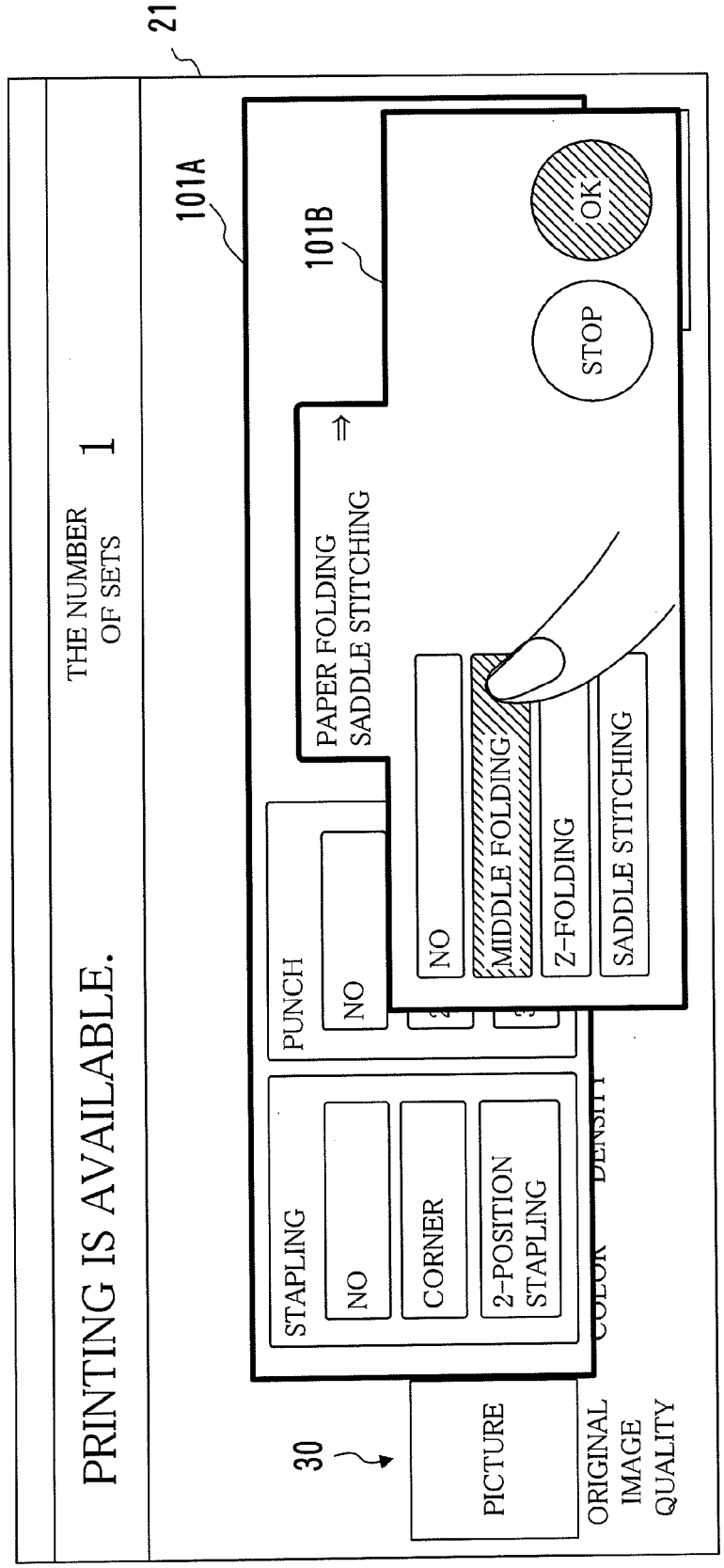

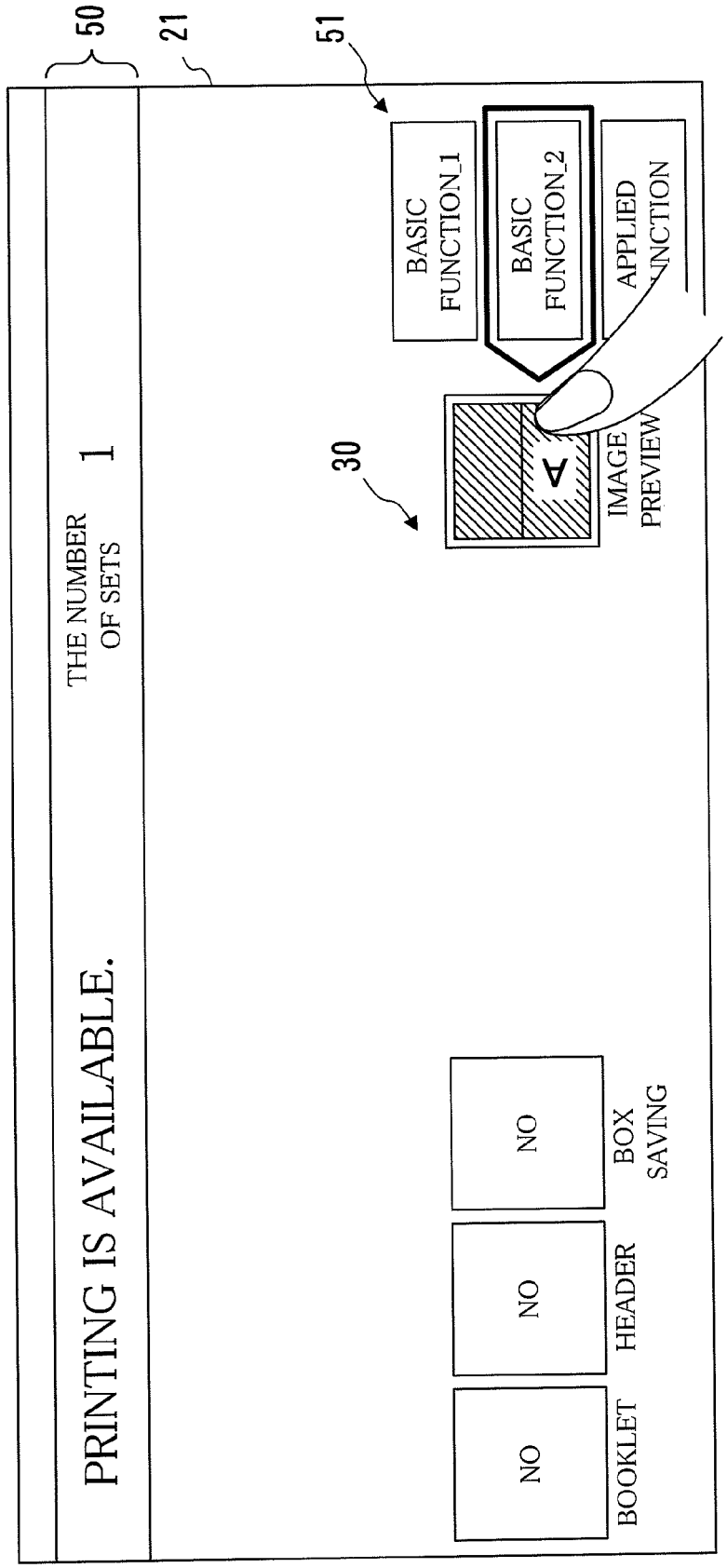

FIG. 10C RELATED ART
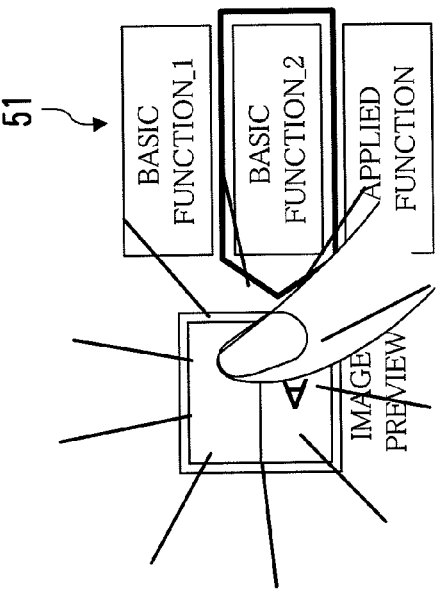
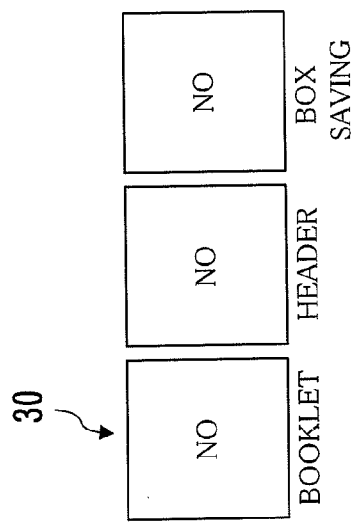

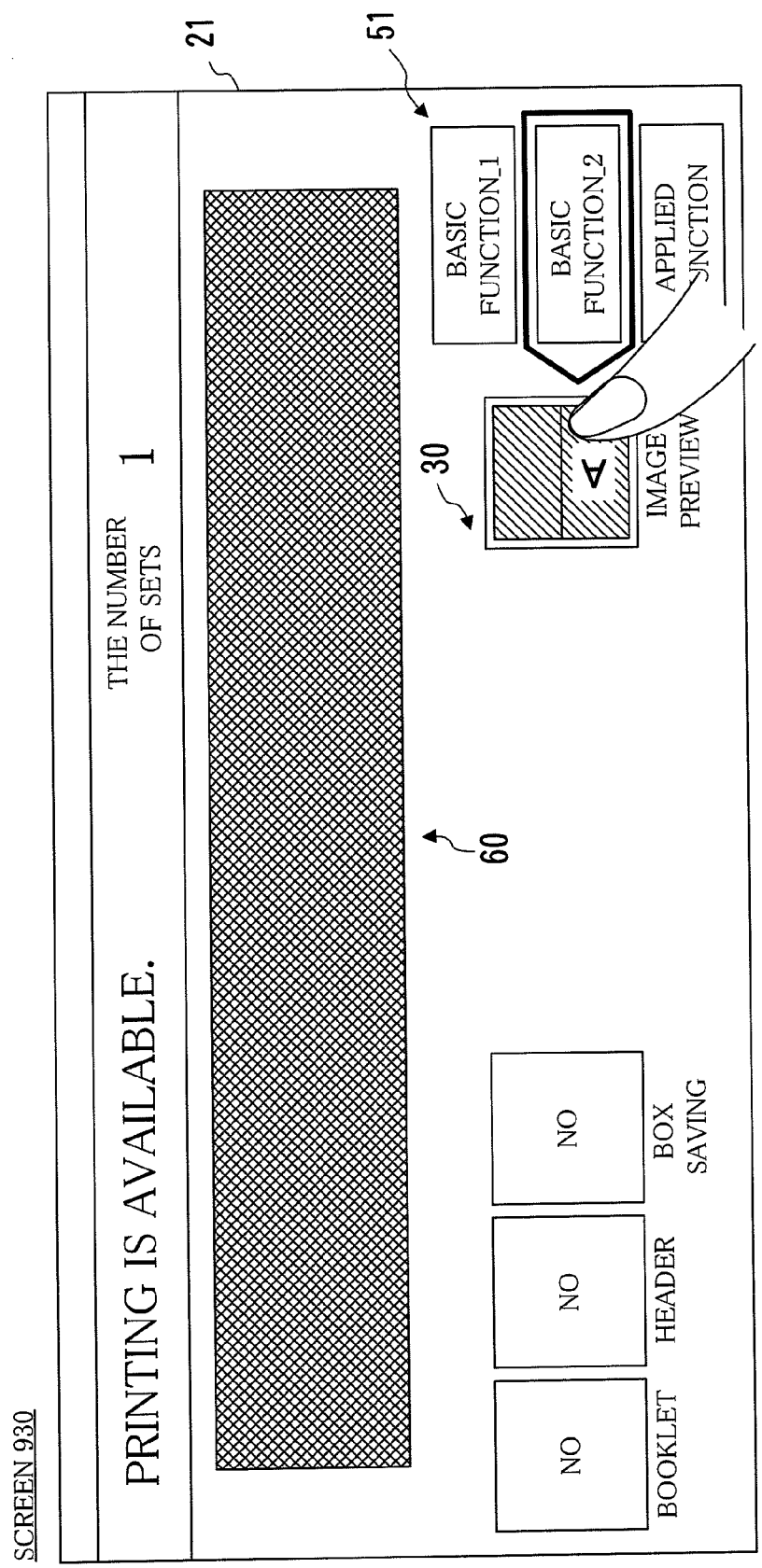

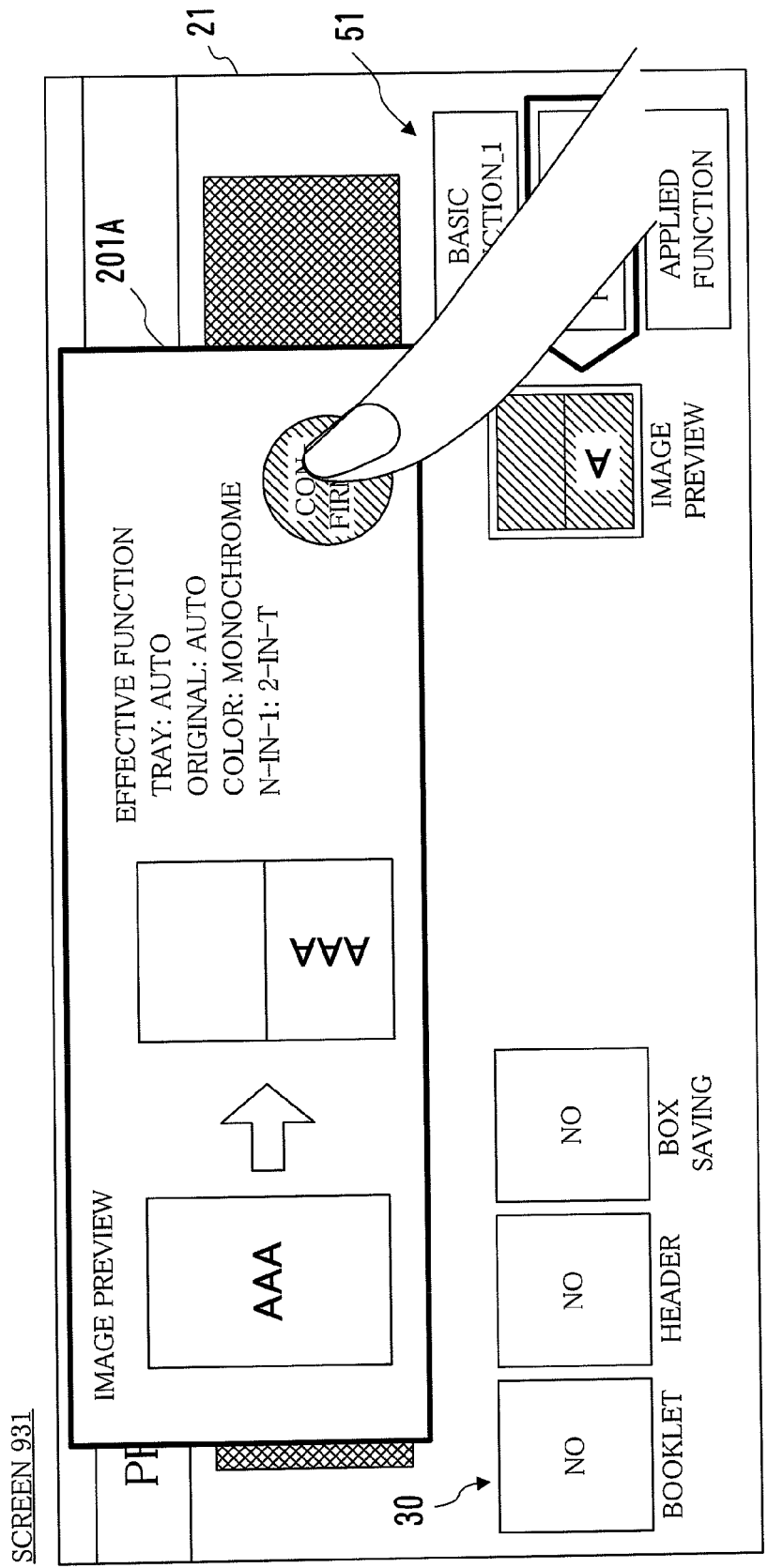

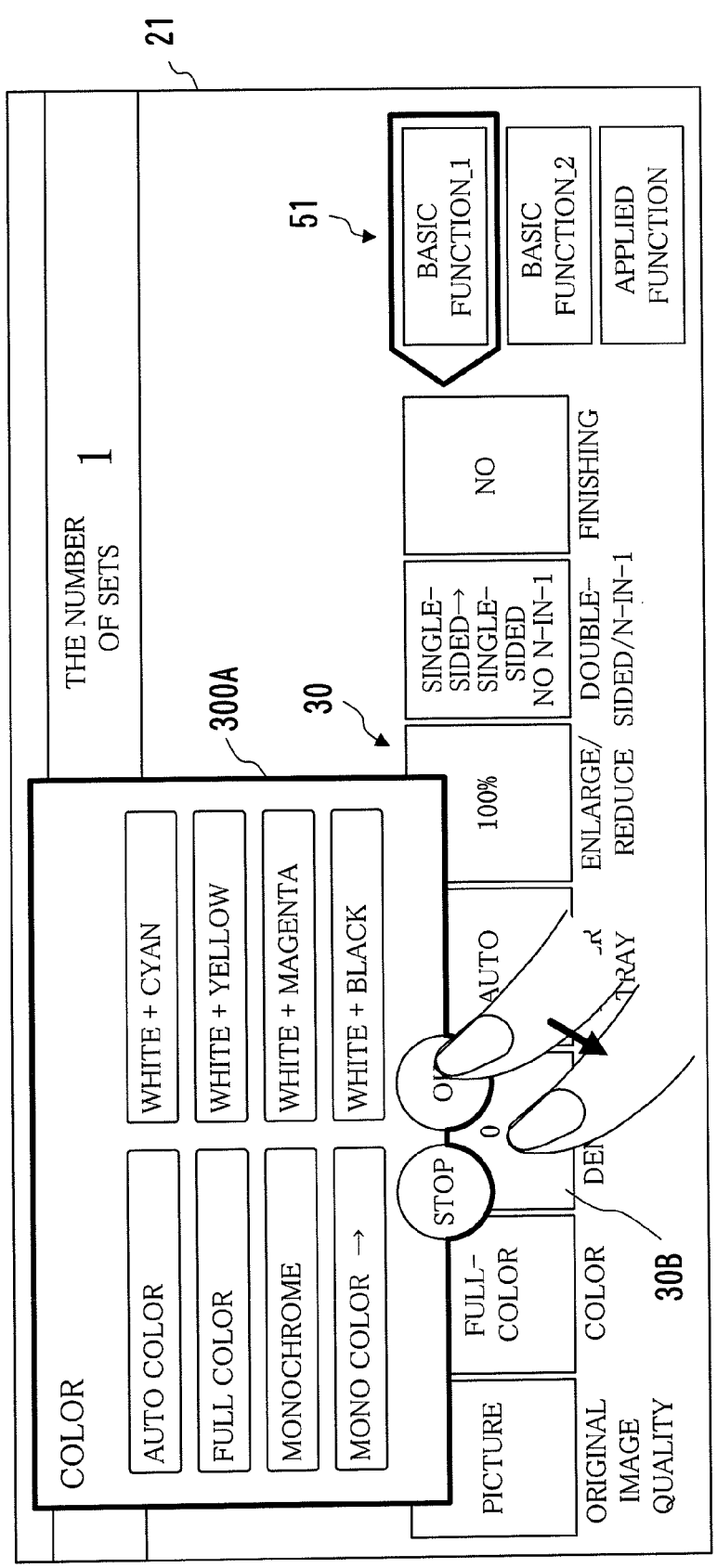

SCREEN 942

FIG. 14

| NUMBER | PARENT WINDOW | | CHILD WINDOW | |
|---|---|---|---|---|
| | BUTTON | WINDOW IDENTIFIER | BUTTON | WINDOW IDENTIFIER |
| 1 | "STOP/OK" BUTTON | FINISHING ICON | "STOP/OK" BUTTON | PAPER FOLDING SADDLE STITCHING |
| 2 | ITEM "2-HOLE" | FINISHING ICON | "STOP/OK" BUTTON | PAPER OUTPUT TRAY |
| 3 | "BASIC FUNCTION_2" BUTTON | — | "STOP/OK" BUTTON | FINISHING ICON |
| 4 | NON-RESPONSE REGION | — | "CONFIRMED" BUTTON | IMAGE PREVIEW |
| 5 | "DENSITY" ICON | — | "STOP/OK" BUTTON | COLOR |
| ... | ... | ... | ... | ... |

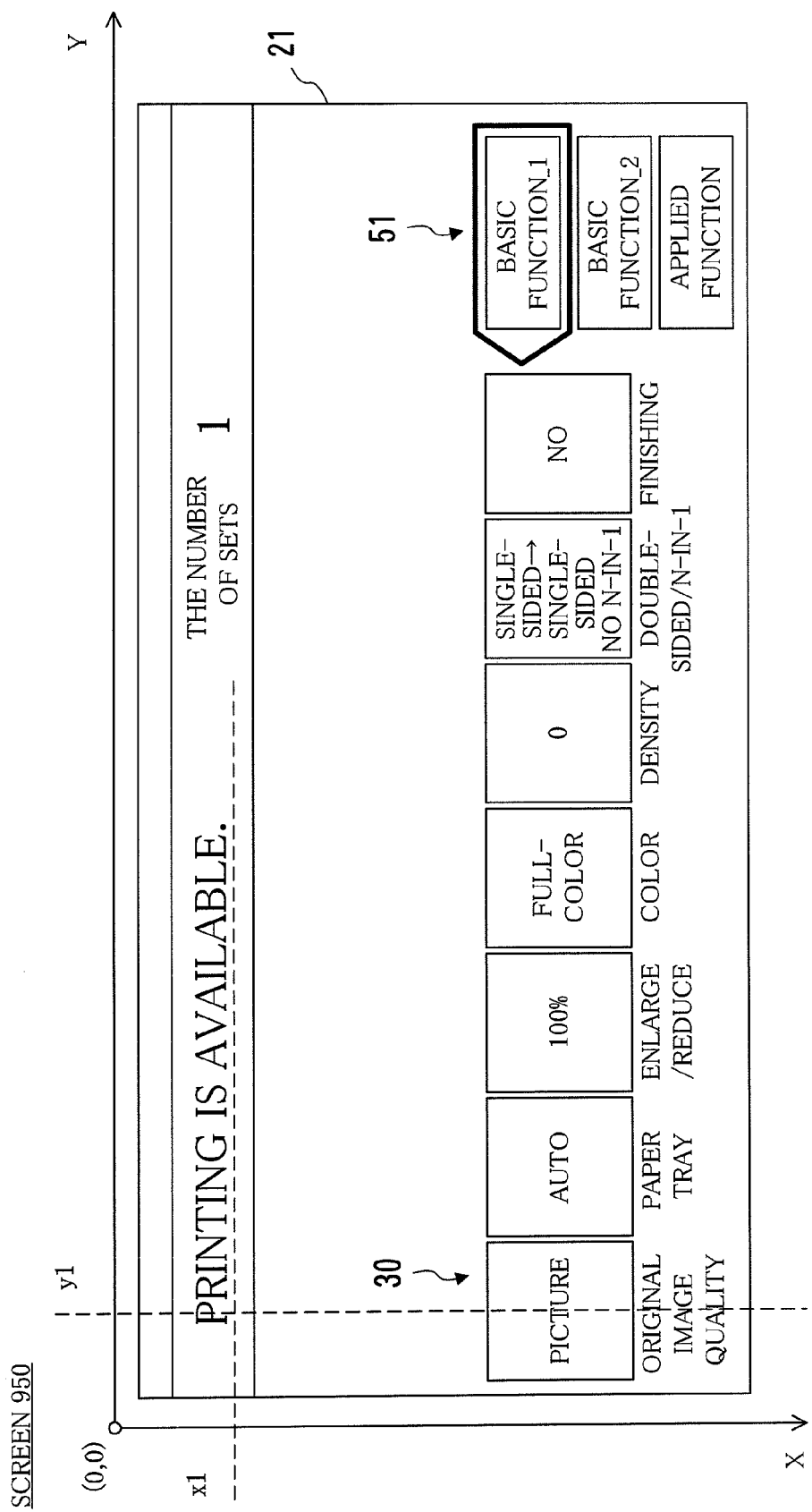

SCREEN 951

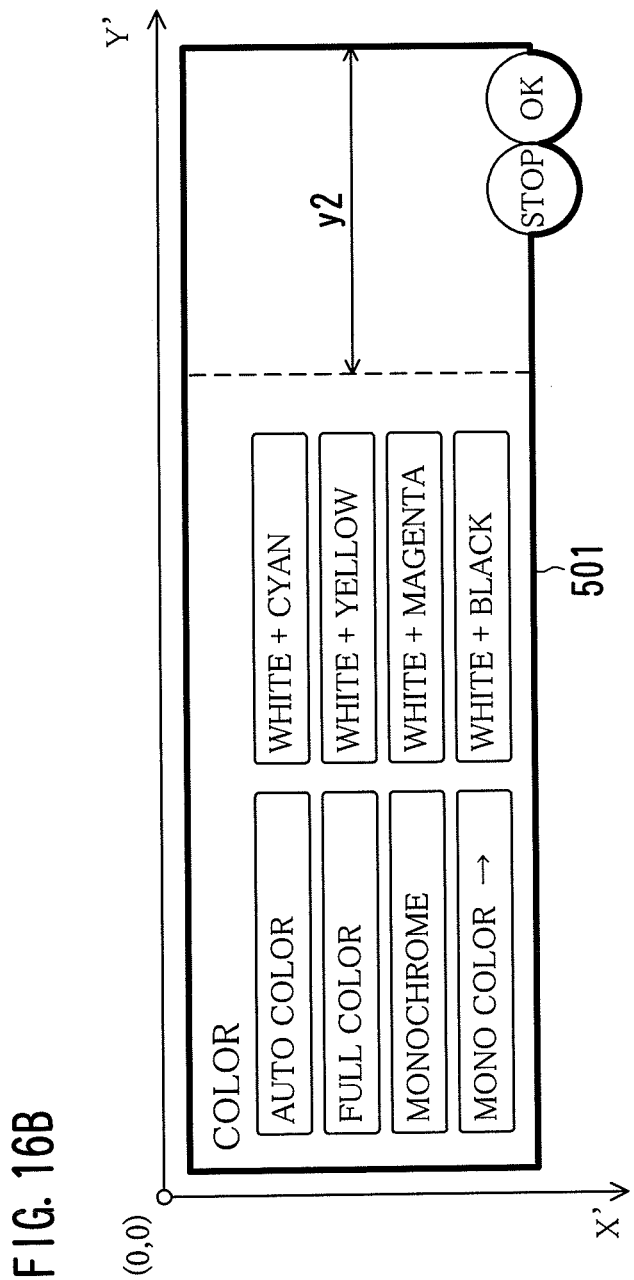

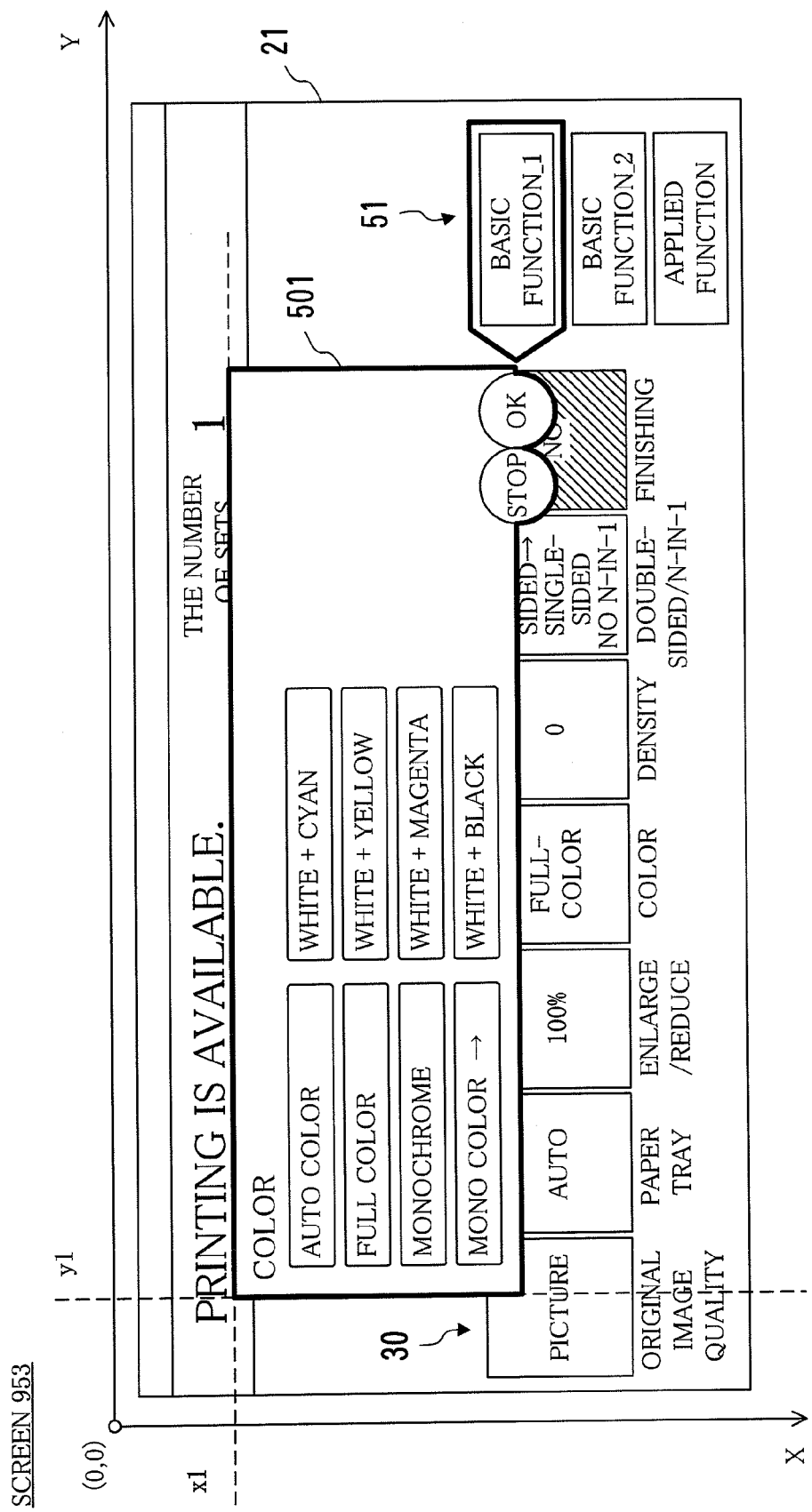

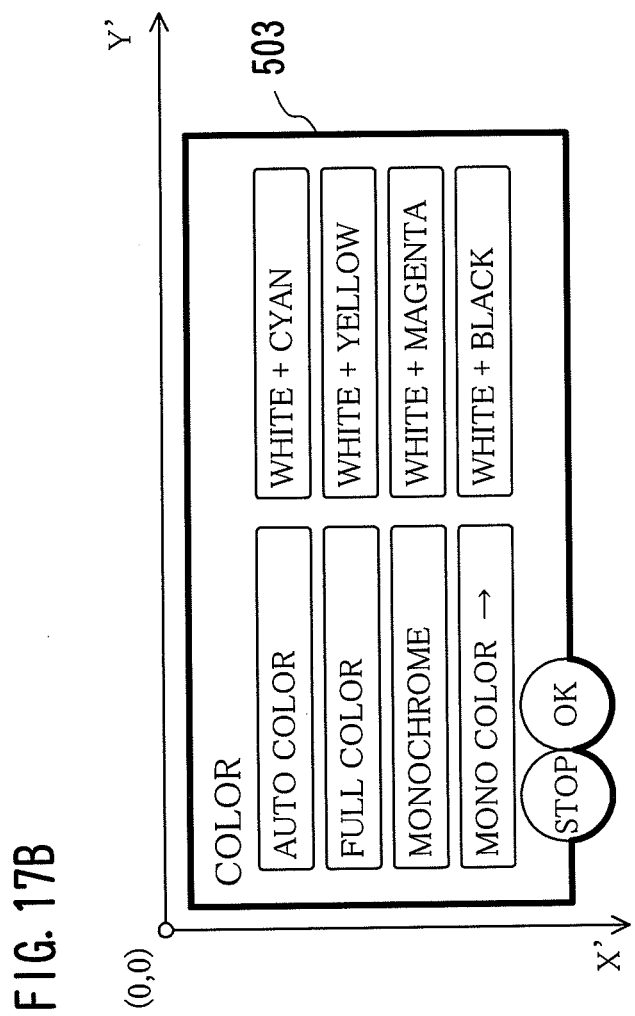

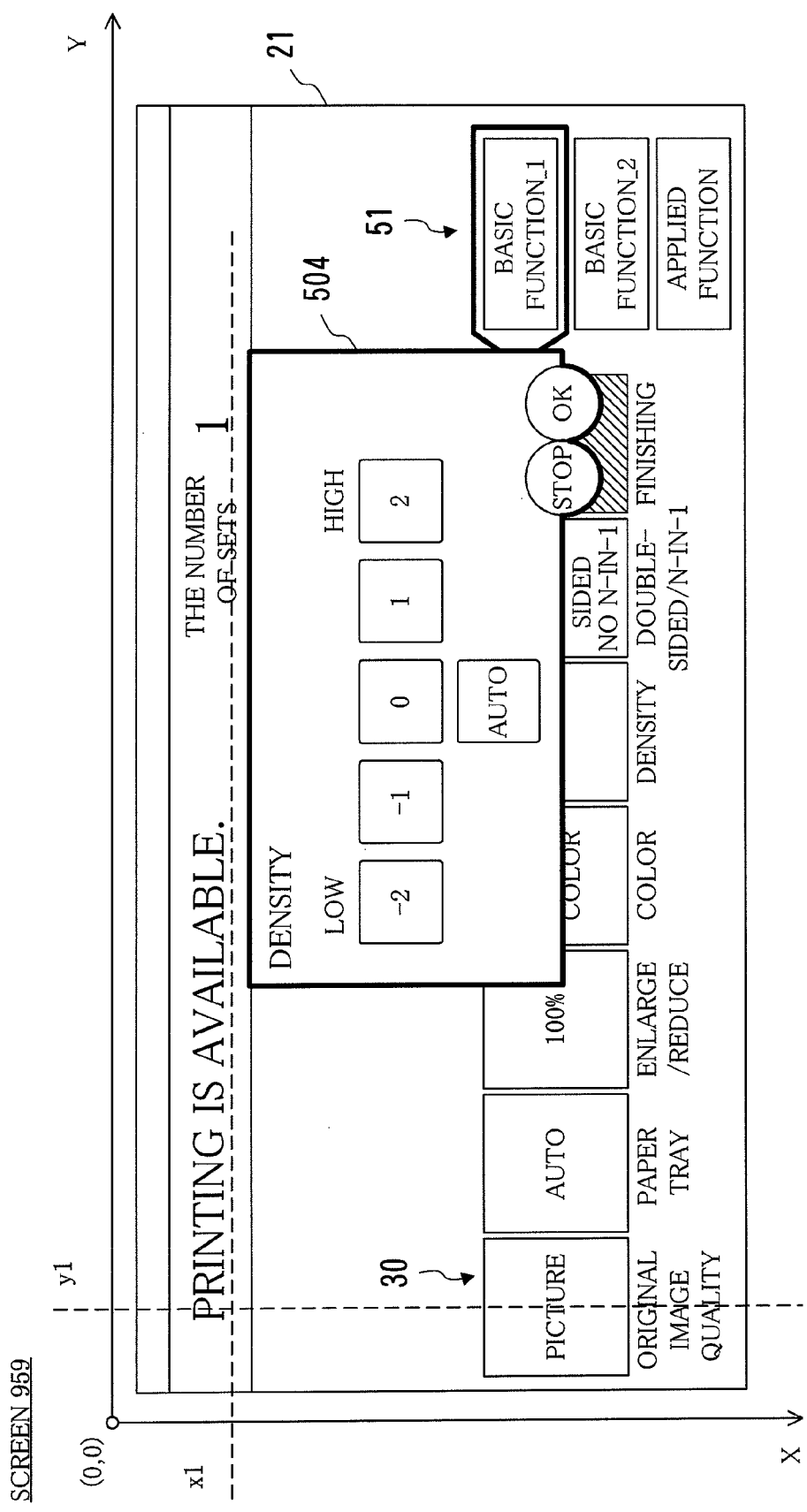

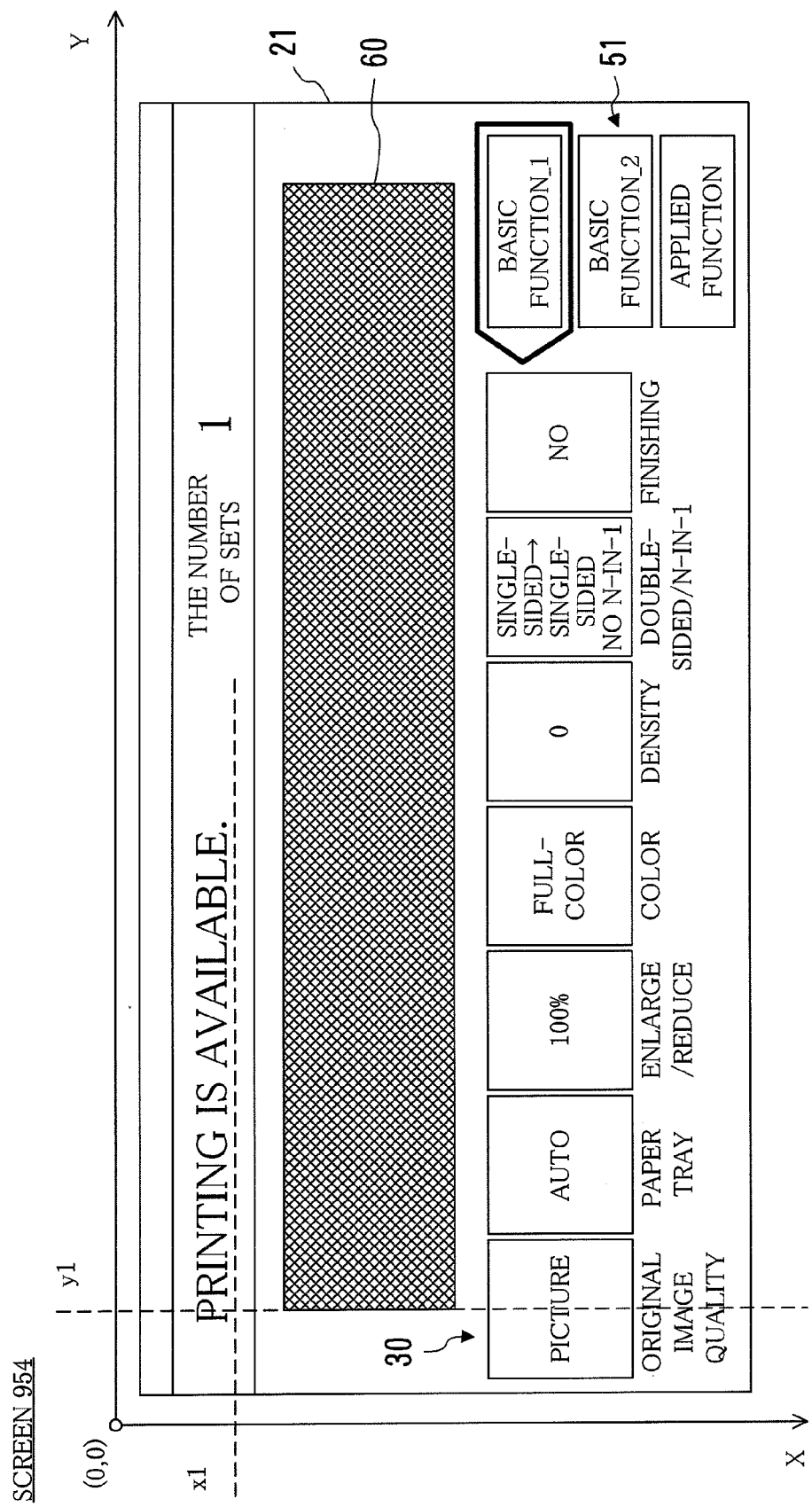

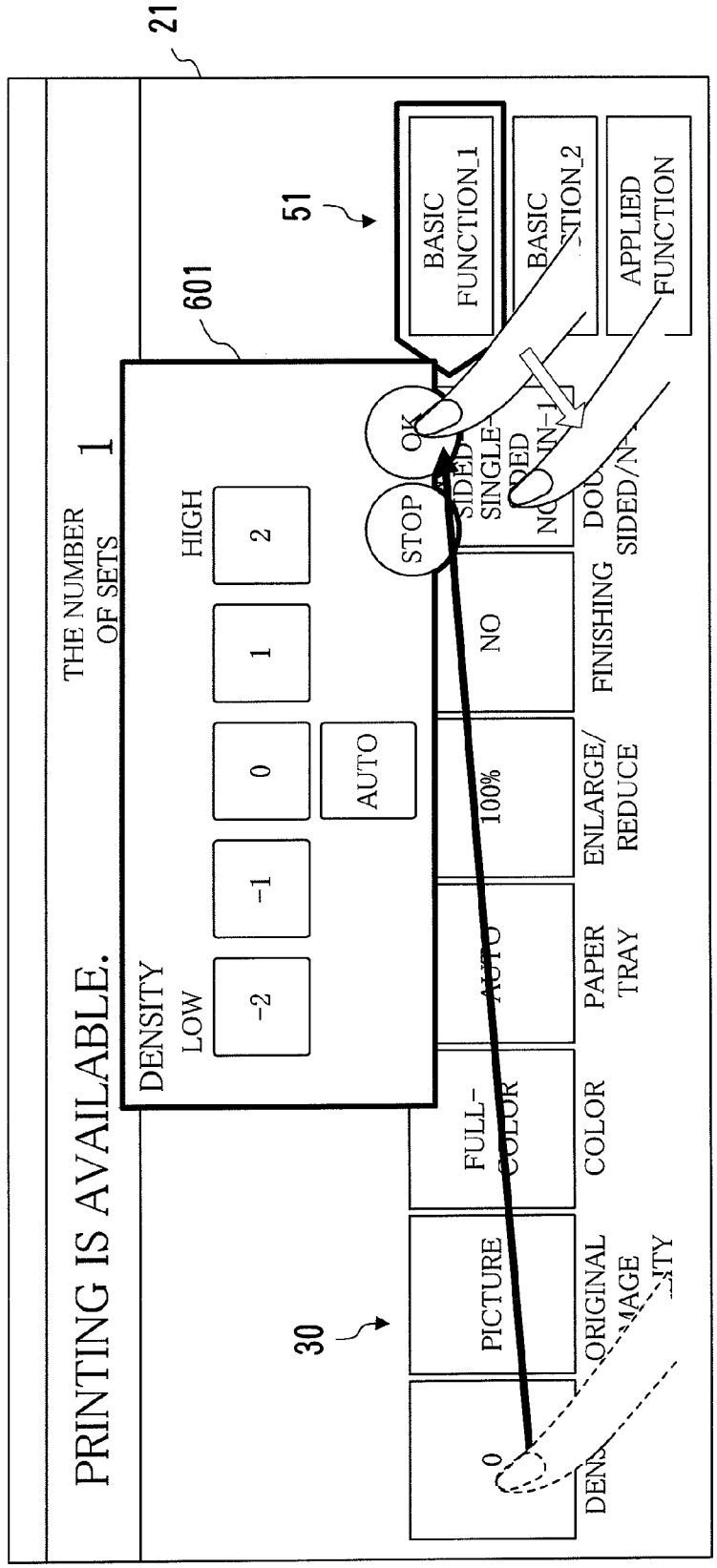

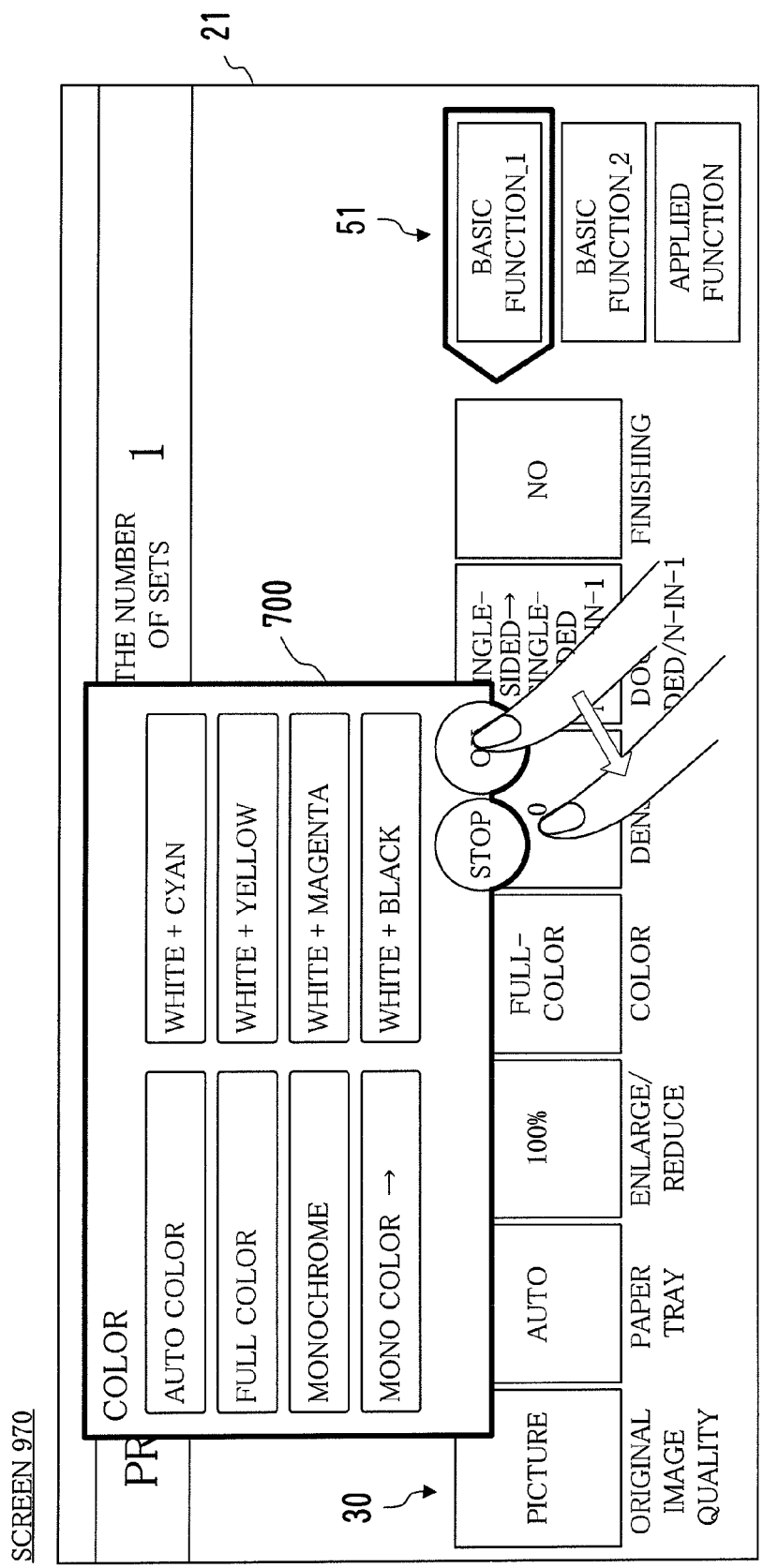

SCREEN 972

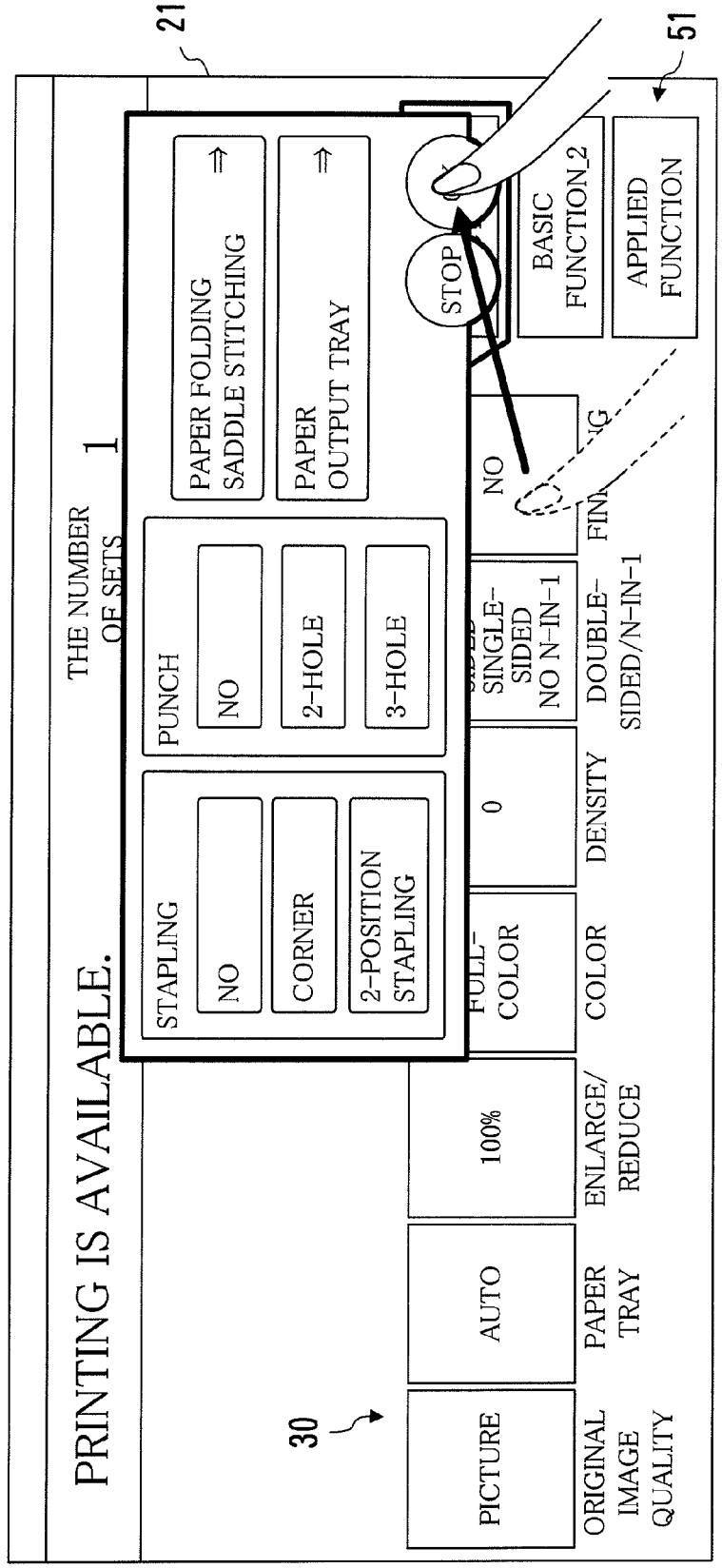

IMAGE PROCESSING APPARATUS, METHOD FOR DISPLAYING POP-UP WINDOW, AND COMPUTER-READABLE STORAGE MEDIUM FOR COMPUTER PROGRAM

This application is based on Japanese patent application No. 2010-166344 filed on Jul. 23, 2010, the contents of which are hereby incorporated by reference.

BACKGROUND OF THE INVENTION

1. Field of the Invention

The present invention relates to an operational panel equipped in an image processing apparatus or the like.

2. Description of the Related Art

Functions of copiers have recently been expanded. Multi-Functional Peripherals (MFP's) configured to integrate, thereinto, a variety of functions such as faxing and printing have become the mainstream of copiers installed in offices.

Expanding functions of an MFP brings convenience to users because they can operate only one MFP to use many functions thereof. On the other hand, expanding functions of an MFP often makes the operation thereof complicated. To be specific, because the size of an operational panel of the MFP is limited, it is difficult to display, at one time, letters, diagrams, and the like representing all the available functions and setting items thereof in such a manner that users can easily recognize the indication on the operational panel.

In such a case, the operational flexibility of the MFP is improved by using a Graphical User Interface (GUI) configured to display setting screens (windows) by switching from one setting screen to another. The operational flexibility of the MFP is also improved by using the GUI or the like for providing a scrolled display in which letters and the like that do not fit on a screen are displayed by scrolling through the letters vertically or horizontally across the screen.

In a GUI configured to display setting screens by switching from one setting screen to another, a user probably needs to make item settings by switching successively, from one setting screen to another depending on settings desired by him/her. In view of this, there has been proposed a technique in which the number of times of operation to switch from one setting screen to another is reduced as much as possible by classifying setting items and disposing the setting items separately on the individual setting screens; thereby to improve the operational flexibility of an operating unit (see Japanese Laid-open Patent Publication No. 2005-182071).

However, since the size of a setting screen is limited, it is sometimes necessary to dispose items separately on a plurality of setting screens. In such a case, a user must perform operation to switch from one setting screen to another. As a hierarchy of setting screens becomes deeper, a user needs to close the opened screens in succession to return to the original indication on the display, which often gives the user a burdensome task.

SUMMARY

The present disclosure is directed to solve the problems pointed out above, and therefore, an object of an embodiment of the present invention is to enable a user to perform operation for changing the indication on a display from one setting screen to another in a quick and stress-free manner in a GUI configured to display setting screens by switching from one to another.

According to an aspect of the present invention, an image processing apparatus includes a display device that displays a plurality of windows having hierarchy levels in such a manner that a low-level window overlaps a high-level window, each of the plurality of windows containing a first object to close the subject window and one or more second objects to select items; an extraction portion that extracts, from one or more second objects in the high-level window, a selection candidate object that is likely to be selected by a user after the low-level window is closed; and a control portion that controls, when the extraction portion extracts the selection candidate object, the display device in such a manner that the first object in the low-level window overlaps the selection candidate object, or the first object in the low-level window is disposed close to the selection candidate object.

These and other characteristics and objects of the present invention will become more apparent by the following descriptions of preferred embodiments with reference to drawings.

BRIEF DESCRIPTION OF THE DRAWINGS

FIG. 3 is a diagram showing an example of the configuration of an operational panel and a display example thereon.

FIG. 4A is a diagram showing a display example of a touchscreen portion for a case where a "basic function_1" switching button is selected.

FIGS. 5A to 5C are diagrams showing a conventional example of item setting windows in which item details for a "finishing" functional icon are set.

FIGS. 6A to 6C are diagrams showing the movement of user's finger for a case where he/she closes item setting windows according to a conventional example.

FIGS. 7A to 7C are diagrams showing an example of item setting windows in which item details for a "finishing" functional icon are set according to an embodiment of the present invention.

FIGS. 10A to 10C are diagrams showing a conventional example of an "image preview" item setting window.

FIGS. 11A to 11C are diagrams showing an example of an "image preview" item setting window according to an embodiment of the present invention.

FIGS. 12A to 12C are diagrams showing a case in which items for a plurality of functional icons are set successively.

FIG. 14 is a diagram showing an example of the structure and details of a subsequent operation information table.

FIGS. 15A to 15C are diagrams depicting an example of a method for disposing a pop-up window.

FIGS. 16A to 16C are diagrams depicting an example of a method for changing the size of a pop-up window.

FIGS. 17A to 17C are diagrams depicting an example of a method for changing the display position of a button to close a pop-up window.

FIGS. 18A to 18C are diagrams depicting an example of a method for changing the display position of a pop-up window.

FIGS. 19A to 19C are diagrams depicting an example of a method for changing the positions of buttons in a pop-up window.

FIGS. 22A to 22D are diagrams showing the movement of user's finger in a conventional example in which the positions of functional icons are not changed.

FIGS. 23A to 23D are diagrams showing the movement of user's finger in an embodiment of the present invention in which the positions of functional icons have been changed.

DESCRIPTION OF THE PREFERRED EMBODIMENTS

Embodiments

Descriptions are provided below of a user interface function equipped in an image processing apparatus according to an embodiment of the present invention. In the embodiment, descriptions are given of a user interface function equipped in an MFP 1000, which is one type of the image processing apparatus, with reference to drawings. The image processing apparatus is not limited to an MFP (multifunction device), and may be a device having one function of scanning, faxing, printing, or the like.

Figure 1:
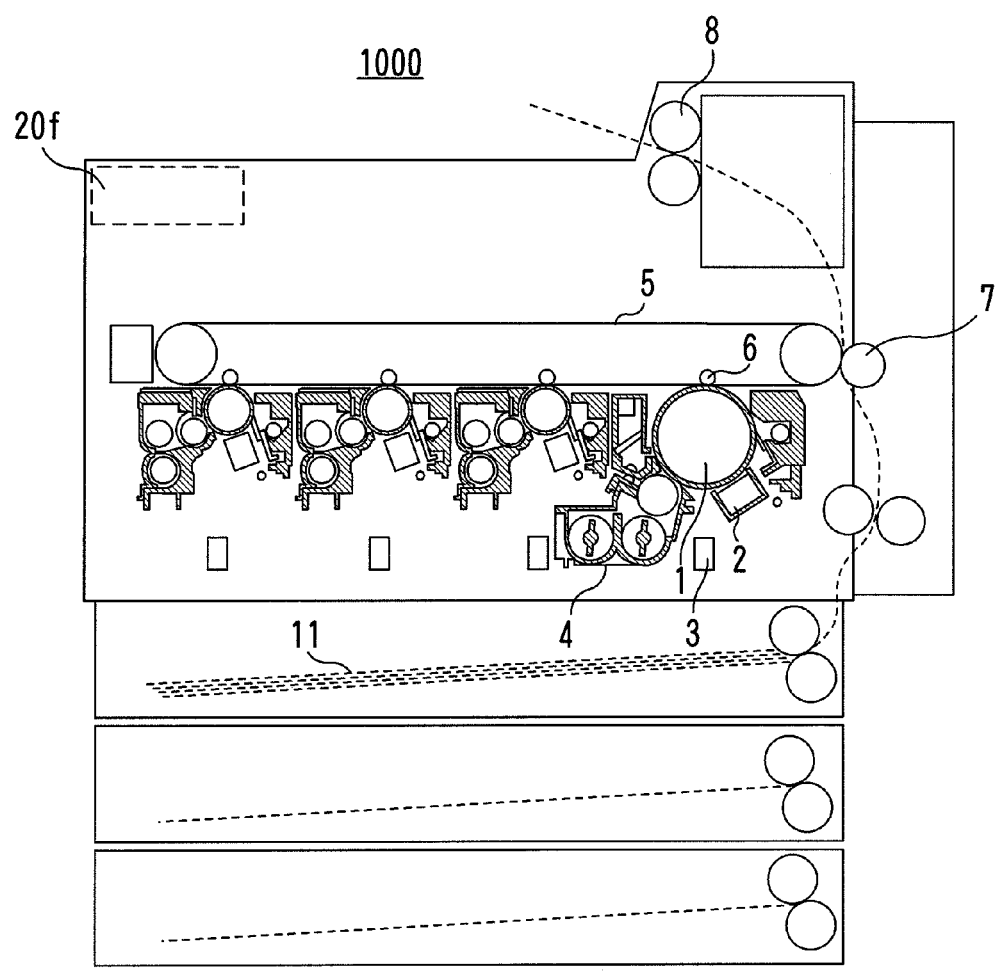
FIG. 1 is an overall schematic diagram of an MFP.

FIG. 1 is an overall schematic diagram of the MFP 1000.

The MFP 1000 is provided with an operational panel 20f by means of which the user interface function is implemented. The MFP 1000 controls units as discussed below depending on items specified by a user through the operational panel 20f, and performs printing or the like in accordance with a request made by the user.

The MFP 1000 includes an image forming unit for forming a black (K) image. The image forming unit is provided with an image carrier 1 called a photoconductor drum, a charging device 2 for charging the surface of the image carrier 1 at a uniform potential, an image exposure device 3 for applying light to the surface of the charged image carrier 1 and forming a predetermined electrostatic latent image, and a developing device 4 for developing by electrostatically adsorbing toner, which is a powdered color material, in an area where the electrostatic latent image is formed. An image forming unit for forming images of yellow (Y), magenta (M), and cyan (C) has a structure similar to that of the image forming unit for forming a black (K) image.

The MFP 1000 also includes a primary transfer device 6 for transferring (primary transferring of) the toner developed on the surface of the individual image carriers 1 onto a transfer belt 5 as an intermediate transfer belt, a secondary transfer device 7 for transferring (secondary transferring of) the toner, which has been primarily transferred onto the transfer belt 5, onto a recoding medium 11 such as recording paper or a resin film, and a fusing unit 8 for fixing the toner which has been secondarily transferred onto the recording medium 11.

Figure 2:
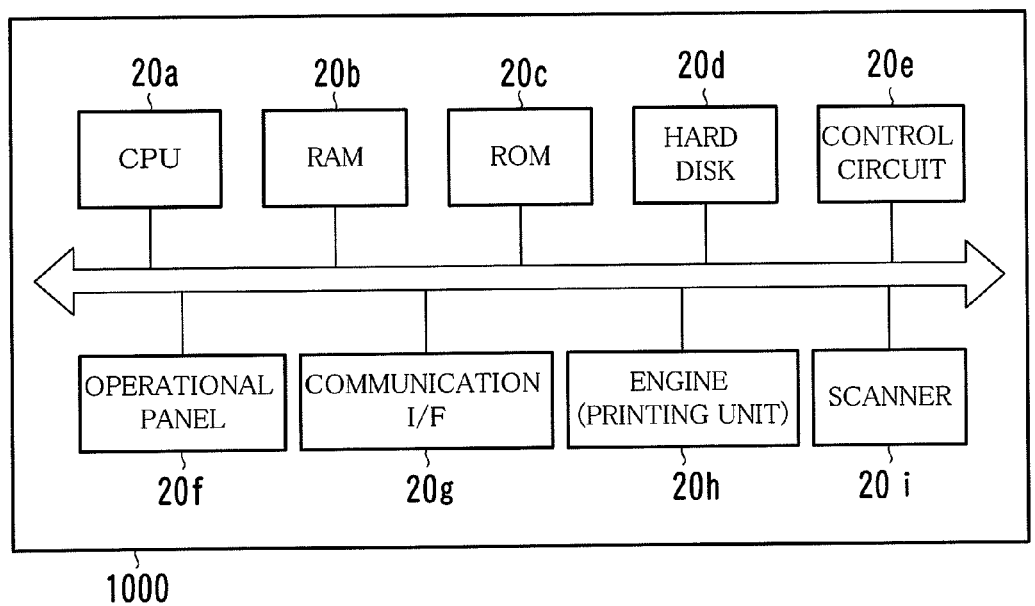
FIG. 2 is a diagram showing an example of the hardware configuration of an MFP.

FIG. 2 is a diagram showing an example of the hardware configuration of the MFP 1000.

The MFP 1000 is configured of a Central Processing Unit (CPU) 20a, a Random Access Memory (RAM) 20b, a Read-Only Memory (ROM) 20c, a hard disk 20d, a control circuit 20e, an operational panel 20f, a communication interface (I/F) 20g, a printing unit 20h, a scanner 20i, and so on.

The control circuit 20e is a circuit for controlling the hard disk 20d, the operational panel 20f, the communication interface 20g, the printing unit 20h, the scanner 20i, and so on.

The operational panel 20f is provided with a touch-sensitive panel, and is operable to display, for example, a screen for giving a message or the like to a user, a screen for the user to enter desired processes or the like. The user can make desired settings on the MFP 1000 by touching a predetermined position of the touch-sensitive panel.

The communication interface 20g is a Network Interface Card (NIC) for communicating with another device such as an authentication server and a user terminal, both of which are not shown, according to Transmission Control Protocol/Internet Protocol (TCP/IP) via a communication line, or a modem.

The printing unit 20h serves to print, onto paper, an image based on image data stored in a memory, e.g., the RAM 20b or the hard disk 20d, or image data transmitted by the user terminal and the like.

The scanner 20i is a so-called image scanner, and is operable to scan a diagram and a photograph printed on paper and to store the image, as image data, into the memory of the MFP 1000. The MFP 1000 implements a copy function by causing the scanner 20i to scan an image on a document and causing the printing unit 20h to print an image based on the scanned image.

[Operational Panel and Scroll Screen]

Descriptions are provided below of an example of the configuration of the operational panel 20f and display made thereon with reference to FIGS. 3 through 4B. The descriptions are given with reference to display made on the operational panel 20f for a case where a copy key 22c (see FIG. 3) of an operational key portion 22, described later, is pressed.

The operational panel 20f is configured of a touchscreen portion 21 and the operational key portion 22.

The touchscreen portion 21 is a touch-sensitive panel and is operable to display a screen for informing a user of the state of the MFP 1000, a screen for the user to give a command to the MFP 1000 by touching the touch-sensitive panel with his/her finger, and the like.

A message region 50, switching buttons 51, and functional icons 30 that seem like badges are displayed on the touchscreen portion 21.

A user is provided a visual indication, in the message region 50, of a message indicating the details of operation, an error message, a remaining amount of toner, and so on.

The switching buttons 51 are buttons to change the indication on the touchscreen portion 21.

It is assumed that three switching buttons 51 are provided in this embodiment. To be specific, the three switching buttons 51 are a "basic function_1" switching button, a "basic function_2" switching button, and an "applied function" switching button. Descriptions of the individual buttons are given later.

Referring to FIG. 3, a pentagon drawn with a solid line around the "basic function 1" switching button denotes a cursor 52. The cursor 52 indicates a switching button 51 currently selected from among the "basic function_1" switching button, the "basic function 2" switching button, and the "applied function" switching button.

The functional icons 30 are images indicating functions of the MFP 1000. One functional icon 30 corresponds to one function of the MFP 1000. The functional icon 30 includes a function type 301, an illustration 302, and an item detail 303. The function type 301 represents the name of a function corresponding to the functional icon 30. The illustration 302 is to help a user to visually recognize a function corresponding to the functional icon 30. The item detail 303 indicates a current setting value (item details) for a function corresponding to the functional icon 30.

A user touches a functional icon 30 to set item details for a function corresponding to the functional icon 30. An example of a method for setting item details is a method for making settings by touching a functional icon 30 to switch between "ON" and "OFF". This is a so-called toggle key. Another example is a method for displaying a screen for items setting, e.g., a pop-up window, and setting items therein. The displayed window is also called a screen in the description below.

Figure 4B:
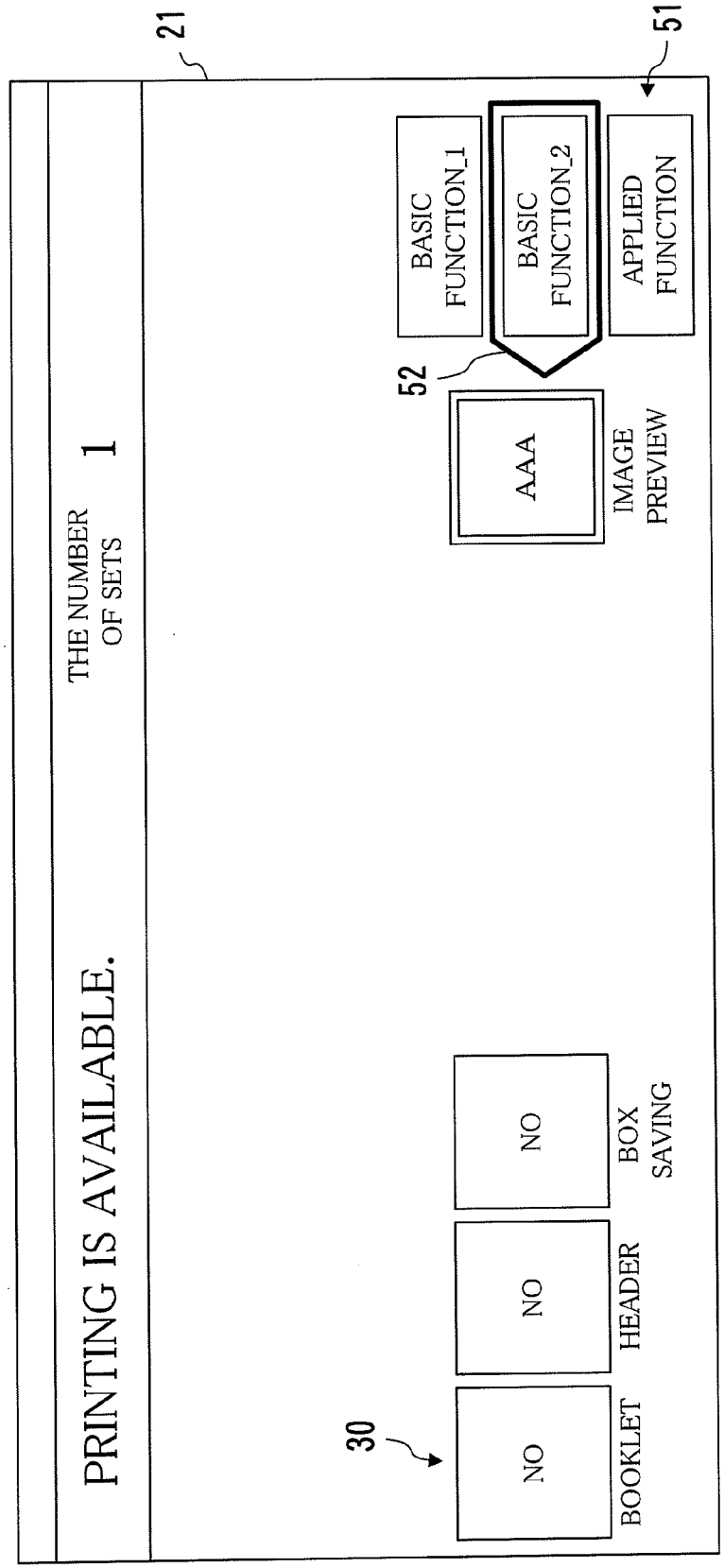
FIG. 4B is a diagram showing a display example of a touchscreen portion for a case where a "basic function_2" switching button is selected.

FIG. 4A shows a display example of the touchscreen portion 21 for a case where the "basic function_1" switching button is selected; and FIG. 4B shows a display example of the touchscreen portion 21 for a case where the "basic function_2" switching button is selected.

As shown in FIG. 4A, when the "basic function_1" switching button 51 is selected, seven functional icons 30 are displayed. As shown in FIG. 4B, when the "basic function_2" switching button is selected, four functional icons 30 are displayed.

While not shown in the drawing, when the "applied function" switching button is selected, a screen on which a plurality of functional icons 30 are scroll-displayed is represented. The scroll-display means as follows: Displaying a part of the functional icons 30 corresponding to all the functions of the MFP 1000 on the touchscreen portion 21, moving the functional icons 30 displayed thereon horizontally or vertically in accordance with operation by a user; and thereby, displaying, on the touchscreen portion 21, functional icons 30 that have not been displayed thereon before the movement.

Referring to FIG. 3, the operational key portion 22 is provided with hard keys by means of which the user gives the MFP 1000 a command to perform basic functions thereof such as copying or faxing. The hard keys are, for example, a reset key 22a by means of which a command to reset item details of the functional icons 30 is given, a copy key 22c by means of which the use of a copy function is specified, and a numeric keypad. Another configuration is possible in which the hard keys of the operational key portion 22 are displayed on the touchscreen portion 21.

[User Interface Function]

Figure 12A:
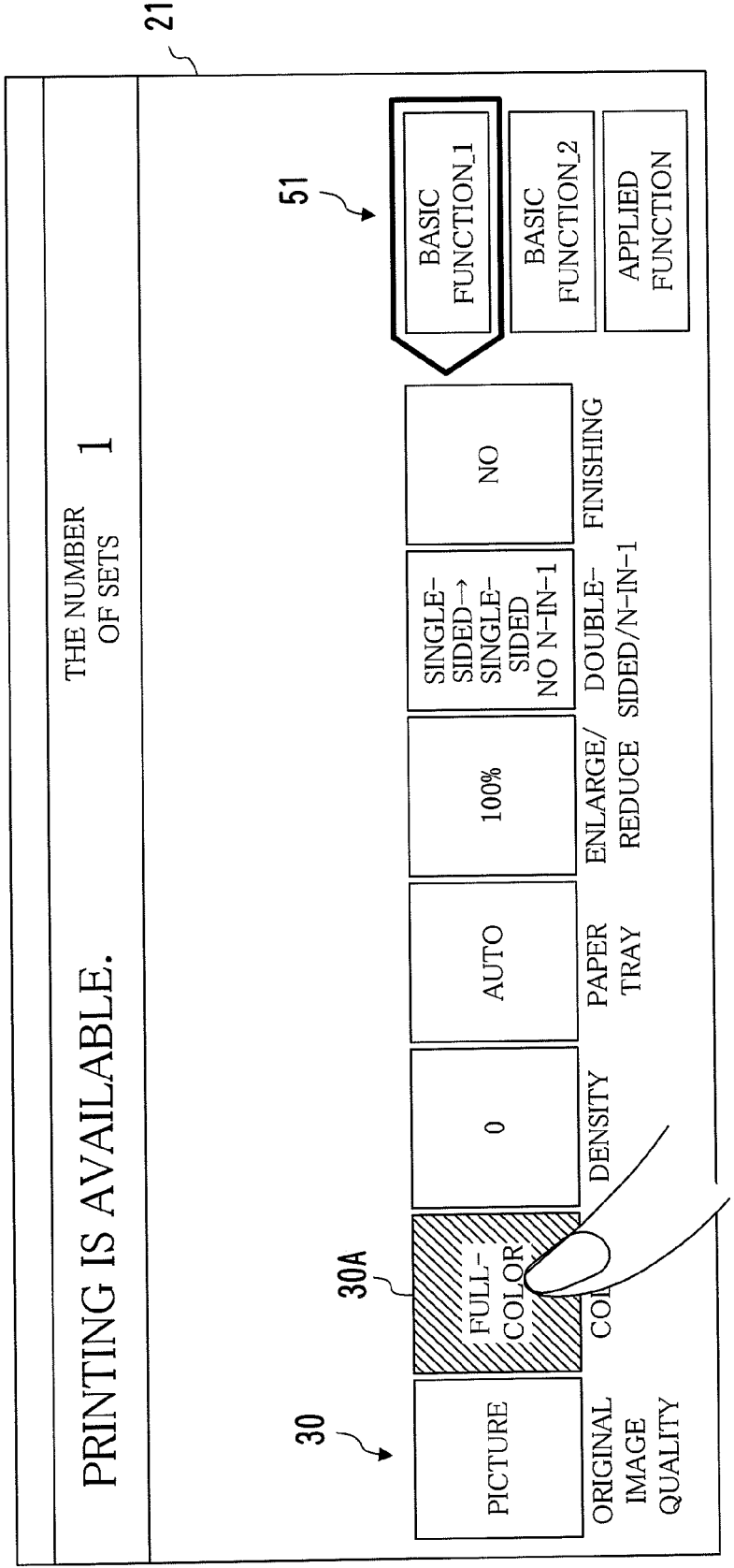
Figure 12C:
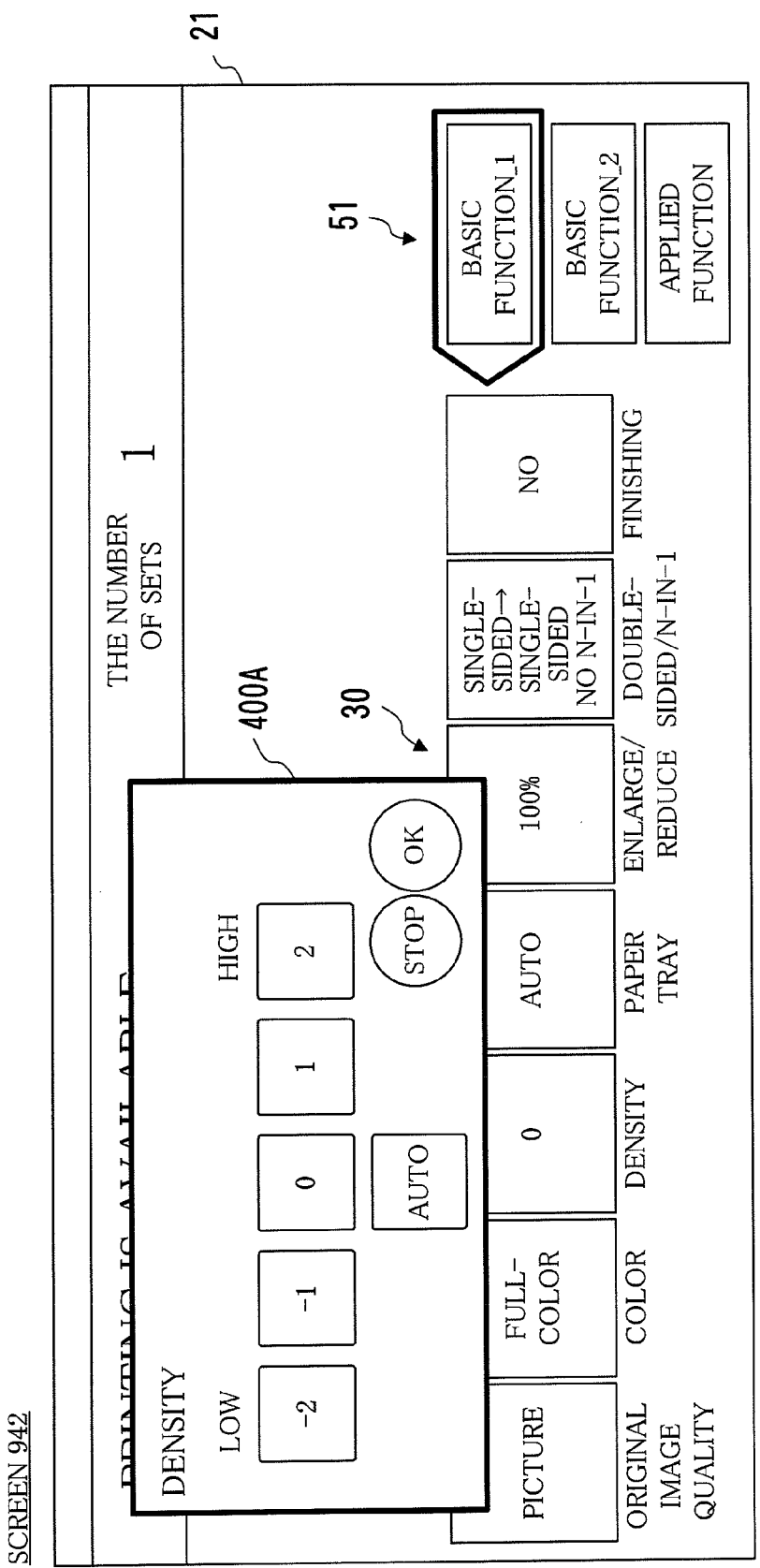
Figure 13:
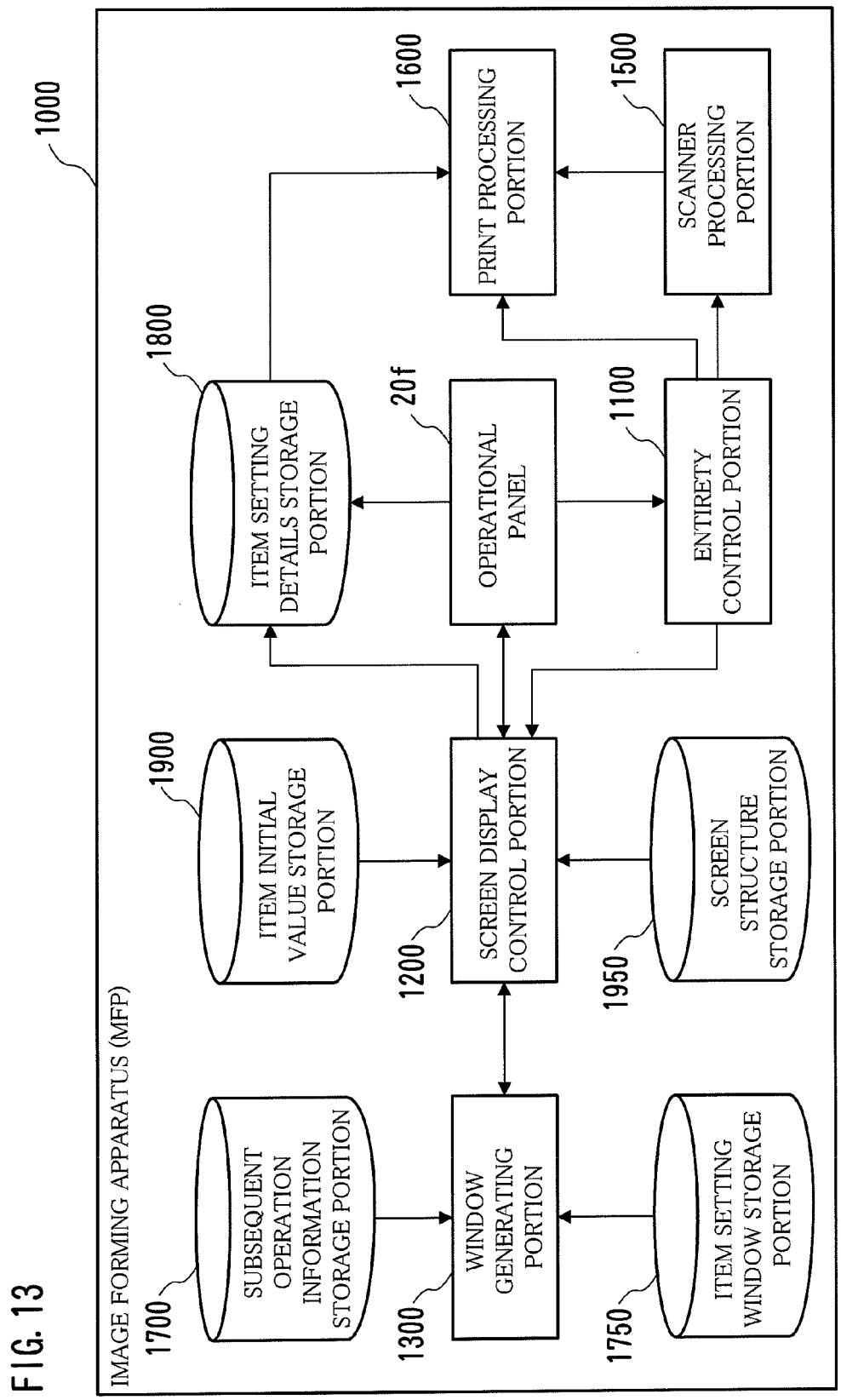
FIG. 13 is a block diagram showing an example of the functional configuration of an MFP.

Descriptions are provided below of the user interface function of the MFP 1000 with reference to FIGS. 5A to 12C, prior to giving descriptions of the functional configuration of the MFP 1000 (FIG. 13).

As functions of the MFP 1000 increase and the number of items to be set also increases, the hierarchy of pop-up windows for displaying items often becomes deeper. Stated differently, a user needs to open a plurality of pop-up windows one after another prior to reaching the target item. At this time, a pop-up window having a deeper hierarchy level is displayed in front of other windows. In other words, a pop-up window having a deep (low) hierarchy level is displayed above a pop-up window having a shallow (high) hierarchy level. The open pop-up windows are closed in order basically from the deepest pop-up window.

In addition to such item settings, the user often opens a pop-up window in order to check the current setting details. For checking the current setting details, the user repeats operation for opening a pop-up window until the target item is displayed. After checking the current setting details, the user repeats operation for closing a pop-up window.

It is therefore desirable for the user to quickly open a pop-up window where an item to be checked is displayed, quickly close windows in order from the deepest window, return to the highest-level window, and to perform subsequent operation.

Thus, the display position of a button to close a pop-up window (hereinafter, also called a "close button") is determined in such a manner to improve the flexibility in user operation for opening (displaying) or closing (disappearing) pop-up windows displayed hierarchically.

Such a close button is, for example, a "stop (cancel)" button, an "OK" button, a "confirmed" button displayed in a pop-up window. The "stop (cancel)" button is to instruct the MFP 1000 to, at the time of closing a pop-up window, remain item setting details unchanged from those at the time of opening the pop-up window. Each of the "OK" button and the "confirmed" button is to instruct the MFP 1000 to, at the time of closing a pop-up window, specify, as item setting details, those at the time of closing the pop-up window.

The MFP 1000 determines the display position of a button to close a pop-up window according to the following two methods.

The first method is to display a close button in such a position as to reduce the movement distance of user's finger for touching the operational panel 20f. According to the first method, the user can operate pop-up windows without moving his/her finger greatly.

The second method is to display a close button in such a position that erroneous operation can be prevented. A close button is displayed in such a position that a user does not press an unintended button erroneously, for example, even if he/she presses a plurality of close buttons successively to return to the highest-level window from the deepest window. Further, for example, if a touchscreen malfunctions, or if a touchscreen has excessive high-sensitivity, the MFP 1000 detects that a user has touched the screen twice even if he/she intended to touch a button only once. In view of this situation, the second method is to display a close button in such a position that the foregoing situation is prevented.

Descriptions are given below, with reference to FIGS. 5A through 9, of the first determination method, i.e., the method for determining the display position of a close button with the movement distance of user's finger reduced. The descriptions are provided by comparing the case where the first determination method is used to determine the display position of a close button with the case where the first determination method is not applied to determine the display position of a close button, i.e., a conventional example in which the display position of a close button remains unchanged.

Operational flexibility according to the conventional example is described with reference to FIGS. 5A to 6C. Operational flexibility according to an embodiment of the present invention in which the display position of a button is changed is described with reference to FIGS. 7A to 8C.

Figure 5B:
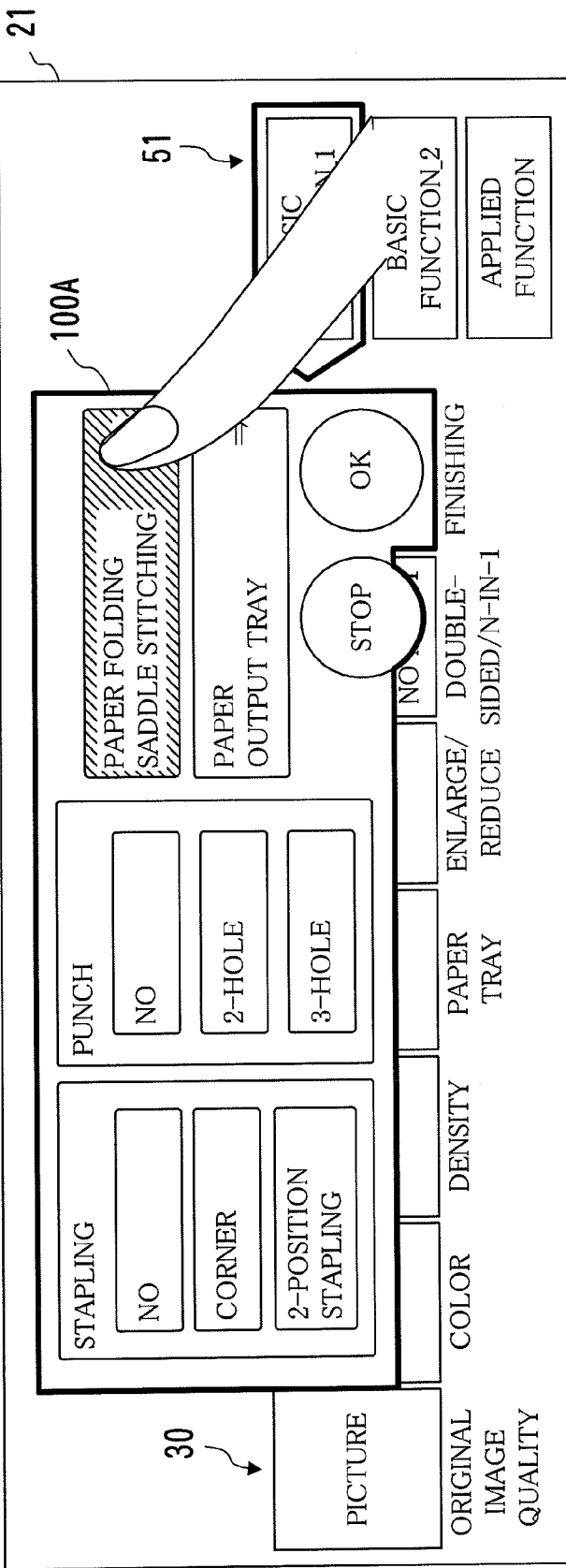
Figure 5C:
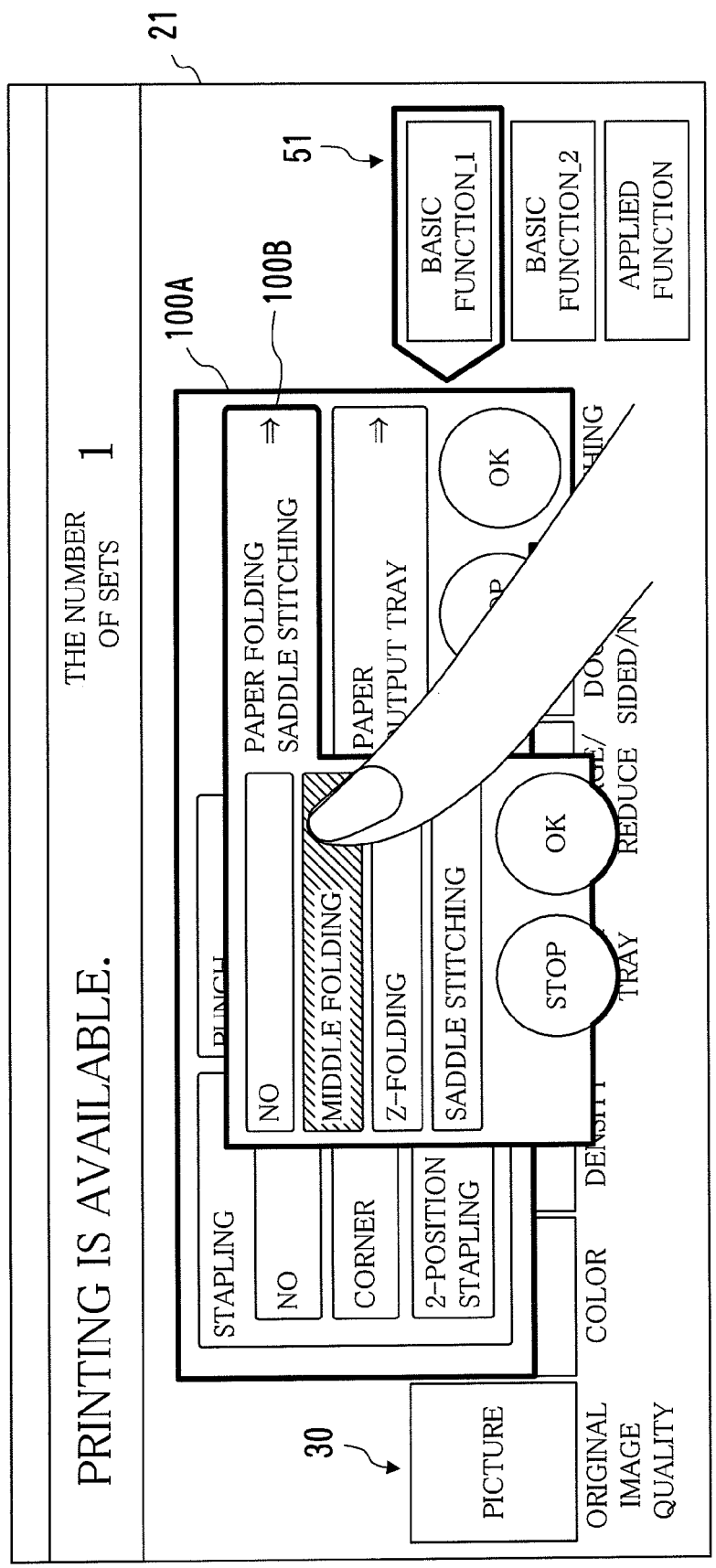

FIGS. 5A to 5C are diagrams showing an example of an item setting window 100 functioning as a pop-up window used for setting details for an item related to a "finishing" functional icon 30. Such an item is sometimes referred to as an "item for a functional icon 30" below. FIG. 5 shows transition of the indication on the touchscreen portion 21, in order from the top, i.e., a screen 901 to a screen 903. The same is similarly applied to the case of FIGS. 6A to 6C, and so on.

When a user touches the "finishing" functional icon 30 (see the hatched functional icon 30) in the screen 901 of FIG. 5A, an item setting window 100A appears as shown in the screen 902 of FIG. 5B.

When the user touches an item of "paper folding saddle stitching" in the item setting window 100A on the screen 902, an item setting window 100B is displayed above the item setting window 100A as shown in the screen 903 of FIG. 5C. From the viewpoint of hierarchy level, the item setting window 100A is a superior screen (parent screen or parent window) of the item setting window 100B, and the item setting window 100B is a subordinate screen (child screen or child window) of the item setting window 100A.

The user makes item settings by touching the item "middle folding" in the item setting window 100B on the screen 903.

Figure 6A:
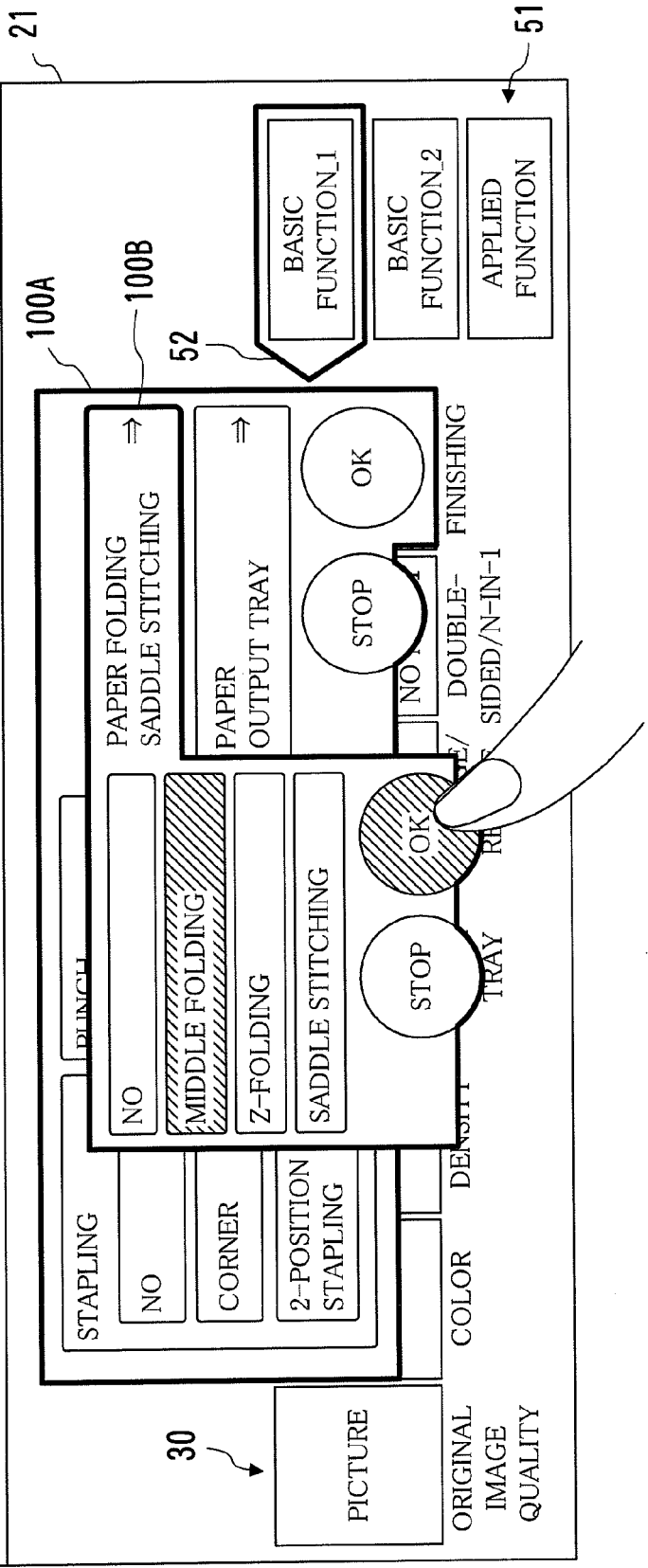
Figure 6C:
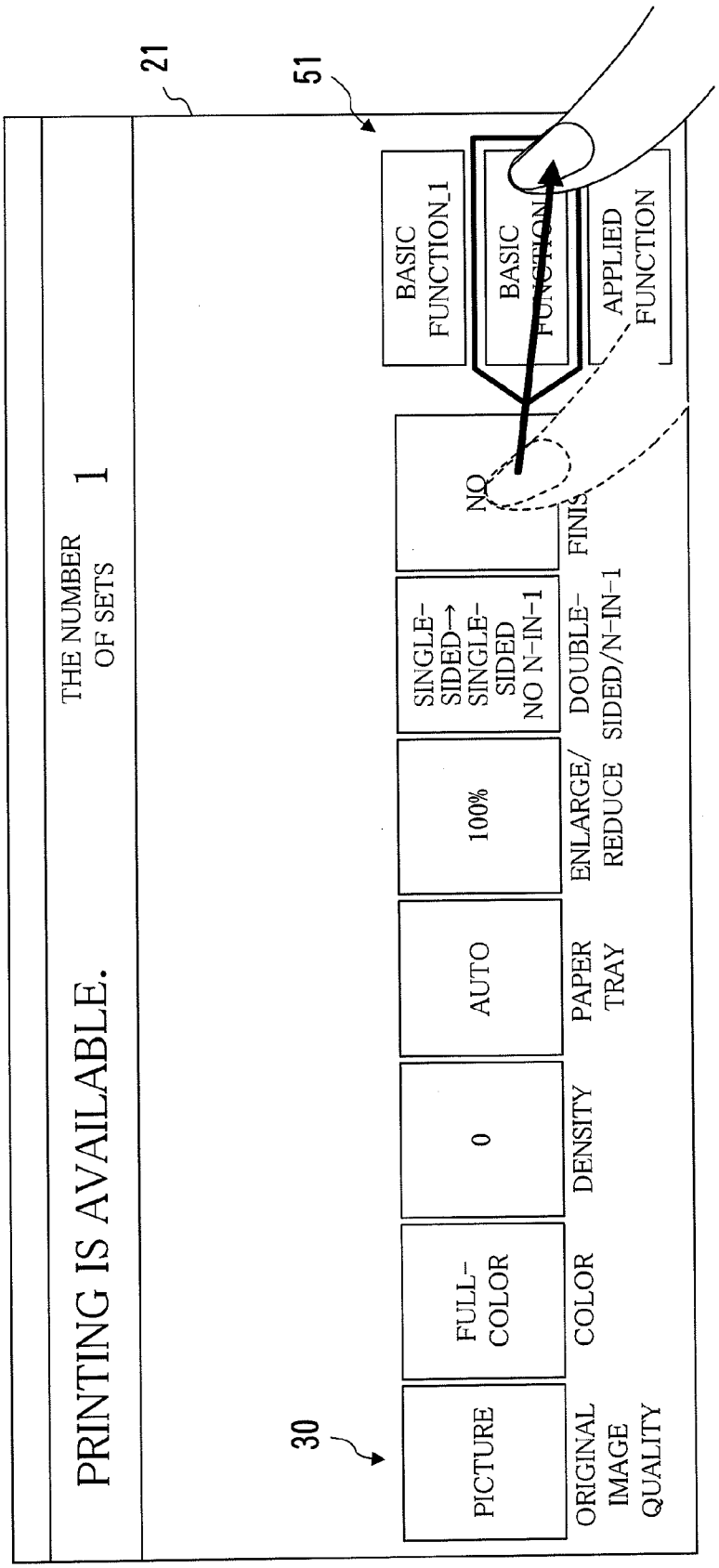

FIGS. 6A to 6C show the movement of user's finger for a case where he/she closes, from the state of the screen 903 of FIG. 5C, the item setting window 100B and the item setting window 100A, and touches the "basic function 2" switching button.

When a user touches an "OK" button (see the hatched part) of the item setting window 100B in the screen 904 of FIG. 6A, the item setting window 100B is closed as shown in the screen 905 of FIG. 6B.

Subsequently, as shown in the screen 905, the user moves his/her finger from the position at which he/she touched the "OK" button in the item setting window 100B (see the finger shown by the dotted line) to the position of the "OK" button in the item setting window 100A (see the bold arrow). Then, when the user touches the "OK" button, the item setting window 100A is closed as shown in the screen 906 of FIG. 6C.

Then, as shown in the screen 906, the user moves his/her finger from the position at which he/she touched the "OK" button in the item setting window 100A (see the finger shown by the dotted line) to the position of the "basic function_2" switching button (see the bold arrow). The user, then, touches the "basic function_2" switching button 51.

FIGS. 7A to 7C show an example of an item setting window 101 for a case where a close button is displayed at a display position determined by a determination method according to an embodiment of the present invention.

When a user touches the "finishing" functional icon 30 (see the hatched functional icon 30) in the screen 911 of FIG. 7A, an item setting window 101A appears as shown in the screen 912 of FIG. 7B.

When the user touches an item of "paper folding saddle stitching" in the item setting window 101A on the screen 912, an item setting window 101B is displayed above the item setting window 101A as shown in the screen 913 of FIG. 7C.

The user makes item settings by touching the item "middle folding" in the item setting window 101B on the screen 913.

Figure 8A:
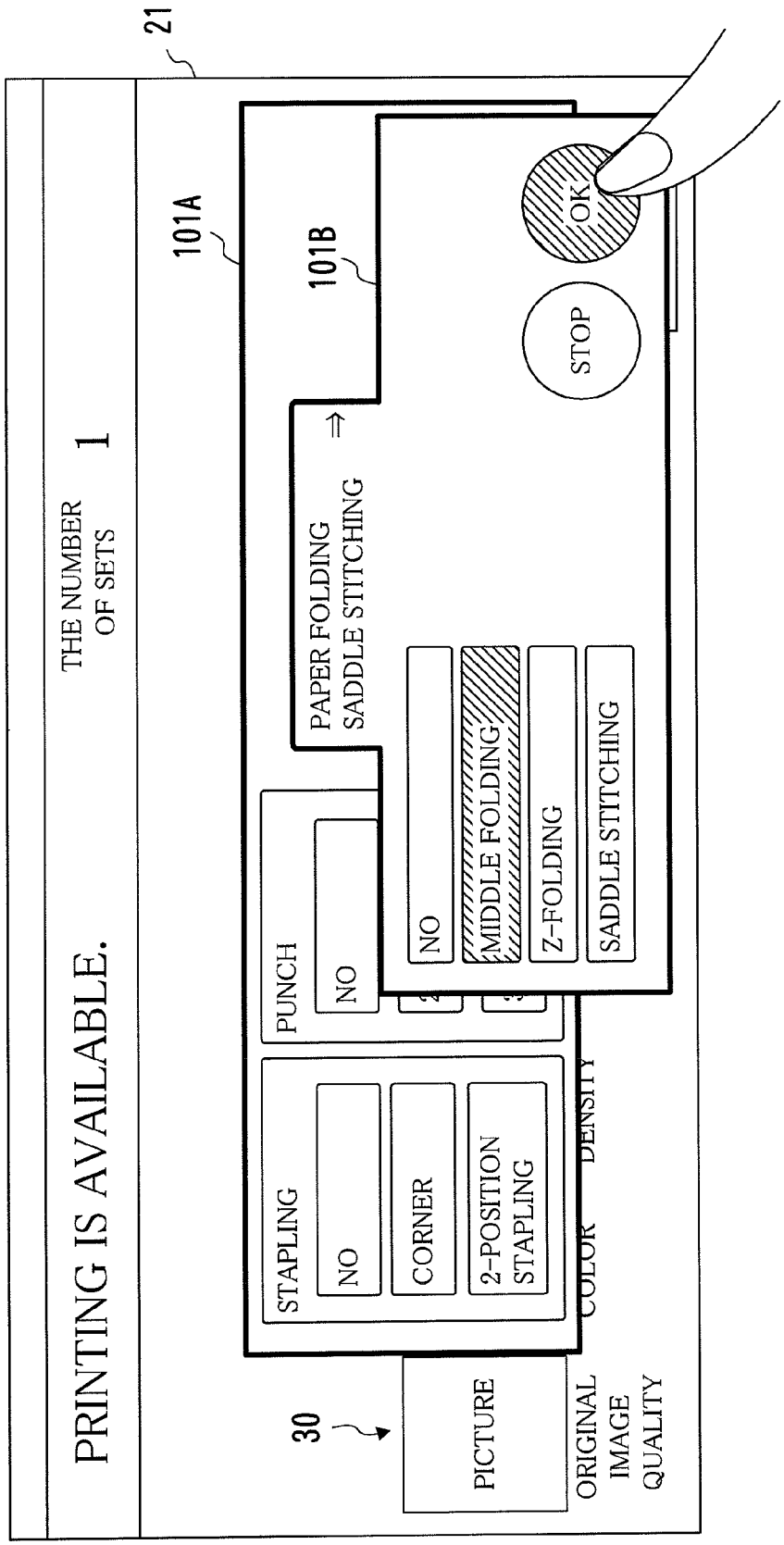
FIGS. 8A to 8C are diagrams showing the movement of user's finger for a case where he/she closes item setting windows according to an embodiment of the present invention.
Figure 8B:
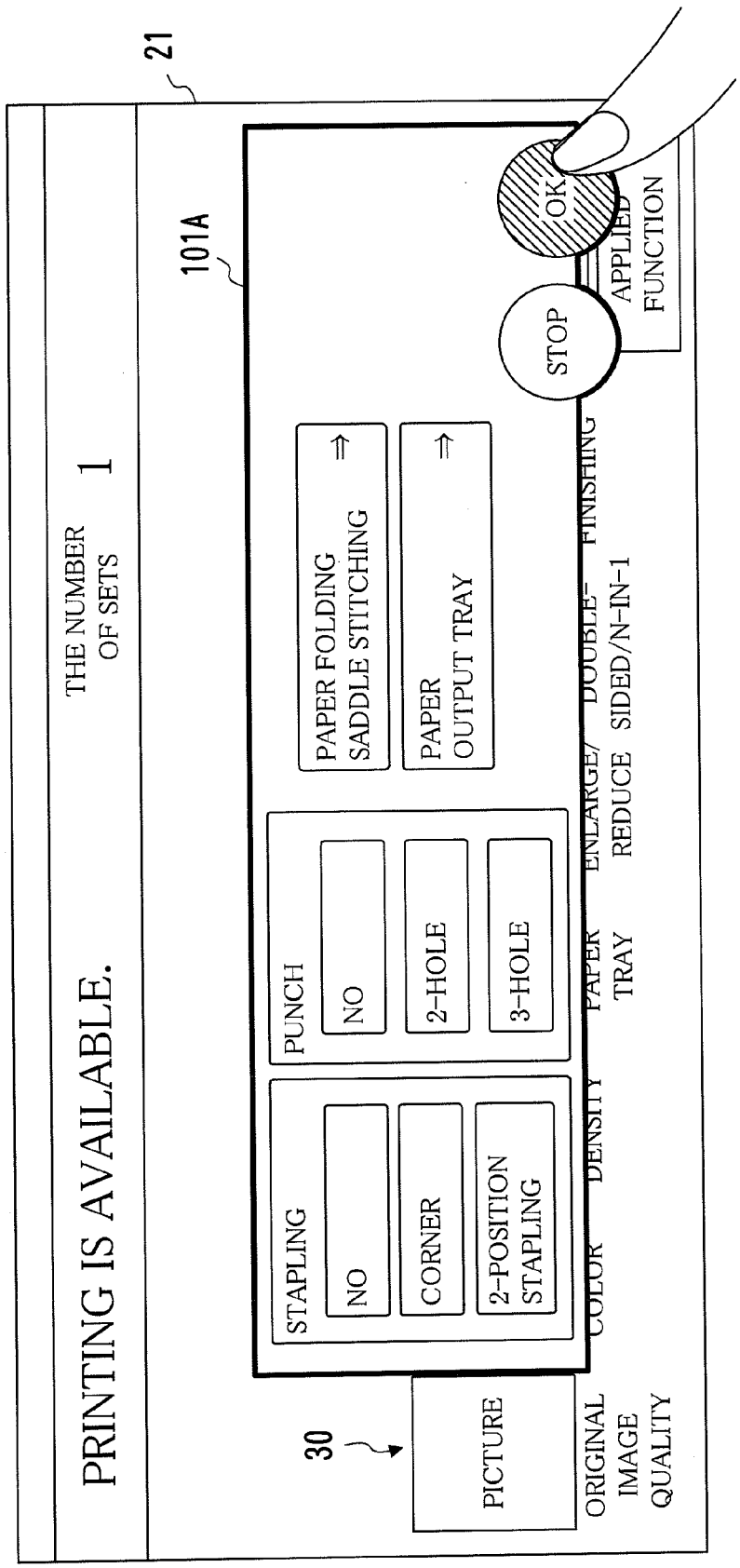
Figure 8C:
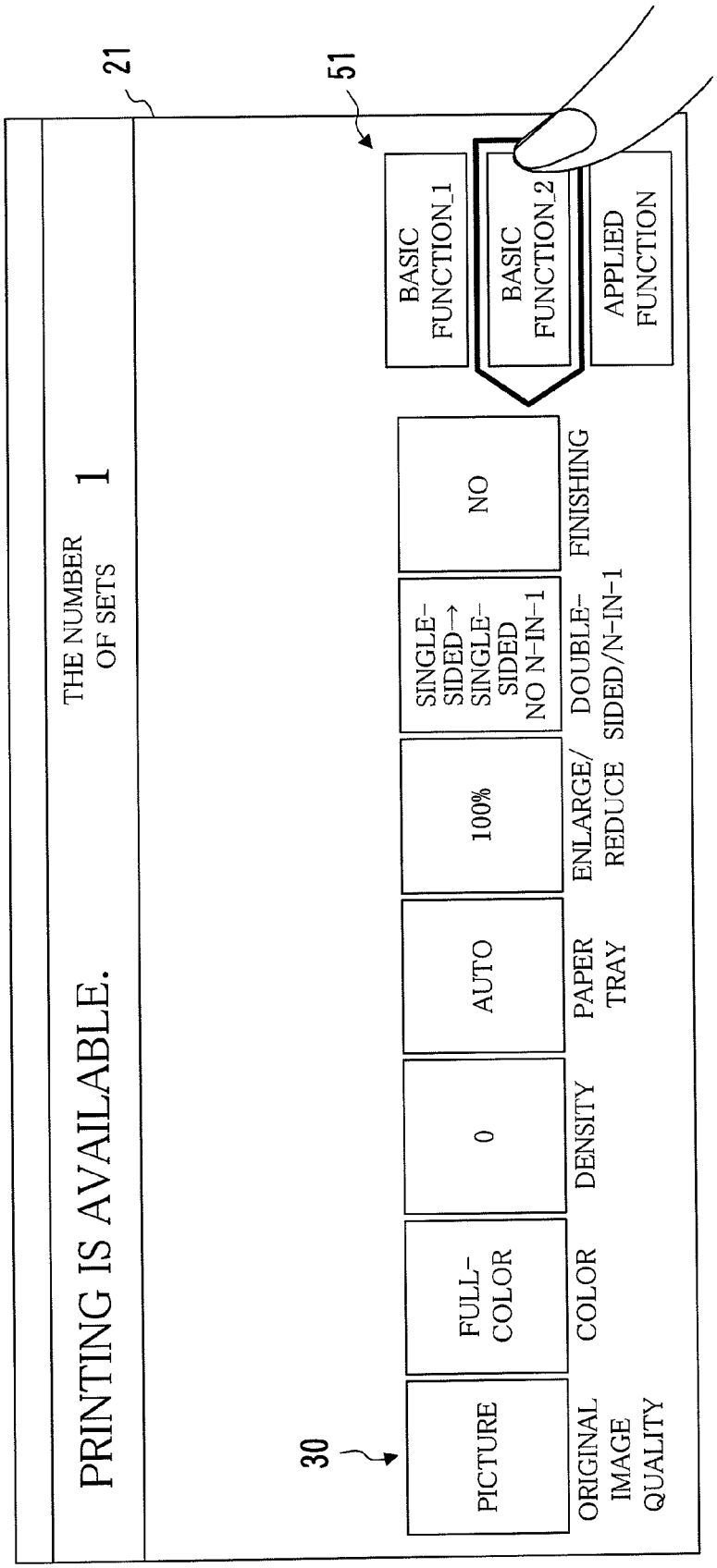

FIGS. 8A to 8C show the movement of user's finger for a case where he/she closes, from the state of the screen 913 of FIG. 7C, the item setting window 101A and the item setting window 101B related to the "finishing" functional icon 30.

When a user touches an "OK" button (see the hatched part) of the item setting window 101B in the screen 914 of FIG. 8A, the item setting window 101B is closed as shown in the screen 915 of FIG. 8B.

Subsequently, as shown in the screen 915, when the user touches the "OK" button (see the hatched part) in the item setting window 101A without moving his/her finger from the position at which he/she touched the "OK" button in the item setting window 101B, the item setting window 101A is closed as shown in the screen 916 of FIG. 8C.

Then, as shown in the screen 916, the user touches the "basic function_2" switching button without changing the position of his/her finger that touched the "OK" button in the item setting window 101A.

Figure 9:
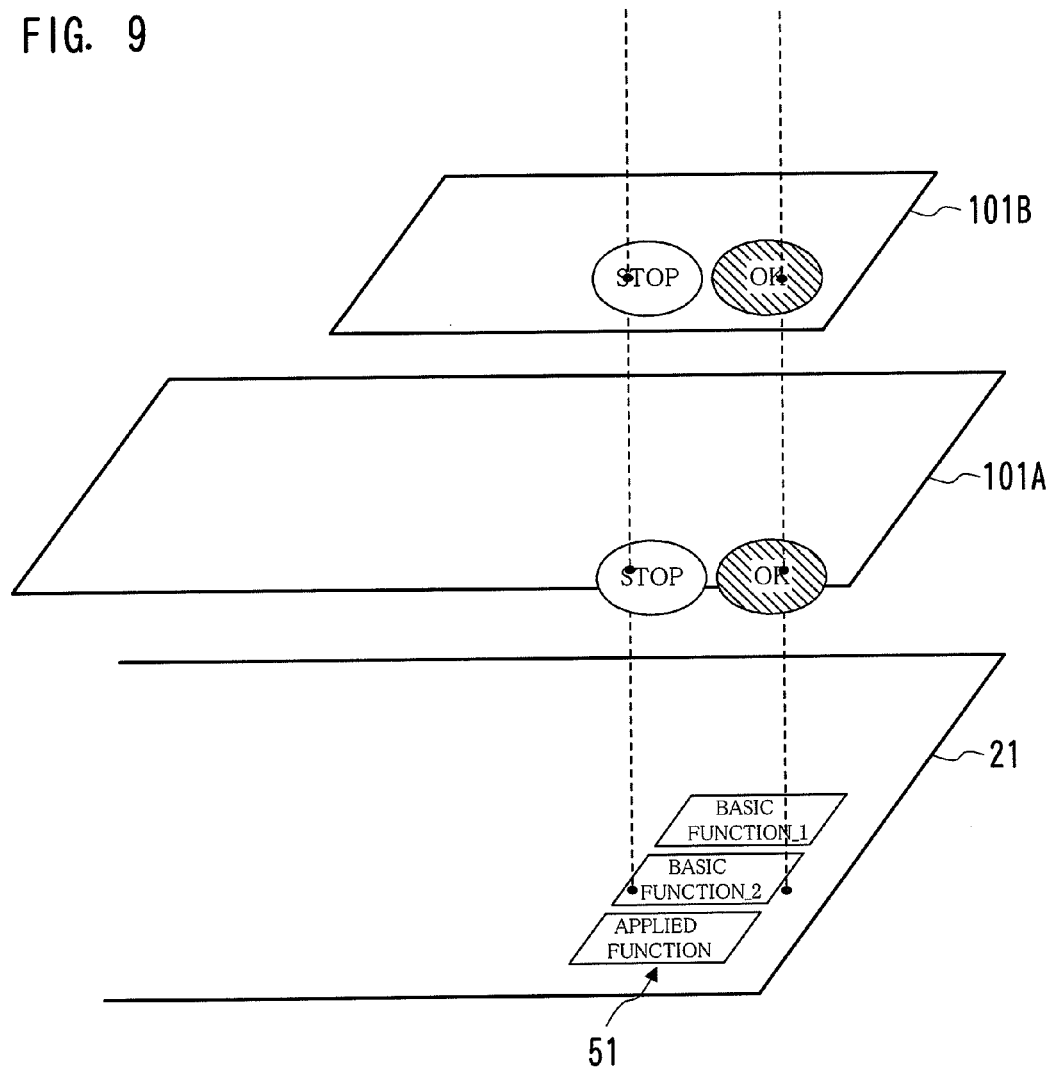
FIG. 9 is a diagram showing a case in which the positions of buttons to close pop-up windows and the position of a button presumed to be touched subsequently are displayed one above the other.

Referring to FIG. 9, buttons to close pop-up windows are displayed in a manner to overlap with a button that is presumed to be touched subsequently (see the dotted lines). This enables a user to operate pop-up windows with little movement of his/her finger. Here, the "button presumed to be touched subsequently" is a button that is presumed to be touched after the user closes the pop-up window.

To be specific, if it is presumed that a user presses the "basic function_2" switching button immediately after setting an item for the "finishing" functional icon 30, then the item setting window 101A is displayed in such a manner that a button to close the item setting window 101A, i.e., a "stop/OK" button therein, is above the "basic function_2" switching button (see the screen 914). Stated differently, the "stop/OK" button is displayed in the foreground while the "basic function_2" switching button is displayed in the background.

After the item setting window 101B is closed, if it is presumed that a user closes the item setting window 101A without touching any items, then the indication is made in such a manner that a button to close the item setting window 101B is above a button to close the item setting window 101A (see the screen 915). Stated differently, the button to close the item setting window 101B is displayed in the foreground while the button to close the item setting window 101A is displayed in the background.

FIG. 9 shows an example of displaying buttons one above the other. Instead of the illustrated example, however, the buttons may be displayed adjacent to each other, provided that the movement of user's finger is reduced.

Further, which button is to be touched subsequently may be presumed by keeping the operation history, or may be presumed depending on items to be set.

Descriptions are given below, with reference to FIGS. 10A to 11C, of the second determination method, i.e., the method for determining the display position of a close button in order to prevent erroneous operation. The descriptions are provided by comparing case where the second determination method is used to determine the display position of a close button with a case where the second determination method is not applied to determine the display position of a close button, i.e., a conventional example in which the display position of a close button remains unchanged.

Operational flexibility according to the conventional example is described with reference to FIGS. 10A to 10C. Operational flexibility according to an embodiment of the present invention in which the display position of a button is changed is described with reference to FIGS. 11A to 11C.

Figure 10B:
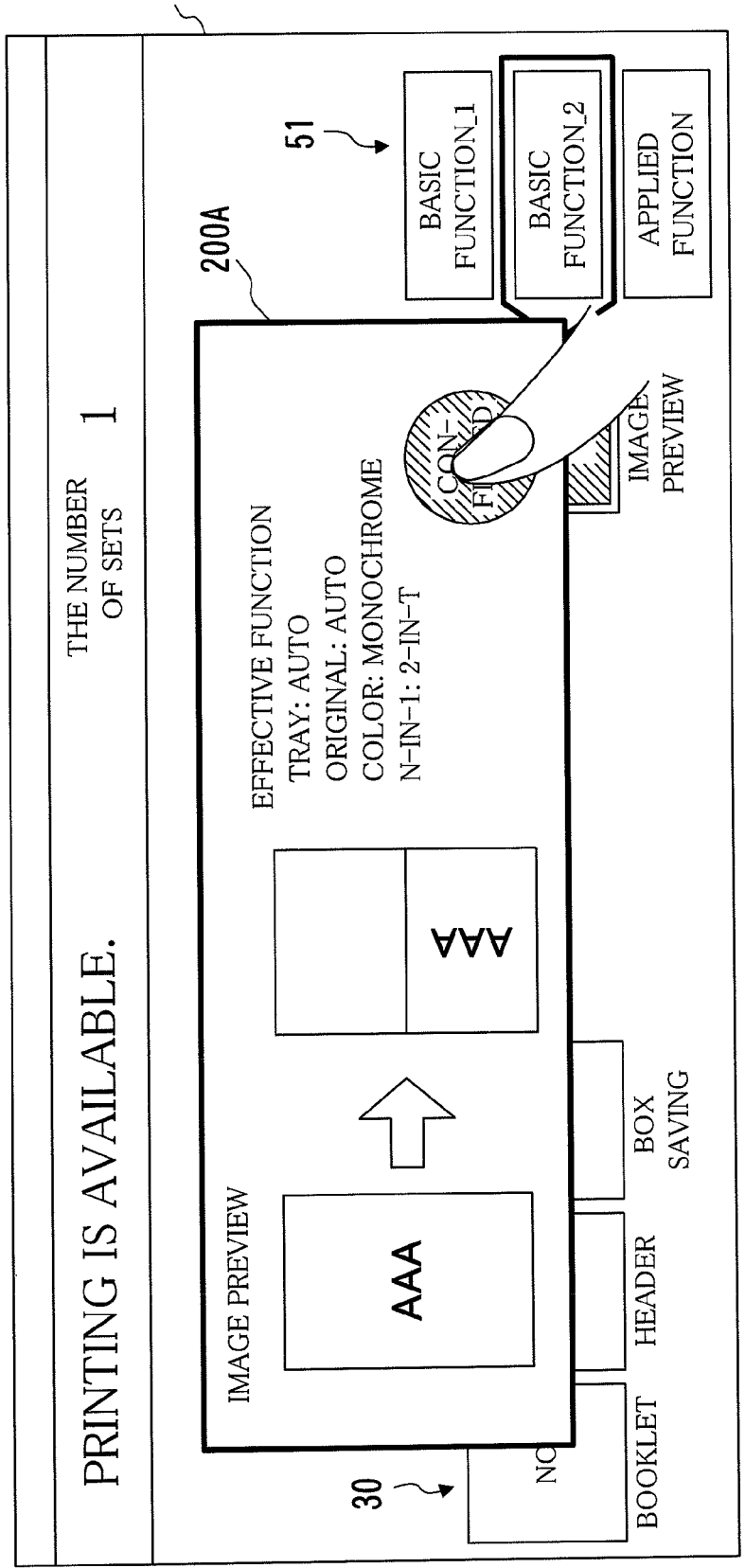

FIGS. 10A to 10C are diagrams showing an example of an item setting window 200 for displaying the details or the like of an item related to an "image preview" functional icon 30 (see the hatched part of the screen 920).

When a user touches the "image preview" functional icon 30 (see the hatched functional icon 30) in the screen 920 of FIG. 10A, an item setting window 200A appears as shown in the screen 921 of FIG. 10B.

When the user checks the image preview and set item details displayed in the item setting window 200A on the screen 921, and touches a button to close the item setting window 200A, i.e., a "confirmed" button (see the hatched part), the item setting window 200A is closed as shown in the screen 922 of FIG. 10C.

Referring to the screen 922, if the "image preview" functional icon 30 is provided below the "confirmed" button in the item setting window 200A, then it is probable that the user unintentionally touches the "image preview" functional icon 30. In such a case, the item setting window 200A is opened again.

Figure 11C:
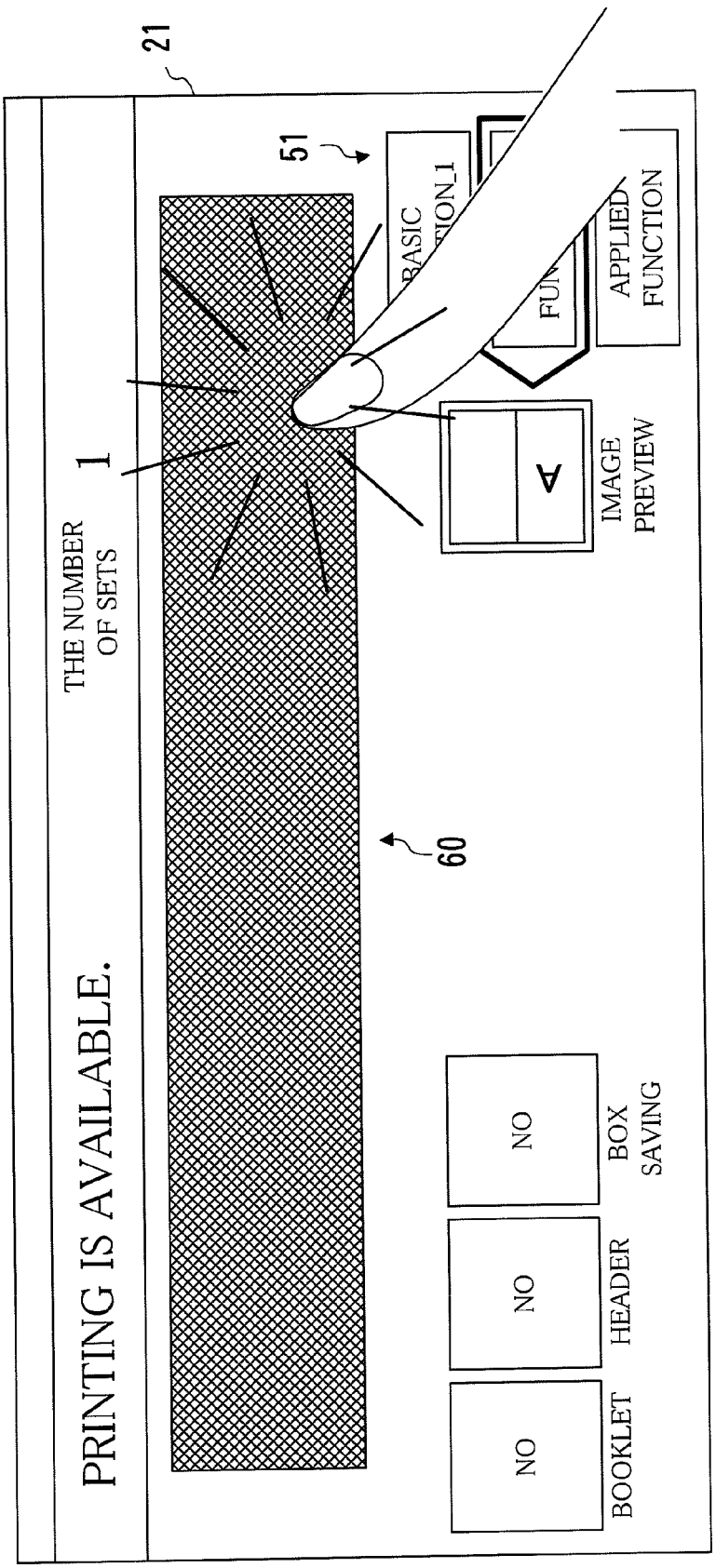

FIGS. 11A to 11C show an item setting window 201A for a case where a close button is displayed at a display position determined by the determination method according to an embodiment of the present invention.

An item setting window 201A is displayed in such a manner that a "confirmed" button in the item setting window 201A is above a non-response region 60, which is shown as a lattice-pattern rectangle in the screen 930.

Even if a user touches a certain region, the MFP 1000 does not operate in response thereto. Such a region is the non-response region 60. In the screen 930 of FIG. 11A, the non-response region 60 is a region where no functional icons 30 and no switching buttons 51 are displayed.

As shown in the screen 931 of FIG. 11B and the screen 932 of FIG. 11C, even if user's finger that touched the "confirmed" button in the item setting window 201A touches a region therebelow, the touched position corresponds to the non-response region 60 as shown in the screen 932. It is, therefore, possible to prevent erroneous operation.

FIGS. 12A to 12C show a case in which item settings for a plurality of functional icons 30 are made successively by using the first determination method described earlier, namely, the method for determining the display position of a close button with the movement distance of user's finger reduced.

As discussed earlier, FIGS. 8A to 8C show an example in which, after setting items for the "finishing" functional icon 30, a user touches the "basic function_2" switching button. FIGS. 12A to 12C show an example in which, after setting items for a functional icon 30, a user subsequently sets items for another functional icon 30.

Suppose the following case: It is presumed that, after setting items for a "full color" functional icon 30A, subsequently, a user sets items for a "density" functional icon 30B, and does not make any further settings thereafter.

When a user touches the "full color" functional icon 30A (see the hatched part) in the screen 940 of FIG. 12A, an item setting window 300A for the "full color" functional icon 30A appears as shown in the screen 941 of FIG. 12B. A "stop/OK" button in the item setting window 300A is displayed to overlap with the "density" functional icon 30B which is presumed to be touched subsequently.

The user can thus touch the "density" functional icon 30B with little movement of user's finger as shown in the bold arrow of the screen 941. It is, therefore, possible to set items for the plurality of functional icons 30 smoothly.

Then, an item setting window 400A for the "density" functional icon 30B is displayed as shown in the screen 942 of FIG. 12C. A "stop/OK" button in the item setting window 400A is displayed above a non-response region (see the non-response region 60 of FIG. 11C). The reason is that it is presumed that there are no further buttons to be touched because item settings are made only for the "full color" functional icon 30 and the "density" functional icon 30.

[Configuration]

FIG. 13 is a block diagram showing an example of the functional configuration of the MFP 1000.

FIG. 13 focuses on functional portions relating to the user interface function of the MFP 1000. The MFP 1000 is also provided with functions similar to those of an ordinary multifunction device; however, the description of these functions is omitted herein.

The MFP 1000 is configured of the operational panel 20f, an entirety control portion 1100, a screen display control portion 1200, a window generating portion 1300, a scanner processing portion 1500, a print processing portion 1600, a subsequent operation information storage portion 1700, an item setting window storage portion 1750, an item setting details storage portion 1800, an item initial value storage portion 1900, a screen structure storage portion 1950, and the like.

The CPU 20a executes programs stored in a memory such as the hard disk 20d of the MFP 1000; thereby the whole or a part of functions of the individual portions of the MFP 1000 are implemented as described below.

The entirety control portion 1100 performs overall control of the operation of the MFP 1000. The entirety control portion 1100 is operable to detect operation performed by a user on the operational panel 20f, and to perform control corresponding to the user operation. In the case, for example, where the reset key 22a (see FIG. 3) is pressed, the entirety control portion 1100 gives a reset command to a functional portion for which the reset operation is necessary, and so on.

The screen display control portion 1200 is operable to display functional icons 30, pop-up windows, and so on in the touchscreen portion 21 of the operational panel 20f. For example, when the MFP 1000 is turned ON, the screen display control portion 1200 refers to initial values stored in the item initial value storage portion 1900, and displays a screen (see FIG. 3) depending on the initial values.

The screen display control portion 1200 is also operable to display or disappear item setting windows in a hierarchical manner in accordance with a command given by a user. Stated differently, the screen display control portion 1200 stores and manages, therein, which functional icon 30 an item setting window currently displayed relates to, the display order of item setting windows, and the display positions thereof.

When receiving a "reset" command from the entirety control portion 1100, the screen display control portion 1200 resets the item details for all the functional icons 30 to the initial values stored in the item initial value storage portion 1900, and changes the item details 303 (see FIG. 3) to reflect the details indicated in the initial values.

The window generating portion 1300 is operable to determine the position at which an item setting window is displayed, the size thereof, and so on, and to generate image data on the item setting window depending on the determination. A method for determining the position and size of an item setting window is described later in the section of [Geometric arrangement of pop-up window].

In response to a command from the entirety control portion 1100, the scanner processing portion 1500 scans a drawing or the like on a paper document, generates image data thereof, and store the image data into a memory.

In response to a command from the entirety control portion 1100, the print processing portion 1600 prints an image onto paper based on the image data stored in the memory.

For example, when detecting that a "start" key of the operational key portion 22 has been pressed, the entirety control portion 1100 instructs the scanner processing portion 1500 and the print processing portion 1600 to perform a copy process. In response to the instructions, the scanner processing portion 1500 scans text or the like on a paper document, generates image data thereof, and conveys the generated image data to the print processing portion 1600 through the memory, and the print processing portion 1600 prints an image onto paper based on the received image data.

The subsequent operation information storage portion 1700 is operable to store, therein, information on operation that is presumed to be performed subsequently by a user. The window generating portion 1300 determines the position at which an item setting window is to be disposed, or the like based on the information stored in the subsequent operation information storage portion 1700. Descriptions of the information are provided below in the section of [Data].

The item setting window storage portion 1750 is operable to store, therein, image data serving as the basis of an item setting window. Descriptions of the image data are provided below in the section of [Geometric arrangement of pop-up window].

The item setting window storage portion 1750 stores image data for item setting window in association with a button to open a pop-up window or the like. The item setting window storage portion 1750 stores image data for item setting window in association with a button to open an item setting window, e.g., a functional icon 30 or a switching button 51, or items in the item setting window.

The item setting details storage portion 1800 is operable to store item details set by a user by touching a functional icon 30, item details automatically set, and so on. The item details automatically set are item details that the MFP 1000 changes automatically depending on the item details set by the user. The item details stored in the item setting details storage portion 1800 are referred to by the print processing portion 1600, for example, when the print processing portion 1600 performs a print process.

The item initial value storage portion 1900 is operable to store, therein, the initial values of item details of the functional icons 30. The initial values herein mean setting details of the functional icons 30 at a time when the MFP 1000 starts up.

The screen structure storage portion 1950 is operable to store, therein, the structure of screens displayed in the touchscreen portion 21. To be specific, the screen structure storage portion 1950 stores, therein, the structure of screens displayed in the touchscreen portion 21 when the individual switching buttons 51 are selected. For example, the screen structure storage portion 1950 stores the structure in which seven functional icons 30 such as an "original image quality" functional icon 30 and a "color" functional icon 30, three switching buttons 51, and the message region 50 are displayed (see FIG. 4A) when the "basic function_1" switching button 51 is selected. The screen structure storage portion 1950 also stores, therein, information necessary for display, e.g., positions, colors, and so on.

The screen structure storage portion 1950 is operable to store, therein, the structure of screens displayed in the touchscreen portion 21. To be specific, the screen structure storage portion 1950 stores, therein, the structure of screens displayed in the touchscreen portion 21 when the individual switching buttons 51 are selected. For example, the screen structure storage portion 1950 stores the structure in which seven functional icons 30 such as an "original image quality" functional icon 30 and a "color" functional icon 30, three switching buttons 51, and the message region 50 are displayed (see FIG. 4A) when the "basic function_1" switching button is selected. The screen structure storage portion 1950 also stores, therein, information necessary for display, e.g., positions, colors, and so on.

Descriptions are provided below, with reference to FIG. 14, of data used when the MFP 1000 implements the user interface function.

FIG. 14 is a diagram showing an example of the structure and details of a subsequent operation information table 1700.

The subsequent operation information storage portion 1700 stores, therein, the subsequent operation information table 1710 in advance.

The subsequent operation information table 1710 is a table in which a pop-up window to be displayed is associated with operation performed by a user after he/she closes the pop-up window, i.e., a button to be touched by him/her after he/she closes the pop-up window.

The subsequent operation information table 1700 is created in advance, for example, by an administrator of the MFP 1000.

To be specific, if a user closes an item setting window and there is any other button to be touched subsequently, then a button to close the item setting window is associated with a button to be touched subsequently or the like. Note that the button to be touched subsequently does not include a close button.

Alternatively, when a user closes an item setting window, if there is no button to be touched subsequently, and if there is a parent window, then a button to close the item setting window is associated with a button to close the parent window. Yet alternatively, when a user closes an item setting window, if there is no button to be touched subsequently, and if there is no parent window, then a button to close the item setting window is associated with a non-response region (see the non-response region 60 of FIG. 11C).

The "button to be touched subsequently" is estimated based on item details settable in that item setting window. For example, it is presumed that after an item for the "color" functional icon 30 is set, an item for a "density" functional icon 30 is probably set. In such a case, a button to close a "color" item setting window is associated with the "density" functional icon 30.

The details of the subsequent operation information table 1710 may be created as discussed below, instead of being created by the administrator or the like. To be specific, the MFP 1000 automatically keeps the operation history, and creates the subsequent operation information table 1710 automatically by associating operation that has been often performed successively with each other. Yet alternatively, the administrator or the like may create the subsequent operation information table 1710 by associating operation desirable to be performed successively with each other.

The window generating portion 1300 determines, with reference to the subsequent operation information table 1710, the size and position of a window to be generated in such a manner that a button to be touched subsequently by a user and a button to close the window to be generated are displayed one above the other, and generates image data in accordance with the determination.

The subsequent operation information table 1710 includes a number 1711, a parent window 1712, and a child window 1713. Each of the parent window 1712 and the child window 1713 contains a window identifier and a button.

The number 1711 is the number of a record registered in the subsequent operation information table 1710.

The "window identifier" of the parent window 1712 indicates an identifier for identifying a parent window. In the illustrated example, the name of a function identified by a functional icon 30 is indicated as the "window identifier".

The "button" of the parent window 1712 is an item or button displayed in the subject parent window, and indicates an item or button to be displayed to overlap with a button to close a child window.

In some records, the "window identifier" of the parent window 1712 is denoted by "-" which means that no parent window is displayed, i.e., an item or button denoted in the "button" of the parent window 1712 is displayed in the highest-level window.

The "window identifier" of the child window 1713 indicates an identifier for identifying a child window.

The "button" of the child window 1713 indicates a button to close the subject child window, which means that the button is to be displayed to overlap with a "button" of the parent window 1712.

A "non-response region" specified in the "button" represents a non-response region (see the non-response region 60 of FIG. 11C).

For example, referring to a record specified as "1" in the number 1711, the "window identifier" and the "button" of the child window 1713 are "paper folding saddle stitching" and a "stop/OK button" respectively, and the "window identifier" and the "button" of the parent window 1712 are a "finishing icon" and a "stop/OK button" respectively. Suppose that, for example, when an item setting window for a "paper folding saddle stitching" functional icon 30 is displayed, an item setting window for a "finishing icon" functional icon 30 is displayed as a parent window. In such a case, the item setting window for the "paper folding saddle stitching" functional icon 30 is displayed in such a manner that the "stop/OK" button in the item setting window is displayed to overlap with a "stop/OK" button in the parent window, namely, in the item setting window for the "finishing icon" functional icon 30 (see the screen 914 of FIG. 8A).

[Geometric Arrangement of Pop-Up Window]

The following is a description as to how the window generating portion 1300 determines the position at which a pop-up window is to be disposed, with reference to FIGS. 15A to 19C.

A conventional example of a geometric arrangement of a window is described with reference to FIGS. 15A to 15C. A geometric arrangement of a window according to an embodiment of the present invention is described with reference to FIGS. 16A to 19C.

The screen 950 of FIG. 15A is a screen for a case where the "basic function_1" switching button is selected. The coordinate axes (X, Y) of the touchscreen portion 21 are also shown therein. The coordinates represented in the coordinate system are hereinafter called screen coordinates.

The screen coordinates (x1, y1) of the screen 950 are coordinates serving as the reference for the case of displaying a pop-up window, i.e., the reference coordinates. The reference coordinates may be defined for each pop-up window, or may be common to all pop-up windows. The reference coordinates may be changed depending on the hierarchy level of a pop-up window.

Figure 15B:
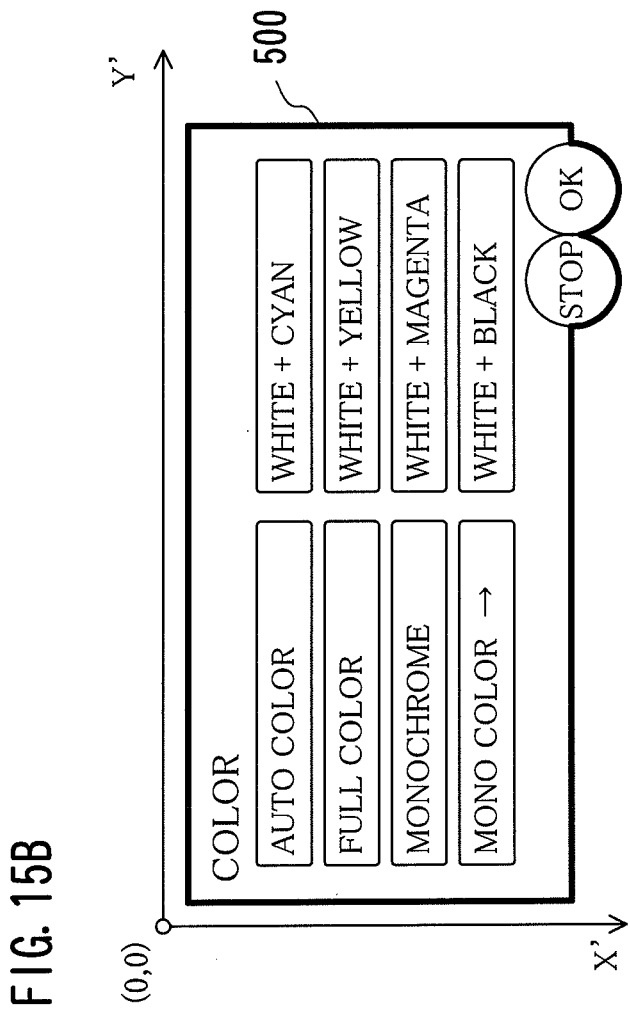

An item setting window 500 of FIG. 15B is an item setting window for the "color" functional icon 30, and the coordinate axes (X', Y') are also indicated in the drawing. As shown in the item setting window 500, the item setting window 500 has its own coordinate system, and other item setting windows have their own coordinate systems. The coordinates represented in such a coordinate system are hereinafter called local coordinates. Further, it is assumed that the item setting window for the "color" functional icon 30 is simply called a "color item setting window". The same is similarly applied to the other functional icons 30.

The MFP 1000 has the following two display modes: A mode corresponding to an embodiment of the present invention in which a display position of a close button is changed; and a mode corresponding to the conventional technique in which a display position of a close button is not changed. In the description, the former is called an automatic change mode, and the latter is called a normal mode. The MFP 1000 is such configured that any one of the two modes is selected in accordance with the setting made by a user.

The item setting window storage portion 1750 (see FIG. 13) stores, therein, image data on, for example, the item setting window 500 corresponding to the normal mode.

Figure 15C:
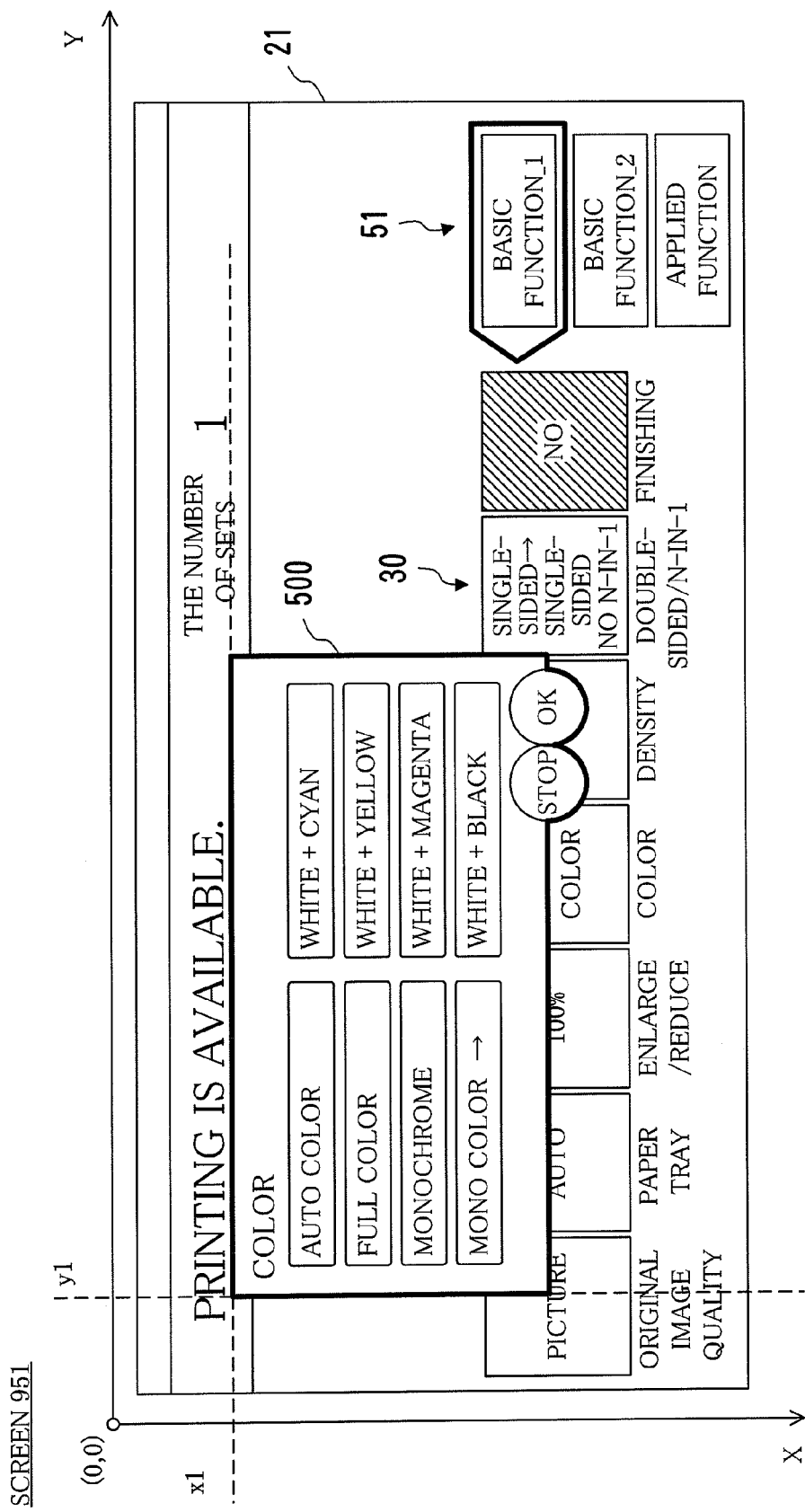

The screen 951 of FIG. 15C is a screen displaying the item setting window 500 of which the local coordinates (0, 0) correspond to the position of the screen coordinates (x1, y1) of the screen 950. The "stop/OK" button on the item setting window 500 is displayed above (in front of) the "density" functional icon 30. This is because, in the normal mode, image data on the item setting window 500 stored in the item setting window storage portion 1750 is displayed as-is on the touchscreen portion 21.

FIG. 16B shows an example of a "color" item setting window 501 according to an embodiment of the present invention (automatic change mode).

Figure 16A:
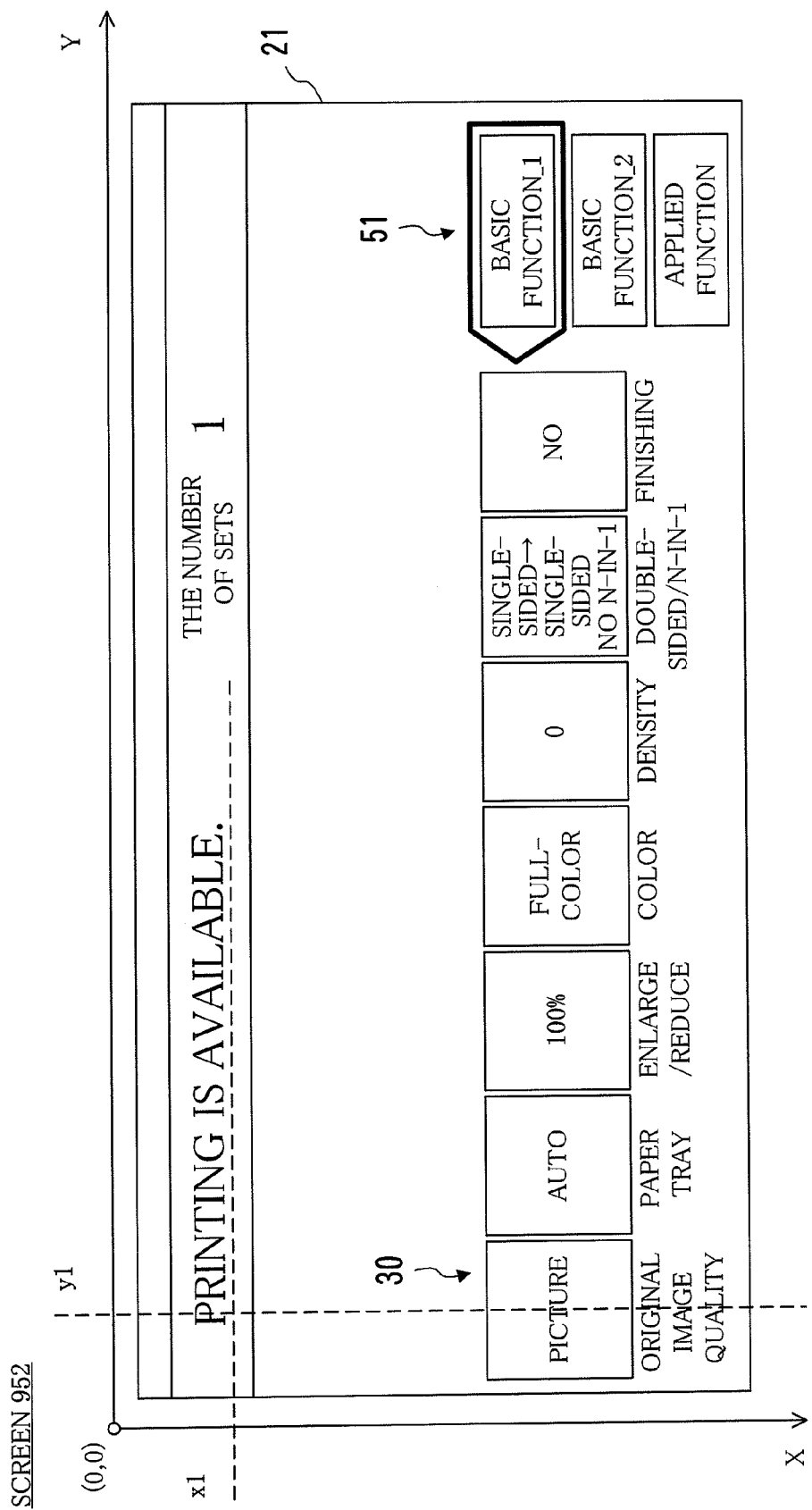

The screen 952 of FIG. 16A is similar to the screen 950 shown in FIG. 15A.

The size of the item setting window 501 is large by "y2" in the Y' axis direction as compared to that indicated in the image data on the item setting window 500 (see FIG. 15B) stored in the item setting window storage portion 1750. Hereinafter, image data on an item setting window stored in the item setting window storage portion 1750 is called "original image data".

The screen 953 of FIG. 16C is a screen displaying the item setting window 501 of which the local coordinates (0, 0) is adjusted to the position of the screen coordinates (x1, y1) of the screen 952. The item setting window 501 is displayed in such a manner that the "stop/OK" button therein is displayed above the "finishing" functional icon 30.

The MFP 1000 refers to the subsequent operation information table 1710, generates image data in which the size of the "color" item setting window 501 is changed, and shows a display accordingly.

To be specific, referring to a record specified as "color" in the "window identifier" of the child window 1713, if "finishing icon" is set as the "button" of the parent window 1712 of that record, the position at which the item setting window 501 is disposed, the size thereof, and the like are determined in such a manner that the "stop/OK" button in the item setting window 501 is displayed above the "finishing" functional icon 30 (see the hatched part of the screen 953).

In this example, the position of the "stop/OK" button is shifted without changing the reference point (x1, y1) on the screen coordinates for displaying a pop-up window. Thereby, the "stop/OK" button in the item setting window 501 is overlapped with the "finishing" functional icon 30.

As just described, the reference point on the screen coordinates is not changed. This is because the unchanged positions of items on the item setting window in the screen coordinates make it easy for a user to find a target item in many cases. For example, when the indication is made in which only a button to close the "color" item setting window is shifted (see the screen 953), the item "automatic color" is always displayed around the upper left of the touchscreen portion 21. When the positions of items are not changed in this way, the work to look for an item is unnecessary.

The item setting window 501 shown in the screen 952 and the screen 953 is longer in the Y-axis direction than that of the original data. Instead of this arrangement, however, the position of a close button may be changed depending on the position of a functional icon 30 or the like that is presumed to be touched subsequently. For example, if it is presumed that after a user sets an item on the "color" item setting window, he/she touches a "paper tray" functional icon 30, then the position of a "stop/OK" button is changed with the size of the item setting window 501 remaining unchanged.

Figure 17A:
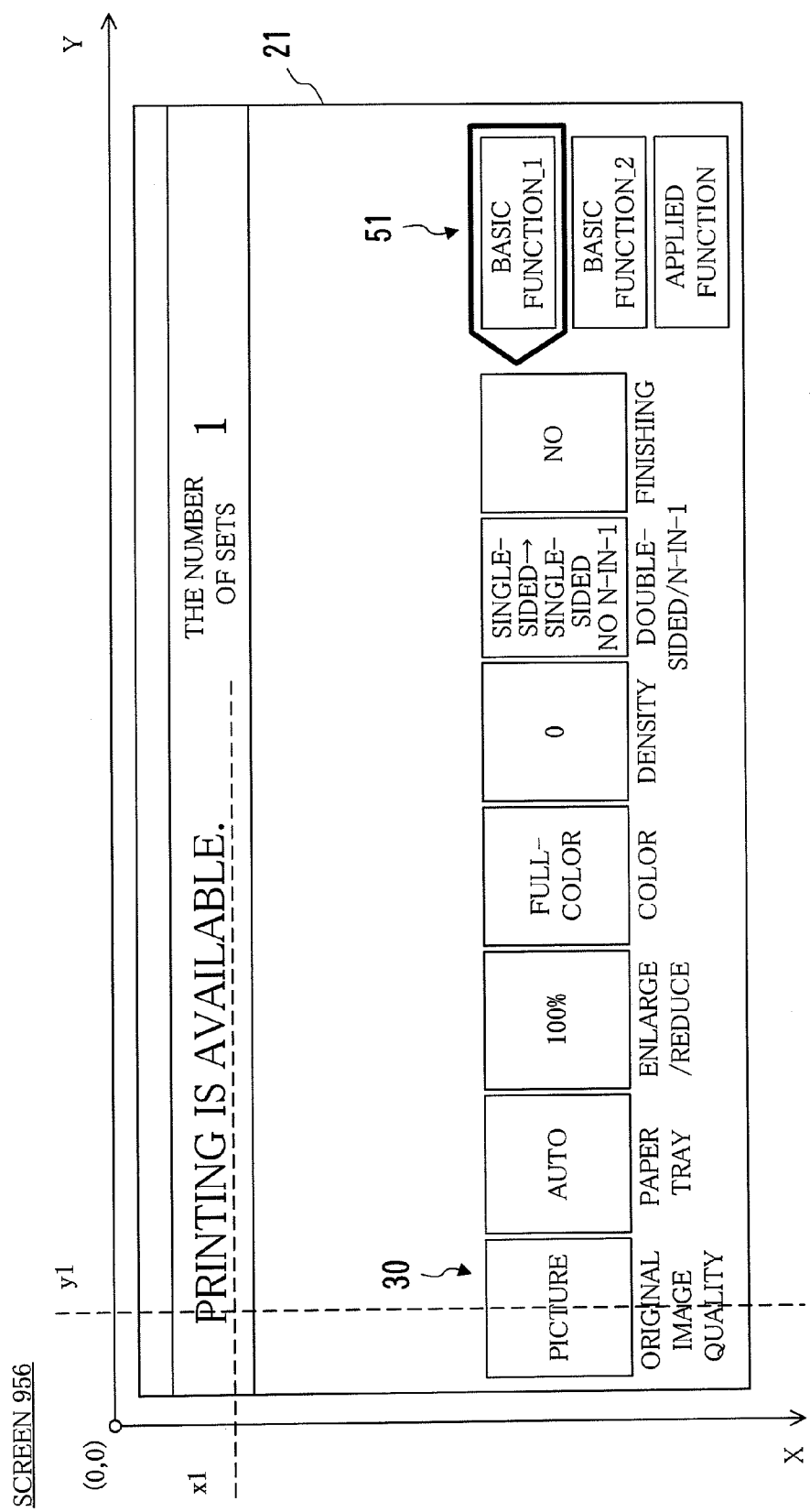
Figure 17C:
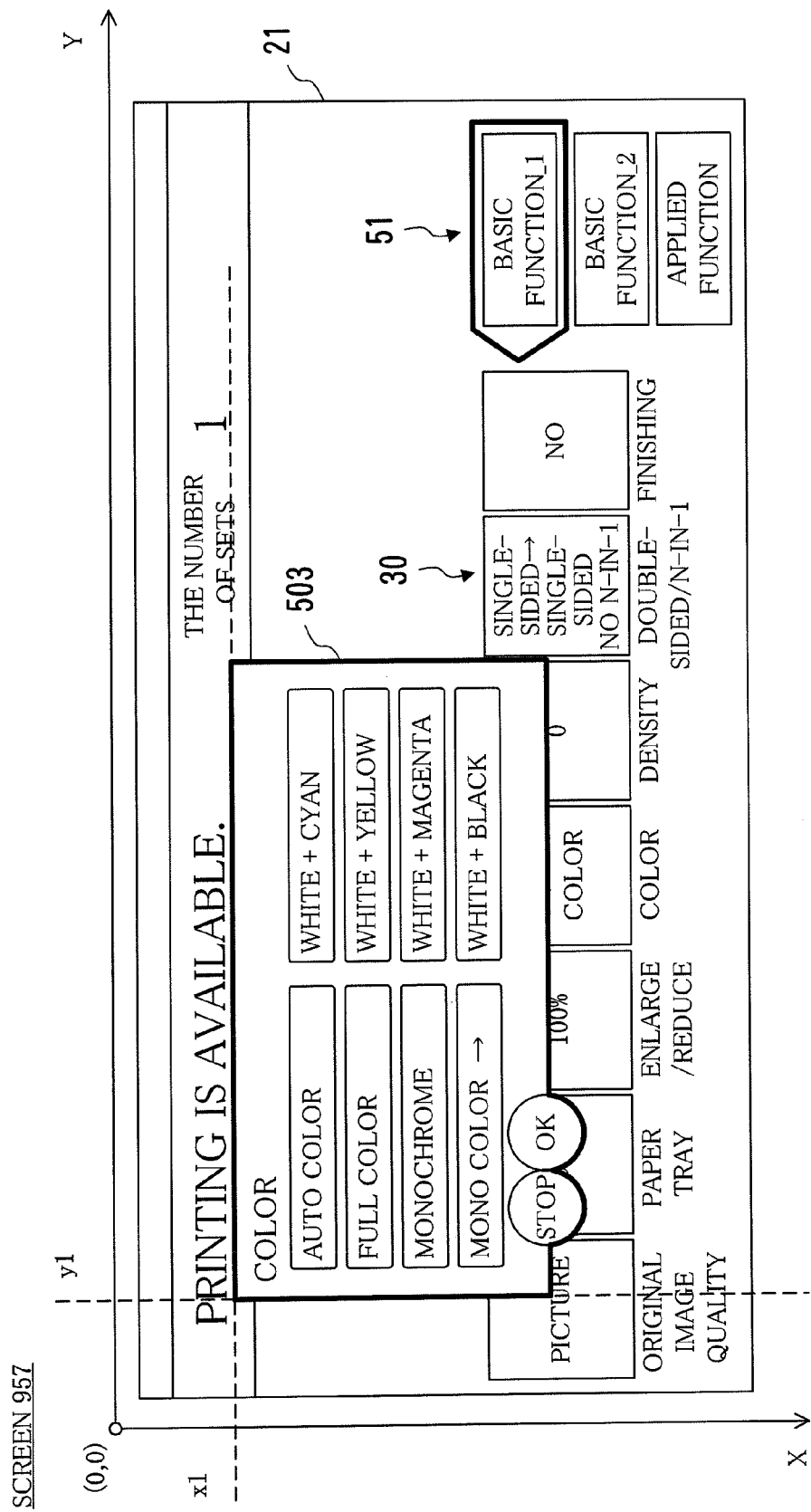

FIGS. 17A to 17C show an example of a "color" item setting window 503 according to an embodiment of the present invention (automatic change mode).

The screen 956 of FIG. 17A is similar to the screen 950 shown in FIG. 15A.

The size of the item setting window 503 of FIG. 17B is the same as that of the original data, and the position of a "stop/OK" button in the item setting window 503 is changed as compared to that of the original data.

The screen 957 of FIG. 17C is a screen displaying the item setting window 503 of which the local coordinates (0, 0) correspond to the screen coordinates (x1, y1) of the screen 956. The item setting window 503 is displayed in such a manner that the "stop/OK" button therein is displayed above the "paper tray" functional icon 30.

Another configuration is possible in which the "stop/OK" button in the item setting window 500 is displayed above the "finishing" functional icon 30 which is presumed to be touched subsequently, by changing the reference point without changing the size of the item setting window 500. Since the overall structure of the item setting window 500, e.g., the size thereof, is not changed, it is sometimes a case where a user easily uses the item setting window 500 depending on the structure thereof. Accordingly, it is possible to determine, for each item setting window, whether only the position of a close button of the item setting window is changed, or the geometric arrangement of the item setting window itself is changed.

Figure 18A:
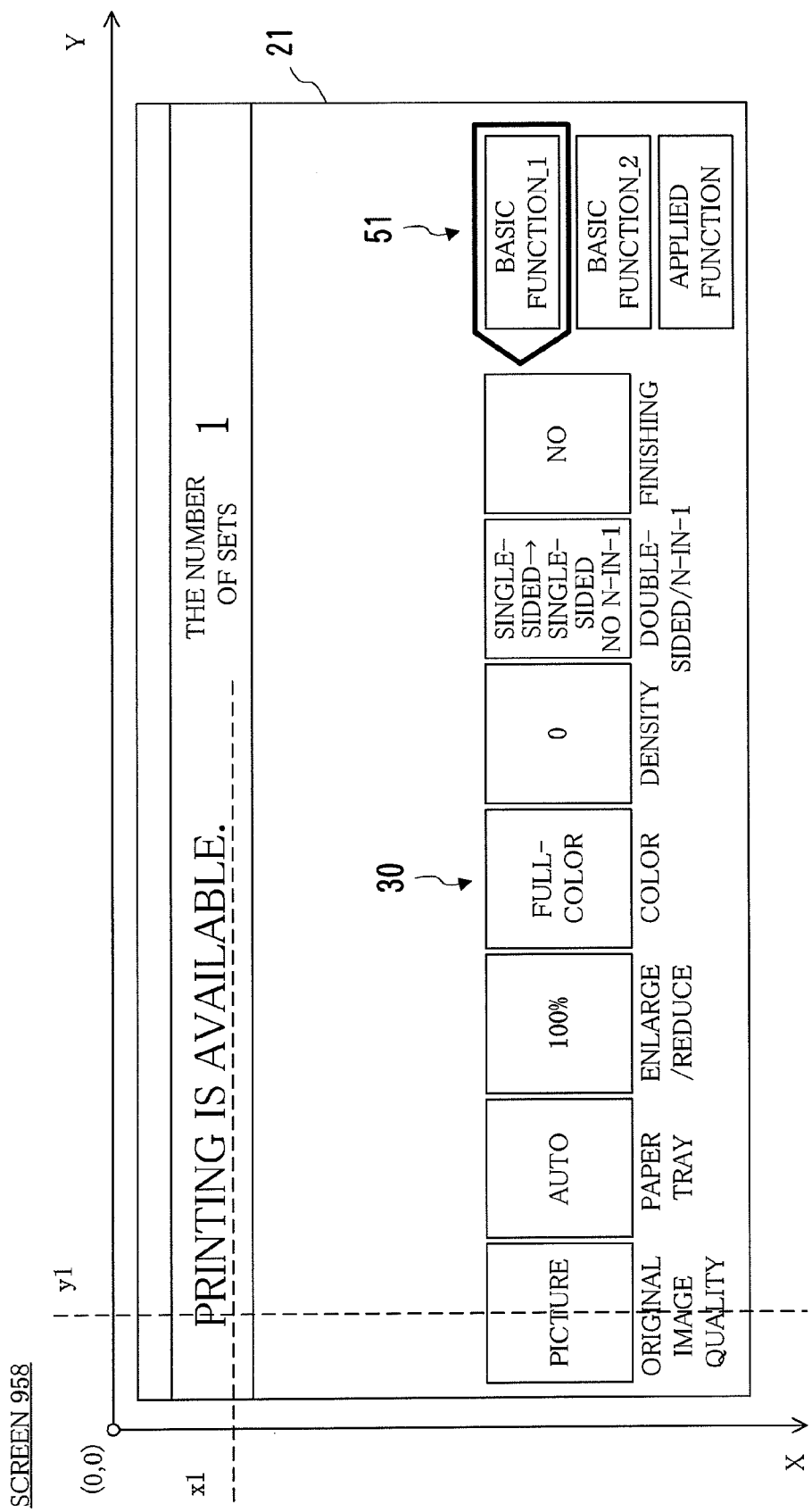
Figure 18B:
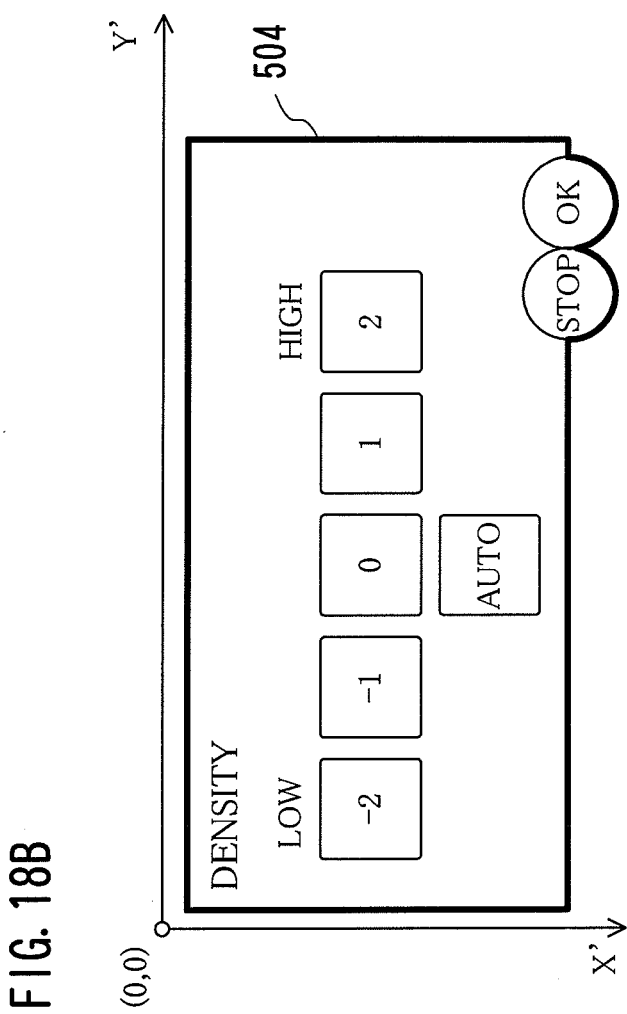

FIGS. 18A to 18C show an example of a "density" item setting window 504 according to an embodiment of the present invention (automatic change mode).

The screen 958 of FIG. 18A is similar to the screen 950 shown in FIG. 15A.

The item setting window 504 of FIG. 18B is the same as that of the original data.

Referring to the screen 959 of FIG. 18C, the "density" item setting window 504 is displayed in such a manner that the "stop/OK" button therein is above (in front of) the "finishing" functional icon 30 without positioning the local coordinates (0, 0) of the item setting window 504 on the screen coordinates (x1, y1) of the screen 958. This is because, in the "density" item setting window 504, whether or not a user easily sets the density is less related to the position of the window since a low gradation level is set on the left of the window and a high gradation level is set on the right of the window.

Figure 19B:
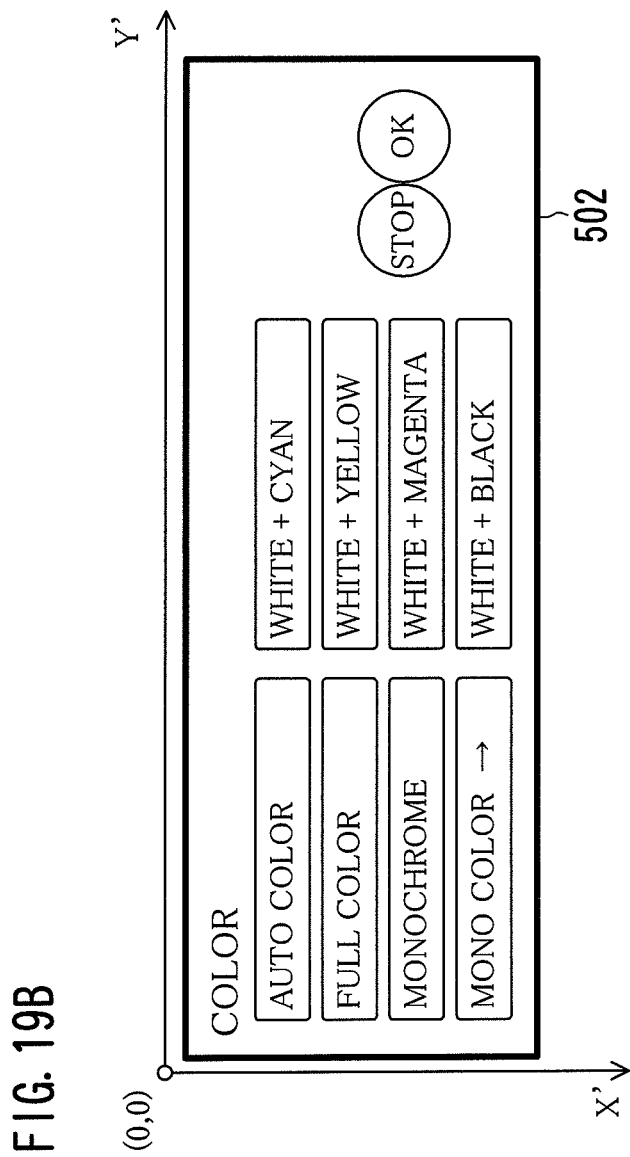

FIG. 19B shows an example of an item setting window 502 according to an embodiment of the present invention (automatic change mode).

Suppose that it is presumed that, after item setting is made on the item setting window 500, a button to be touched subsequently is not present. Stated differently, suppose that a "non-response region" is specified as the "button" of the parent window 1712 in the subsequent operation information table 1710. In such a case, the window generating portion 1300 determines, for example, the position at which the item setting window 500 is disposed and the size thereof in such a manner that the "stop/OK" button in the item setting window 500 is above the non-response region.

The screen 954 of FIG. 19A is similar to the screen 950 of FIG. 15A. The lattice pattern rectangle shows a non-response region 60.

The item setting window 502 is a "color" item setting window having a size determined by the window generating portion 1300. The position of the "stop/OK" button in the item setting window 502 is changed from the position of the "stop/OK" button in the original image data (see the item setting window 500 of FIG. 15B), and the size is increased in the y-axis direction accordingly.

Figure 19C:
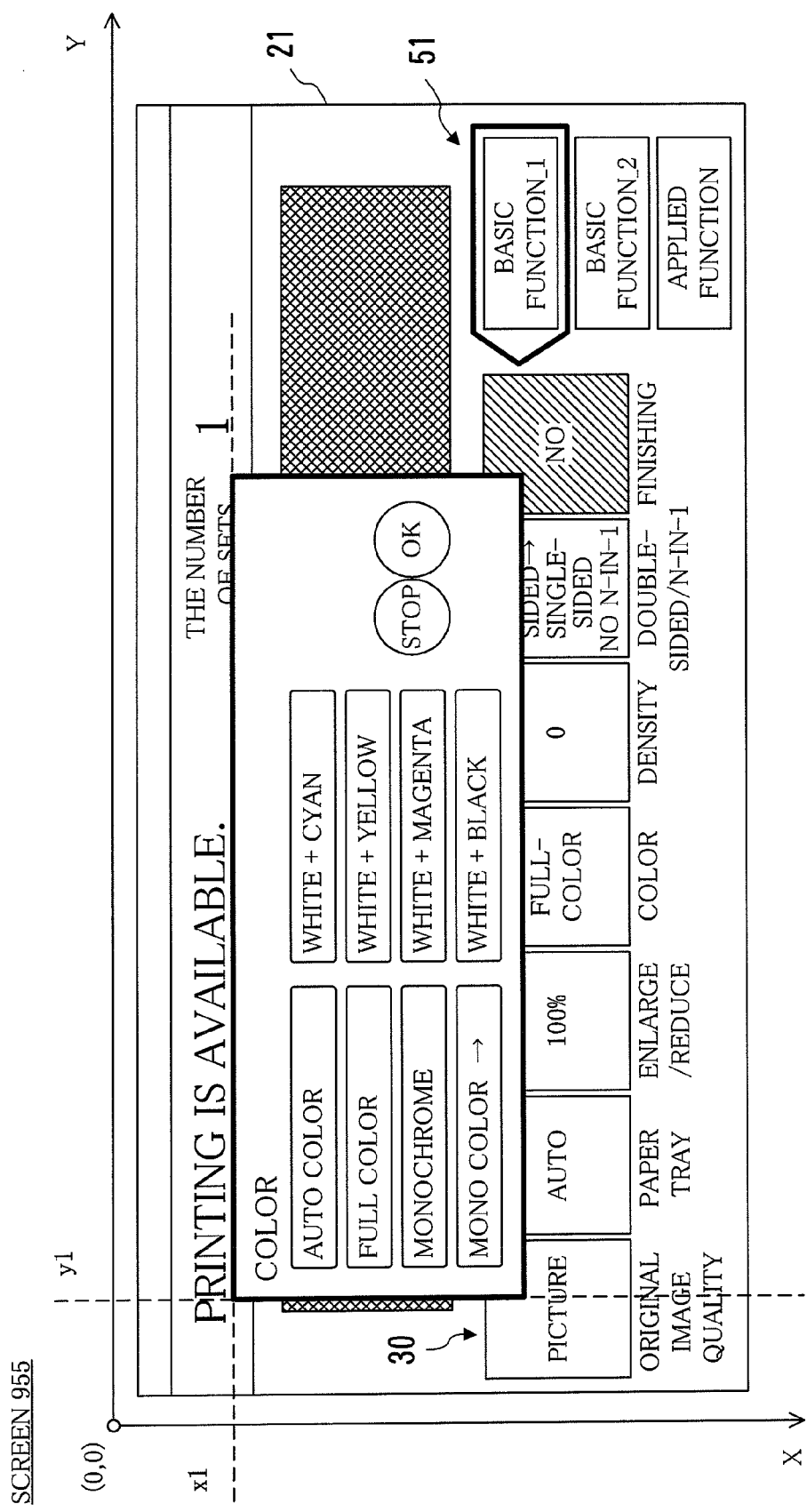

The screen 955 of FIG. 19C is a screen displaying the item setting window 502 of which the local coordinates (0, 0) are positioned on the screen coordinates (x1, y1) of the screen 954. The item setting window 502 is displayed in such a manner that the "stop/OK" button in the item setting window 502 overlaps with the non-response region 60.

At this time, the window generating portion 1300 determines the position of the "stop/OK" button in such a manner that the "stop/OK" button overlaps with the non-response region 60, and at the same time, the "stop/OK" button is close to the position of the "stop/OK" button in the original image data as much as possible (see the item setting window 500). This is because it is probably easier for a user to find the "stop/OK" button as the position thereof is closer to the position of the "stop/OK" button in the original image data.

[Operation]

Figure 20:
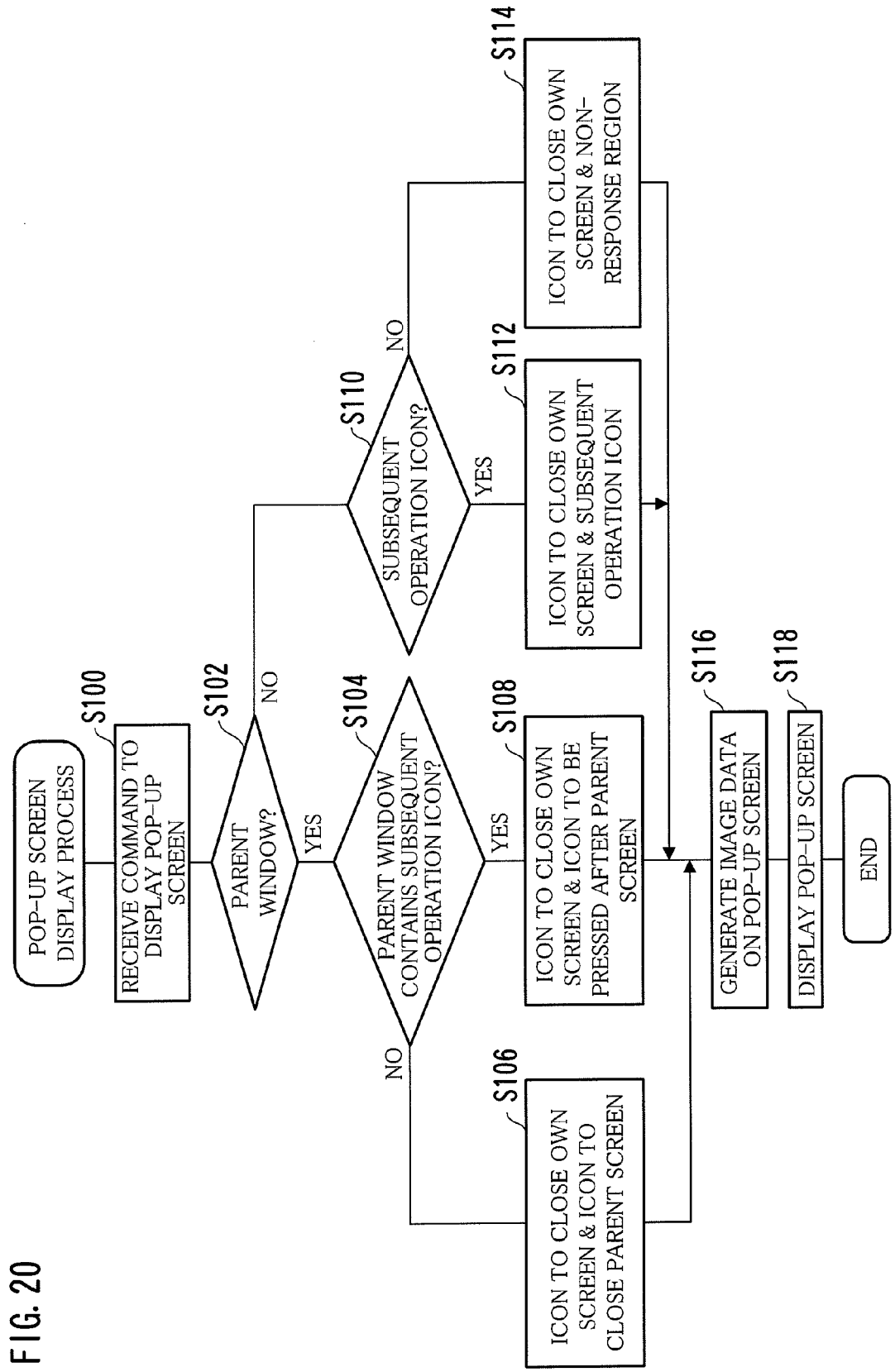
FIG. 20 is a flowchart depicting an example of a process for displaying an item setting window.

The following is a description of operation of the MFP 1000 for a case where the MFP 1000 implements the user interface function according to an embodiment of the present invention (automatic change mode), with reference to FIG. 20.

FIG. 20 is a flowchart depicting an example of a process for displaying an item setting window depending on user's operation in a screen displayed on the operational panel 20f.

For example, when a user presses a "copy" key provided in the operational key portion 22 (see FIG. 3) of the operational panel 20f, the MFP 1000 displays the initial screen shown in FIG. 4A on the operational panel 20f.

The user touches a functional icon 30 displayed on the screen.

When detecting, through the operational panel 20f, that the functional icon 30 has been touched (Step S100), the screen display control portion 1200 instructs the window generating portion 1300 to generate an item setting window for the touched functional icon 30.

Along with the instructions, the screen display control portion 1200 conveys, to the window generating portion 1300, an identifier of a parent window of the item setting window for the touched functional icon 30. If the parent window is the highest-level window, then the screen display control portion 1200 conveys, to the window generating portion 1300, a message that no further parent window is present.

In response to the instructions, the window generating portion 1300 determines which button of a window to be opened newly is to overlap with which button in the parent window, or with a non-response region.

To be specific, if there is any other button to be touched by the user after he/she closes the new window, then the window generating portion 1300 determines that a button to close the new window overlaps with the button to be subsequently touched by him/her (process corresponding to Steps S108 and 112 discussed later). The button to be subsequently touched by the user is displayed in the parent window or the highest-level window.

If there is no other button to be subsequently touched by the user, but if there is a parent window, then the window generating portion 1300 determines that a button to close the new window overlaps with a button to close the parent window (process corresponding to Step S106 discussed later).

Alternatively, if there is no other button to be subsequently touched by the user, and if there is no parent window, then the window generating portion 1300 determines that a button to close the new window overlaps with a non-response region (process corresponding to Step S114 discussed later).

In order to make such a determination, the window generating portion 1300 first determines the presence or absence of a parent window (Step S102). If being informed that there is no parent window from the screen display control portion 1200, then the window generating portion 1300 determines that there is no parent window (Step S102: No). If receiving an identifier of a parent window from the screen display control portion 1200, then the window generating portion 1300 determines that there is a parent window (Step S102: Yes).

Subsequently, the window generating portion 1300 determines whether or not there is another button to be operated subsequently, or the like.

To be specific, if determining that there is a parent window (Step S102: Yes), then the window generating portion 1300 searches in the subsequent operation information table 1710 for a record in which an identifier of a window to be opened newly is specified as the "window identifier" of the child window 1713, and, at the same time, the identifier of the parent window conveyed from the screen display control portion 1200 is specified as the "window identifier" of the parent window 1712 (Step S104).

If such a record is found out by the search (Step S104: Yes), then the window generating portion 1300 determines that a button specified as the "button" of the child window 1713, i.e., a button to close a window to be opened newly, overlaps with a button or the like specified as the "button" of the parent window 1712 (Step S108).

To be specific, if determining that there is no parent window (Step S102: No), then the window generating portion 1300 searches in the subsequent operation information table 1710 for a record in which an identifier of a window to be opened newly is specified as the "window identifier" of the child window 1713, and "-" is specified as the "window identifier" of the parent window 1712 (Step S110).

If such a record is found out by the search (Step S110: Yes), then the window generating portion 1300 determines that a button specified as the "button" of the child window 1713, i.e., a button to close a window to be opened newly, overlaps with a button or the like specified as the "button" of the parent window 1712 for that record, i.e., a button or the like displayed in the highest-level window (Step S112).

In Step S104, if no records are found out by the search (Step S104: No), then the window generating portion 1300 determines that there is no button or the like to be operated subsequently, and that a button to close a window to be opened newly overlaps with a button to close a parent window (Step S106).

In Step S110, if no records are found out by the search (Step S110: No), then the window generating portion 1300 determines that there is no other button or the like to be operated subsequently, and that a button to close a window to be opened newly overlaps with a non-response region (Step S114).

After determining which button of a window to be opened newly is to overlap with which button in the parent window, or overlap with a non-response region in this manner, the window generating portion 1300 reads out image data on the window to be opened newly from the item setting window storage portion 1750. In accordance with the determination, the window generating portion 1300 generates image data on an item setting window to be displayed based on the read-out image data (Step S116).

The window generating portion 1300, then, conveys the generated image data to the screen display control portion 1200.

Upon the receipt of the image data on the item setting window, the screen display control portion 1200 displays the item setting window on the operational panel 20ƒ (Step S118).

Specific Example

An example is described below in which a user touches the "finishing" functional icon 30 in Step S100.

When detecting, through the operational panel 20ƒ, that the "finishing" functional icon 30 has been touched (Step S100), the screen display control portion 1200 instructs the window generating portion 1300 to generate a "finishing" item setting window.

Along with the instructions, the screen display control portion 1200 conveys, to the window generating portion 1300, an identifier of a parent window of the "finishing" item setting window. Since the "finishing" item setting window is a window to be displayed at the beginning, the screen display control portion 1200 informs the window generating portion 1300 that no further parent window is present.

In response to the instructions, the window generating portion 1300 determines that there is no parent window (Step S102: No) because the window generating portion 1300 is informed that no further parent window is present.

Subsequently, the window generating portion 1300 searches in the subsequent operation information table 1710 (see FIG. 14) for a record in which an identifier of the "finishing" item setting window is specified as the "window identifier" of the child window 1713, and "-" is specified as the "window identifier" of the parent window 1712. As a result of the search, a record is found out in which "3" is specified as the "number" 1711 of the subsequent operation information table 1710.

Since the record is found out by the search (Step S110: Yes), the window generating portion 1300 determines that the button to close the "finishing" item setting window overlaps with the "basic function_2" switching button that is specified as the "button" of the parent window 1712 in the found record (see Step S112, and the screen 915 of FIG. 8B).

The window generating portion 1300 reads out image data on the "finishing" item setting window from the item setting window storage portion 1750. In accordance with the determination, the window generating portion 1300 generates image data based on the read-out image data (Step S116). Such image data to be generated is image data on the "finishing" item setting window having the close button displayed above a button identified as the "basic function_2" switching button (Step S116).

The window generating portion 1300, then, conveys the generated image data on the "finishing" item setting window to the screen display control portion 1200.

Upon the receipt of the image data on the item setting window, the screen display control portion 1200 displays the "finishing" item setting window on the operational panel 20ƒ (Step S118).

The image processing apparatus having the structure discussed above makes it possible for a user to perform operation for changing the indication on a display from one window to another in a quick and stress-free manner in a GUI configured to display windows by switching from one to another.

[Modification]

In the embodiment described above, switching between one window and another window can be performed quickly by displaying a button to close a pop-up window above a functional icon 30 that is presumed to be operated subsequently. In a modified example, switching between one window and another window can be performed more quickly by displaying a functional icon 30 that is presumed to be operated subsequently next to the currently operated functional icon 30, in addition to displaying a button to close a pop-up window above the functional icon 30 presumed to be operated subsequently.

Figure 21A:
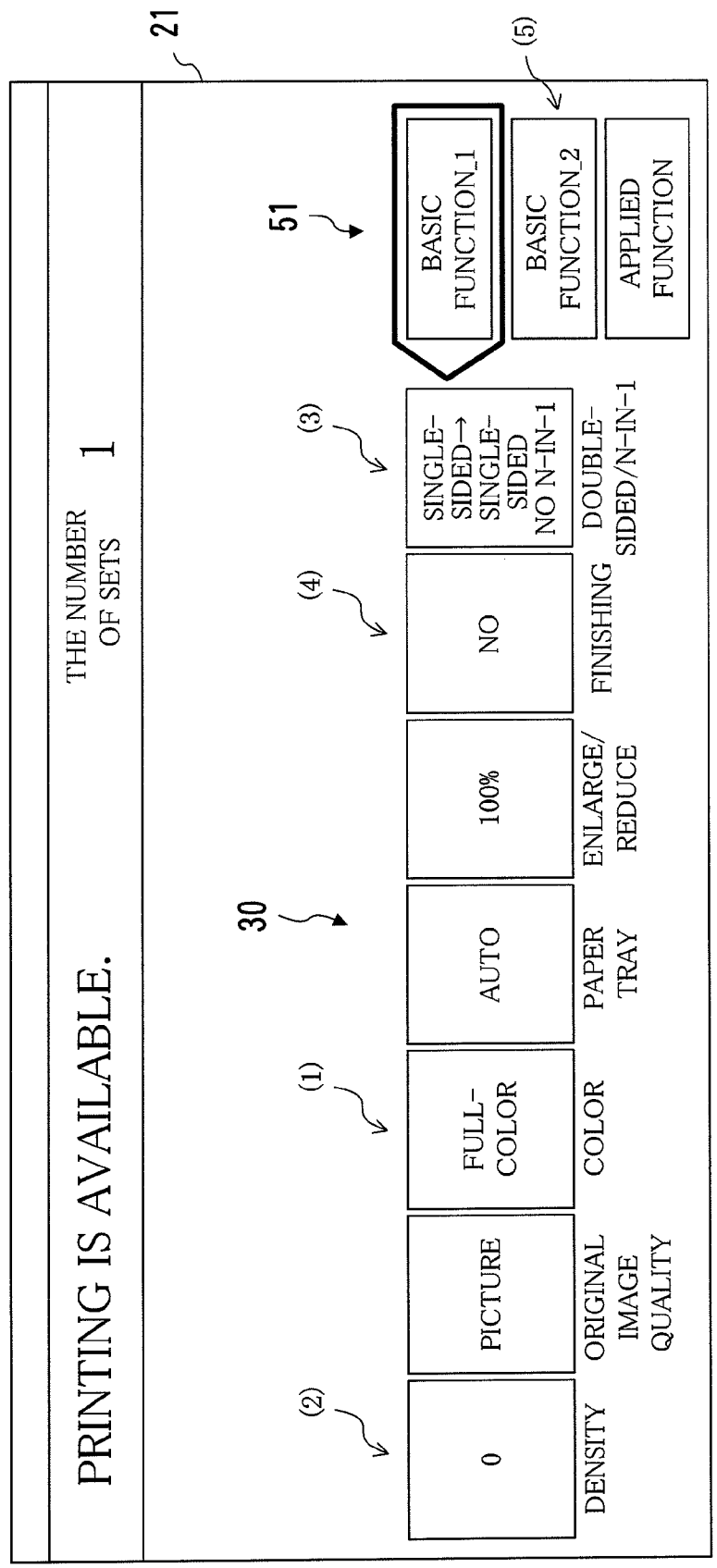
FIGS. 21A and 21B are diagrams showing examples of screens in which the positions of functional icons have been changed according to a modified example.

FIG. 21A shows an example of a screen for a case where the "basic function_1" switching button is selected. The numerals (1)-(5) denote the order based on which a user often touches functional icons 30 and switching buttons 51.

To be specific, the user often performs a series of operation as follows. First, the user touches (1) "color" functional icon 30 to open an item setting window, performs item setting operation thereon, and closes the item setting window. The user, then, touches (2) "density" functional icon 30 to perform operation on an item setting window corresponding thereto. Subsequently, he/she operates an item setting window for (3) "N-in-1" functional icon 30, and then, operates an item setting window for (4) "finishing" functional icon 30. At last, he/she touches (5) "basic function_2" switching button. It is supposed, herein, that the order is determined based on the operation history. The order may be another order, provided that the order is preferable.

Figure 21B:
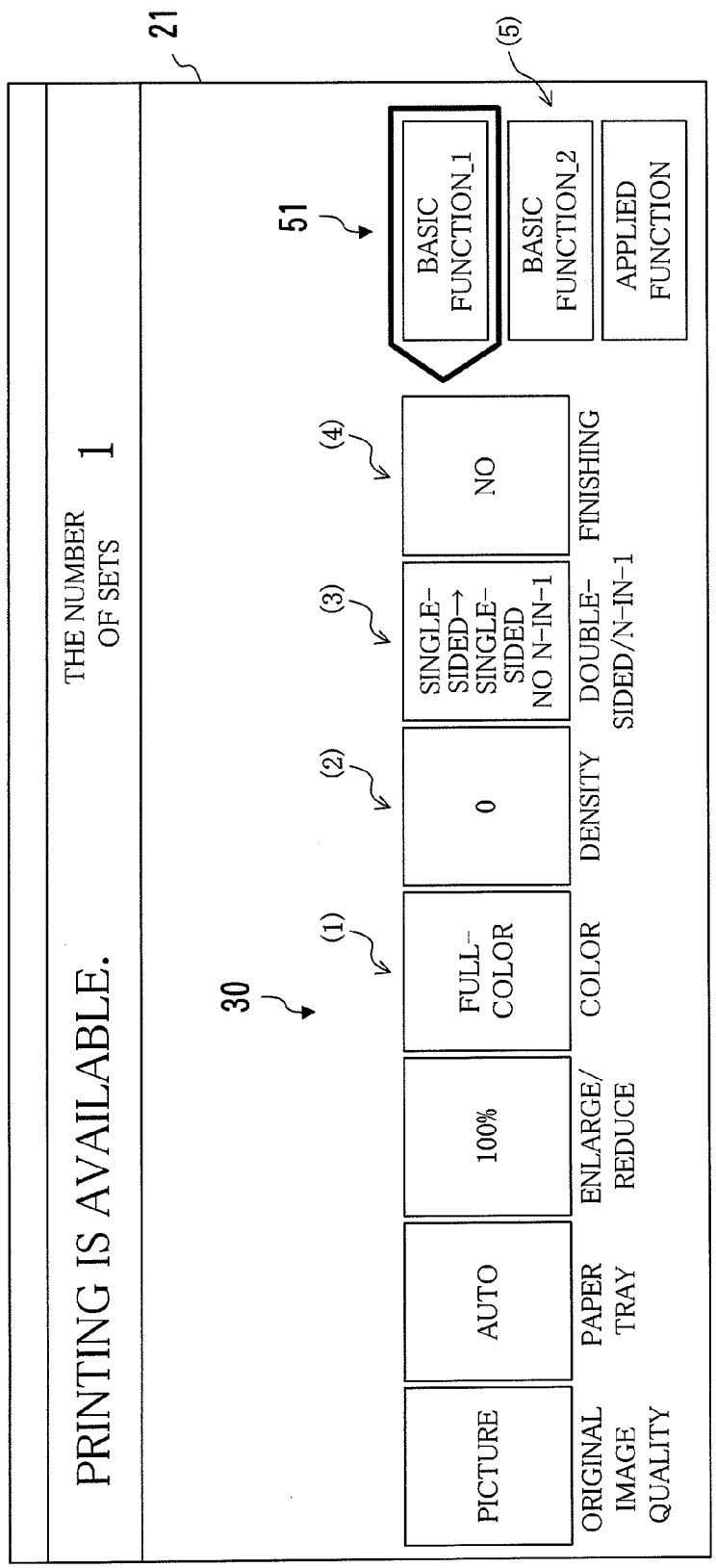

FIG. 21B shows an example of a screen in which the functional icons 30 and the switching buttons 51 are rearranged in the order of (1)-(5) of FIG. 21A.

To be specific, the functional icons 30 and so on are disposed in the order of the "color" functional icon 30, the "density" functional icon 30, the "N-in-1" functional icon 30, the "finishing" functional icon 30, and the "basic function_2" switching button.

An administrator of the MFP 1000 changes the geometric arrangement order of the functional icons 30 and so on appropriately based on user's operation history. It is possible for the MFP 1000 to automatically change the geometric arrangement order of the functional icons 30 and the switching buttons 51 based on user's operation history.

FIGS. 22A to 22D show the movement of user's finger in a conventional screen in which the functional icons 30 are disposed as shown in FIG. 21A, i.e., in which the positions of the functional icons 30 are not changed. Further, FIG. 23 shows the movement of user's finger for a case where the display positions of the functional icons 30 are changed as shown in FIG. 21B according to an embodiment of the present invention.

A solid white arrow denotes the movement of a finger to close a pop-up window and touch a subsequent functional icon 30. As shown in FIGS. 22 and 23, a button to close a pop-up window is displayed in a manner to overlap with a functional icon 30 to be touched subsequently. The finger movement distance denoted by the solid white arrow is equal between the case of FIG. 22 and the case of FIG. 23.

A bold arrow denotes the movement of a finger to touch a subsequent functional icon 30 and to close a pop-up window that has been opened in response to the toched operation.

Figure 22A:
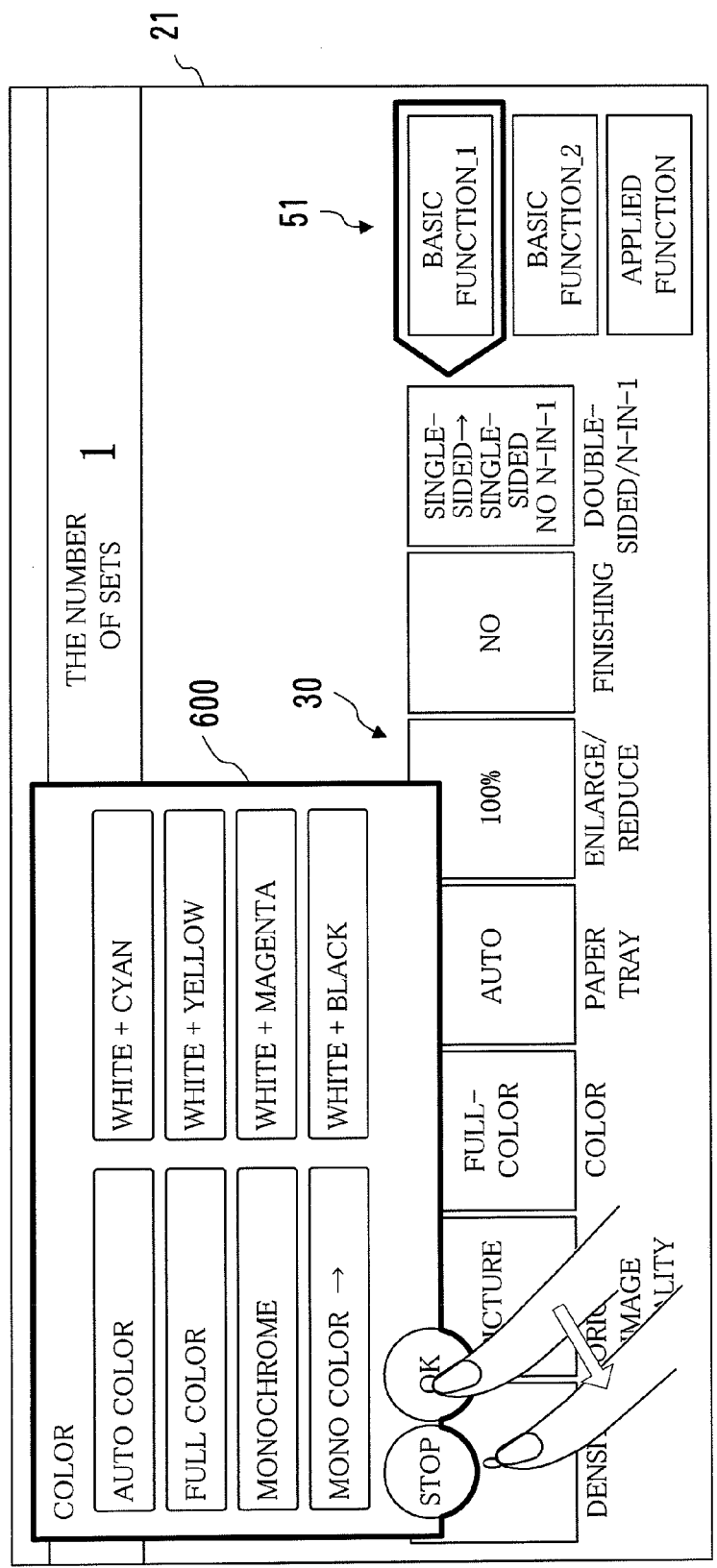

Referring to the screen 960 of FIG. 22A, as shown in the solid white arrow, a user hardly moves his/her finger in order to close a "color" item setting window 600 and to touch a subsequent "density" functional icon 30.

However, the "stop/OK" button in a "density" item setting window 601 is above a "N-in-1" functional icon 30 to be touched subsequently. The user, thus, needs to move his/her finger by a long distance as shown in the bold arrow on the screen 961 of FIG. 22B.

In contrast, referring to the screen 970 of FIG. 23A, a user hardly moves his/her finger in order to close a "color" item setting window 700 and to touch a subsequent "density" functional icon 30 as shown in the white solid arrow, as with the case of the screen 960 of FIG. 22A.

Figure 23B:
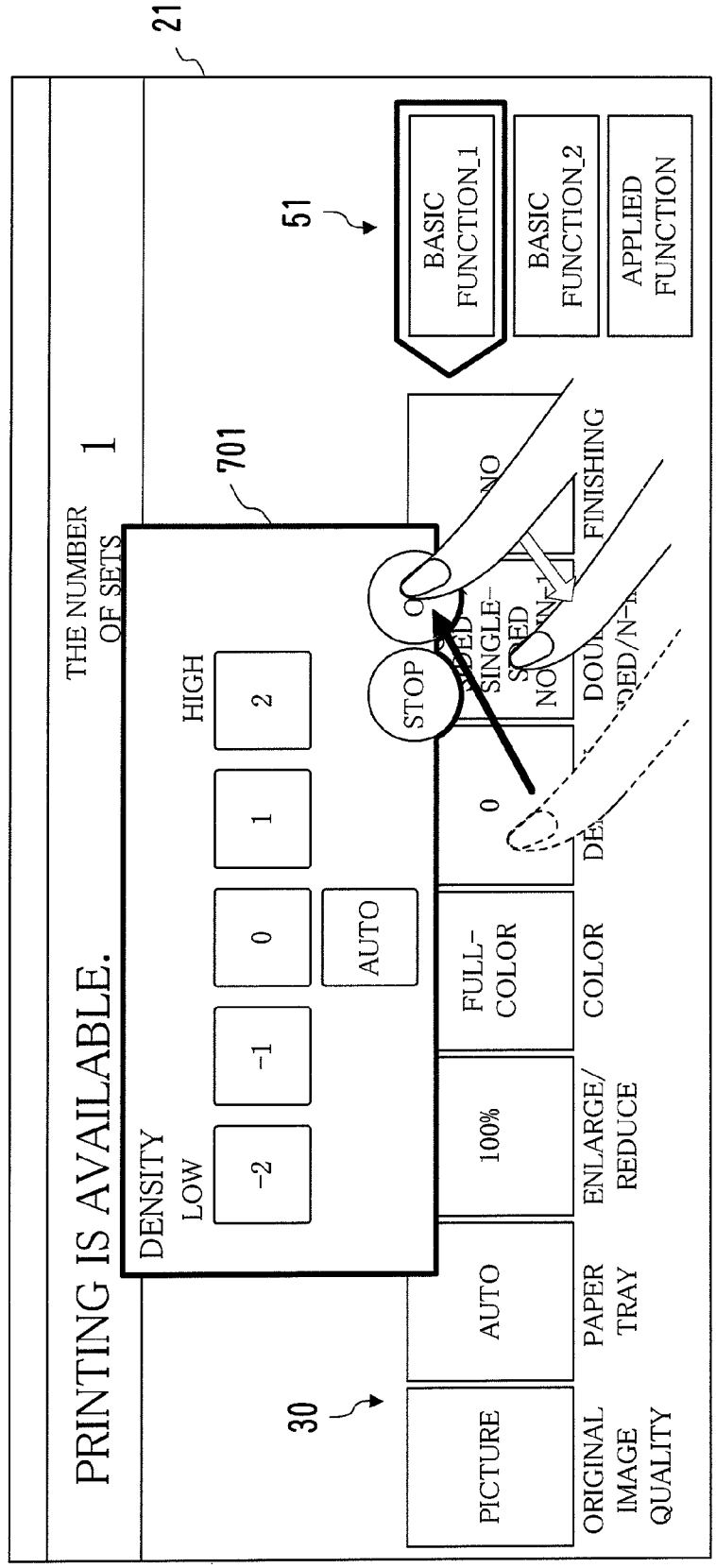

Referring to the screen 971 of FIG. 23B, the "stop/OK" button in a "density" item setting window 701 is above a "N-in-1" functional icon 30 disposed next to the "density" item setting window 701. The user, thus, only needs to move his/her finger by a short distance as shown in the bold arrow on the screen 971.

Figure 22C:
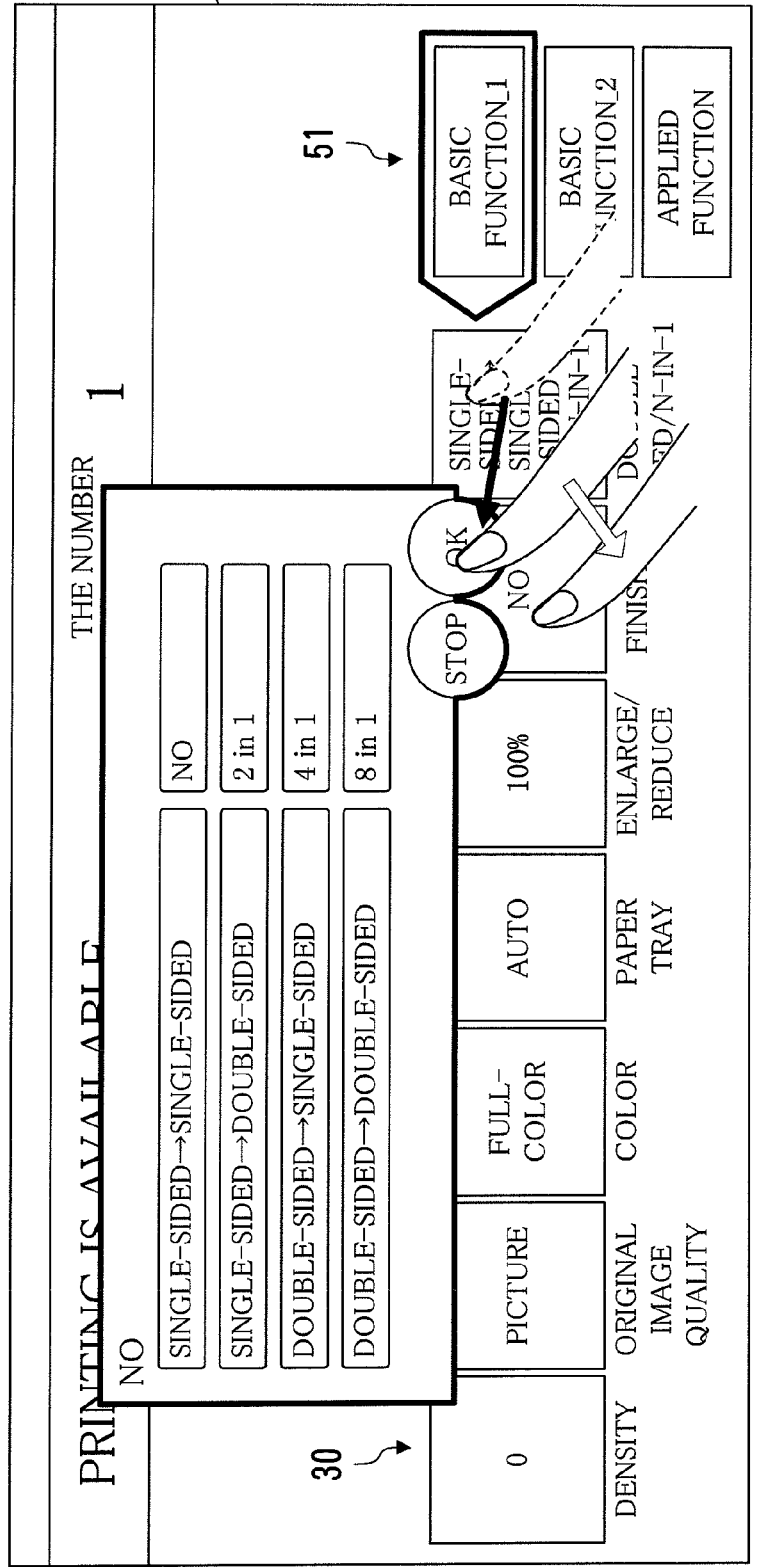
Figure 22D:
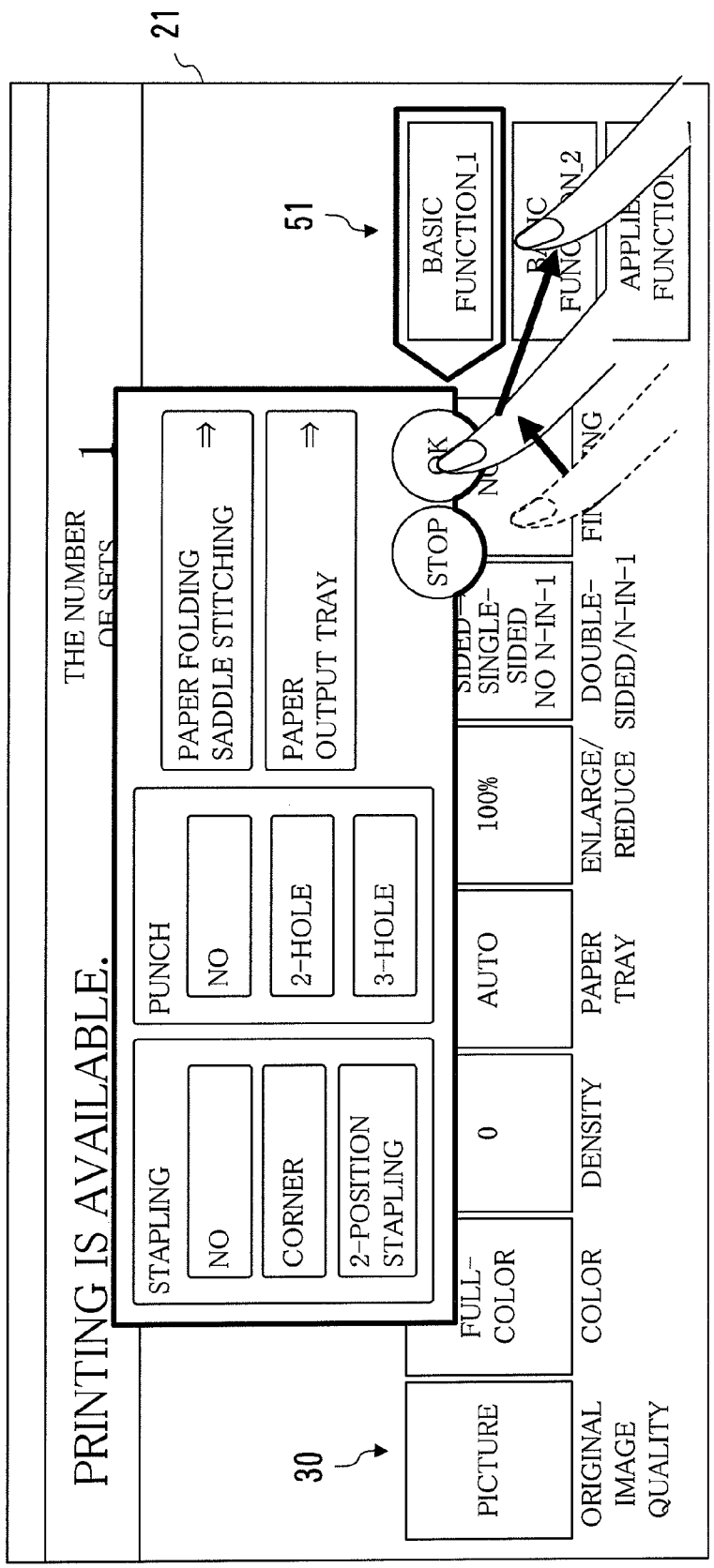

Referring to the screen 962 of FIG. 22C and the screen 963 of FIG. 22D, the user needs to move his/her finger to the left to touch the "stop/OK" button (see the bold arrow on the screen 962), and then, to move his/her finger to the right to touch the "basic function_2" switching button 51 (see the bold arrow on the screen 963).

Figure 23C:
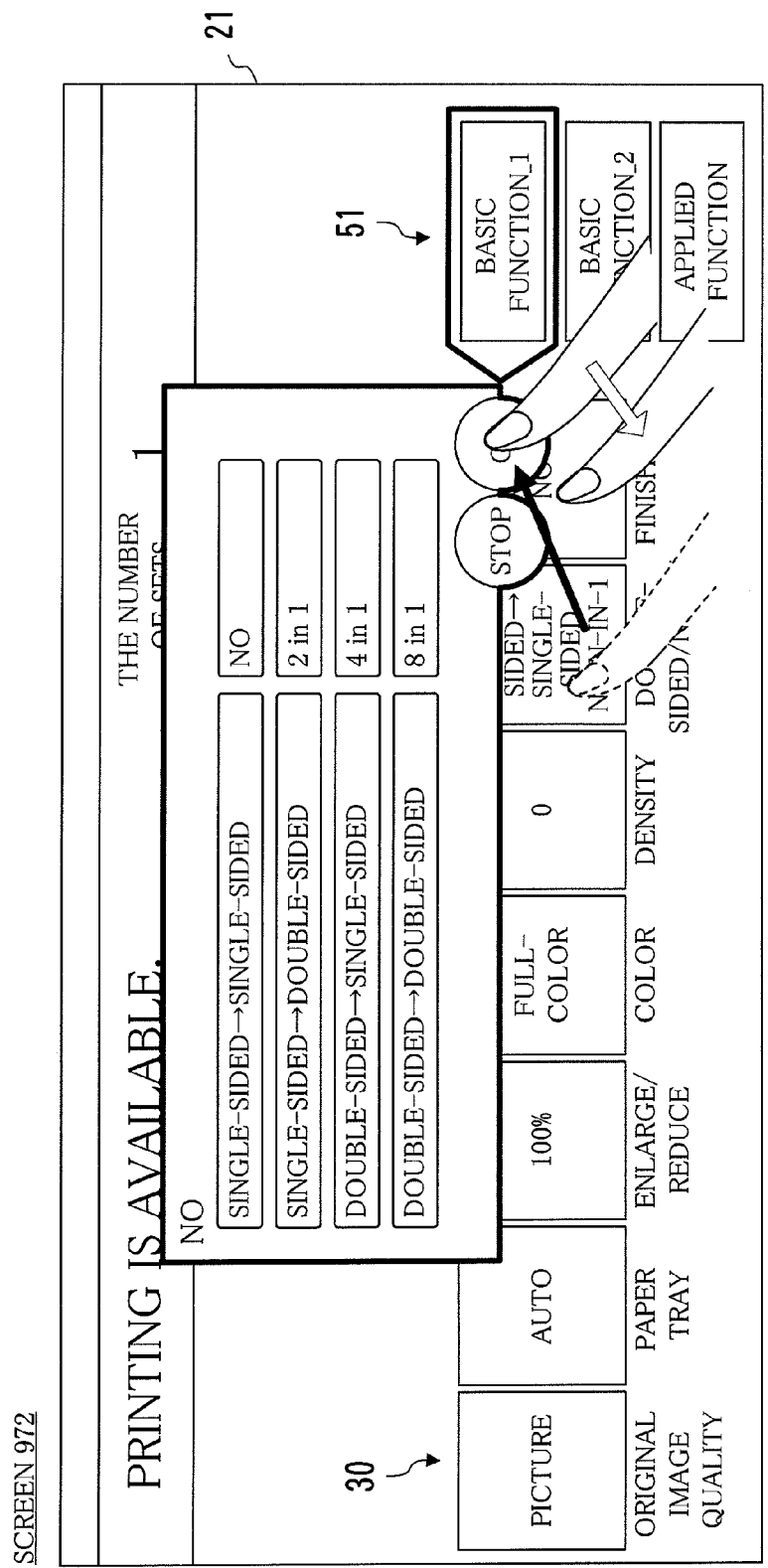

In contrast, referring to the screen 972 of FIG. 23C and the screen 973 of FIG. 23D, when the functional icons 30 are disposed next to one another in the order that the functional icons 30 are to be touched, a user only moves his/her finger unidirectionally in order. In the example of FIGS. 23C and 23D, a user only moves his/her finger to the right.

Although the embodiments of the present invention have been described above, the present invention is not limited thereto. The following arrangement is possible.

1) In the modified example, the functional icons 30 are disposed from the left to the right as viewed from a user. The present invention, however, is not limited thereto. For example, the functional icons 30 may be disposed from the right to the left, from the top to the bottom, or from the bottom to the top as viewed from a user.

2) In the embodiment discussed above, an item setting window is to be opened in response to a functional icon 30 being touched. Instead of this, however, an image or the like may be provided to open an item setting window for a certain function in a certain hierarchy level, i.e., an image showing a so-called short-cut key may be provided.

3) In the embodiment described above, a case of displaying windows that have a parent-child relation hierarchy is exemplified. Instead of this, however, windows may have other hierarchy, e.g., hierarchy of displayed order. To be specific, a window displayed earlier is deemed as a superior window, while a window displayed later is deemed as a subordinate window, or the like.

4) According to the embodiment, every time an item setting window is displayed, the original image data is read out from the item setting window storage portion 1750 to generate and display image data on an item setting window in which the position of a close key is changed. Another configuration is possible in which image data on an item setting window having a post-change position of a close key is memorized in advance, and corresponding image data is read out and displayed.

5) The user interface function of the embodiment may execute a computer program to implement the whole or a part of the individual elements shown in FIG. 13, or may implement the whole or a part of the individual elements shown in FIG. 13 in any other formats.

In the case of a computer program, a computer is preferably caused to load the computer program written onto a recording medium such as a memory card or a CD-ROM, and to execute the computer program. Alternatively, a computer is preferably caused to download a computer program via a network and to execute the computer program.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus comprising:
a display device that displays a plurality of windows having hierarchy levels in such a manner that a low-level window overlaps a high-level window, each of the plurality of windows containing a first object to close the subject window and one or more second objects to select items;
a processor that is configured to:
select, from said one or more second objects in the high-level window, a selection candidate object that is likely to be selected by a user after the low-level window is closed;
extract, from said one or more second objects in the high-level window, the selected selection candidate object; and
control, when the processor extracts the selection candidate object, the display device in such a manner that the first object in the low-level window overlaps the selection candidate object by comparing a position of the first object with a position of the selection candidate object, or the first object in the low-level window is disposed close to the selection candidate object such that a user is able to touch the selection candidate object after it touched the first object without substantially changing a position of his or her finger.

2. The image processing apparatus according to claim 1, wherein the processor controls, when the processor does not extract the selection candidate object, the display device in such a manner that the first objects of windows to be displayed of the plurality of windows overlap with one another, or the first objects of windows to be displayed of the plurality of windows are disposed close to one another.

3. The image processing apparatus according to claim 1, wherein the processor controls the display device to change a position of the first object in the low-level window.

4. The image processing apparatus according to claim 1, wherein the processor is further configured to create a subsequent operation information table automatically by associating operations that have been performed successively with each other a plurality of times.

5. The image processing apparatus according to claim 1, further comprising a subsequent operation information table created by an administrator.

6. An image processing apparatus comprising:
a display device that displays a window containing a first object to close the subject window;
a processor that is configured to:
select a subsequent process, the subsequent process being a process of which execution is likely to be instructed by a user after the window is closed;
specify the selected subsequent process; and
when the subsequent process is specified, controls the display device to display the window in such a manner that the first object overlaps a second object on a next window that appears when the window is closed by means of which second object the user gives a command to execute the subsequent process by comparing a position of the first object with a position of the second object, or the first object is disposed close to the second object on a next window that appears when the window is closed such that a user is able to touch the second object after it touched the first object without substantially changing a position of his or her finger, and, when a subsequent process is not specified, the processor controls the display device to display the window in such a manner that the first object is disposed at a position away from a responsive position on a next window that appears when the window is closed.

7. The image processing apparatus according to claim 6, wherein the processor controls the display device to display a third object next to the second object, the third object being an object by means of which the user gives a command to open the window.

8. A method for displaying a plurality of windows having hierarchy levels in such a manner that a low-level window overlaps a high-level window, each of the plurality of windows containing a first object to close the subject window and one or more second objects to select items, the method comprising:
selecting, from said one or more second objects in the high-level window, a selection candidate object that is likely to be selected by a user after the low-level window is closed;
extracting, from said one or more second objects in the high-level window, the selected selection candidate object that is likely to be selected by a user after the low-level window is closed; and
when the selection candidate object is extracted, displaying windows to be displayed of the plurality of windows in such a manner that the first object in the low-level window overlaps the selection candidate object by comparing a position of the first object with a position of the selection candidate object, or the first object in the low-level window is disposed close to the selection candidate object such that a user is able to touch the selection candidate object after it touched the first object without substantially changing a position of his or her finger.

9. The method according to claim 8, wherein, when the selection candidate object is not extracted, the windows to be displayed of the plurality of windows are displayed in such a manner that the first objects of the windows to be displayed of the plurality of windows overlap with one another, or the first objects of the windows to be displayed of the plurality of windows are disposed close to one another.

10. The method according to claim 8, wherein the windows to be displayed are displayed to change a position of the first object in the low-level window.

11. The method according to claim 8, wherein, the selecting is accomplished with a subsequent operation information table that is created automatically by associating operations that have been performed successively with each other a plurality of times.

12. The method according to claim 8, wherein, the selecting is accomplished with a subsequent operation information table that is created by an administrator.

13. A method for displaying a window containing a first object to close the subject window, the method comprising:
selecting a subsequent process, the subsequent process being a process of which execution is likely to be instructed by a user after the window is closed;
specifying the selected subsequent process; and
when the subsequent process is specified, displaying the window in such a manner that the first object overlaps a second object on a next window that appears when the window is closed by means of which second object the user gives a command to execute the subsequent process by comparing a position of the first object with a position of the second object, or the first object is disposed close to the second object on a next window that appears when the window is closed such that a user is able to touch the second object after it touched the first object without substantially changing a position of his or her finger, and, when a subsequent process is not specified, displaying the window in such a manner that the first object is disposed at a position away from a responsive position on a next window that appears when the window is closed.

14. The method according to claim 13, further comprising displaying the window in such a manner that a third object is disposed next to the second object, the third object being an object by means of which the user gives a command to open the window.

15. A non-transitory computer-readable storage medium storing thereon a computer program used in a computer for displaying a plurality of windows having hierarchy levels in a display device in such a manner that a low-level window overlaps a high-level window, each of the plurality of windows containing a first object to close the subject window and one or more second objects to select items, the computer program causing the computer to perform:
 a first process for selecting, from said one or more second objects in the high-level window, a selection candidate object that is likely to be selected by a user after the low-level window is closed;
 a second process for extracting, from said one or more second objects in the high-level window, the selected selection candidate object; and
 when the selection candidate object is extracted, a third process for displaying, in the display device, windows to be displayed of the plurality of windows in such a manner that the first object in the low-level window overlaps the selection candidate object by comparing a position of the first object with a position of the selection candidate object, or the first object in the low-level window is disposed close to the selection candidate object such that a user is able to touch the selection candidate object after it touched the first object without substantially changing a position of his or her finger.

16. The non-transitory computer-readable storage medium according to claim 15, wherein, when the selection candidate object is not extracted, the computer program causes the computer to perform the second process for displaying, in the display device, the windows to be displayed of the plurality of windows in such a manner that the first objects of the windows to be displayed of the plurality of windows overlap with one another, or the first objects of the windows to be displayed of the plurality of windows are disposed close to one another.

17. The non-transitory computer-readable storage medium according to claim 15, wherein the second process is performed by changing a position of the first object in the low-level window.

18. A non-transitory computer-readable storage medium storing thereon a computer program used in a computer for displaying, in a display device, a window containing a first object to close the subject window, the computer program causing the computer to perform:
 a first process for selecting a subsequent process, the subsequent process being a process of which execution is likely to be instructed by a user after the window is closed;
 a second process for specifying the selected subsequent process;
 when the subsequent process is specified, a third process for displaying the window in the display device in such a manner that the first object overlaps a second object on a next window that appears when the window is closed by means of which second object the user gives a command to execute the subsequent process by comparing a position of the first object with a position of the second object, or the first object is disposed close to the second object on a next window that appears when the window is closed such that a user is able to touch the second object after it touched the first object without substantially changing a position of his or her finger; and
 when a subsequent process is not specified, a fourth process for displaying the window in the display device in such a manner that the first object is disposed at a position away from a responsive position on a next window that appears when the window is closed.

19. The non-transitory computer-readable storage medium according to claim 18, wherein the third process or the fourth process includes disposing a third object next to the second object, the third object being an object by means of which the user gives a command to open the window.

* * * * *